US012652124B2

(12) United States Patent
Liu et al.

(10) Patent No.: US 12,652,124 B2
(45) Date of Patent: Jun. 9, 2026

(54) CONFIGURATION METHOD FOR NETWORK CODING FUNCTION AND RELATED APPARATUS

(71) Applicant: HUAWEI TECHNOLOGIES CO., LTD., Shenzhen (CN)

(72) Inventors: Jing Liu, Shenzhen (CN); Huiying Zhu, Shanghai (CN); Pengpeng Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 18/411,233

(22) Filed: Jan. 12, 2024

(65) Prior Publication Data

US 2024/0154724 A1 May 9, 2024

Related U.S. Application Data

(63) Continuation of application No. PCT/CN2022/104846, filed on Jul. 11, 2022.

(30) Foreign Application Priority Data

Jul. 15, 2021 (CN) .......................... 202110802177.3

(51) Int. Cl.
*H04L 1/00* (2006.01)

(52) U.S. Cl.
CPC .................................. *H04L 1/0076* (2013.01)

(58) Field of Classification Search
CPC .... H04L 1/0076; H04L 1/0079; H04L 1/0082

USPC .......................................................... 370/328
See application file for complete search history.

(56) References Cited

U.S. PATENT DOCUMENTS

| 10,575,163 B2 * | 2/2020 | Zeng | H04L 65/00 |
| 2014/0321354 A1 * | 10/2014 | Kim | H04L 1/1877 |
| | | | 370/328 |
| 2022/0147578 A1 * | 5/2022 | Ricci | G05D 1/247 |

FOREIGN PATENT DOCUMENTS

| CN | 107241762 A | 10/2017 |
| EP | 3447943 B1 | 4/2021 |
| WO | 2021076884 A1 | 4/2021 |

* cited by examiner

*Primary Examiner* — Hermon Asres
(74) *Attorney, Agent, or Firm* — Rimon PC

(57) ABSTRACT

A configuration method for a network coding function and related apparatus are disclosed in this application. A terminal sends capability information to an access network device wherein the capability information indicates a network coding capability supported by the terminal. The capability information may be at least one of: a network coding type, a size of a code block, a quantity of original data packets, a quantity of redundancy packets, a bit rate of network coding, a convolution depth, a size of a finite field for a coding operation, or a maximum data volume capable of being processed by the terminal. The terminal receives configuration information from the access network device, wherein the configuration information indicates the terminal to configure a network coding function, and the configuration information is determined by the access network device based on the capability information.

20 Claims, 23 Drawing Sheets

Point-to-point transmission

Multi-hop single connectivity

Multi-hop multi connectivity

Dual connectivity

Encoded data        Coding coefficient matrix        Original data

Integrity protection

Ciphering

CONFIGURATION METHOD FOR NETWORK CODING FUNCTION AND RELATED APPARATUS

CROSS-REFERENCE TO RELATED APPLICATION

This application is a continuation of International Application No. PCT/CN2022/104846, filed on Jul. 11, 2022, which claims priority to Chinese Patent Application No. 202110802177.3, filed on Jul. 15, 2021. The disclosures of the aforementioned applications are hereby incorporated by reference in their entireties.

TECHNICAL FIELD

This application relates to the field of communication technologies, and in particular, to a configuration method for a network coding function and a related apparatus.

BACKGROUND

In a current communication system, service reliability may be implemented through a mechanism of hybrid automatic repeat request (HARQ) or automatic repeat request (ARQ). However, the foregoing mechanism implemented based on retransmission has a problem of a large latency. Therefore, a network coding (NC) technology may be used to perform a coding operation on a code block. For example, in a random linear network coding (RLNC) technology, a transmit end may send several redundancy packets in advance (the code block includes one or more original data packets, and a redundancy packet is obtained by performing a coding operation on an original data packet included in the code block), to resist impact of a radio channel and reduce a latency.

Currently, network coding is implemented on a terminal device (also referred to as user equipment (UE)) and a broadcast-multicast service center (BM-SC), that is, implemented at an application layer.

In the conventional technology, because the BM-SC is located in a core network, and is connected to a base station in a wired manner, service transmission reliability can be ensured to a great extent. However, the base station and a terminal are connected in a wireless manner, and quality of an air interface link directly affects the service transmission reliability. Because conventional network coding is implemented at the application layer, adjusting sending of a redundancy packet by an application layer of the BM-SC based on the quality of the air interface link causes a large amount of unnecessary resource overheads to wired transmission of the core network, and also increases a decoding latency at a receive end. To resolve the foregoing problem, a network coding function needs to be implemented by being moved from an application layer of the core network to an access layer of an access network device. Therefore, to improve data transmission performance of the access network device, how to apply the network coding function to the access network device becomes an urgent problem to be resolved.

SUMMARY

Embodiments of this application provide a configuration method for a network coding function to implement network coding (NC). Information needed for a terminal device to perform network coding and/or network decoding is configured by a first access network device, so that network coding and decoding between the first access network device and the terminal device is possible. After the NC function is introduced to an access layer, both latency performance and spectral efficiency performance are considered by transmitting an encoded packet. The first access network device may flexibly adjust a quantity of to-be-sent encoded packets based on quality of an air interface link, to ensure that the terminal device can successfully perform decoding, thereby reducing a data transmission latency while ensuring service transmission reliability. In some embodiments, the first access network device may be a central unit (CU) or a distributed unit (DU), or the first access network device may be an integrated access network device, for example, a next generation base station (gNodeB, gNB).

According to a first aspect, an embodiment of this application provides a configuration method for a network coding function, where the method is applied to a communication system, and the communication system includes a first access network device and a terminal device. The method includes: The first access network device receives first capability information from the terminal device, where the first capability information indicates a network coding capability supported by the terminal device, and the first capability information indicates one or more of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, where the code block is a set of one or more of the original data packets. The first access network device determines first configuration information based on the first capability information, where the first configuration information indicates one or more of the following: a network coding type, a size of a system packet, a size of an original data packet, a quantity of system packets, a quantity of original data packets, a quantity of redundancy packets, selection of a coding coefficient, a convolution depth, or indication information for activating the network coding function. The first access network device sends the first configuration information to the terminal device, where the first configuration information indicates the terminal device to configure the network coding function.

It may be understood that "indicate" in this application, for example, indicating C, may include directly indicating C, for example, explicitly including C, or may include implicitly indicating C, for example, indicating C by using another piece of information B that has a correspondence with C. The correspondence between B and C may be predefined in a protocol, or may be configured by one party for another party during communication. This is not limited herein.

In this embodiment of this application, the term "network coding function" may also be referred to as an "NC function" for short, and the two may be used interchangeably. In this embodiment of this application, the NC function may be deployed on a data transmit end and a data receive end. The data transmit end may be an access network device or a terminal device, and the data receive end may also be an access network device or a terminal device. This is not limited herein. For example, the NC function may be separately deployed on a gNB and UE. For downlink transmission, the gNB may perform a network coding function, and the UE may perform a network decoding function. For uplink transmission, the UE may perform the network coding function, and the gNB may perform the network decoding function. In some embodiments of this application, when the gNB considers a CU-DU separation architecture, the NC function may be separately deployed on a CU and the UE. For downlink transmission, the CU may perform the network coding function, and the UE may perform the network decoding function. For uplink transmission, the UE performs the network coding function, and the CU performs the network decoding function. In some embodiments of this application, the NC function may be further separately deployed on a DU and the UE. For downlink transmission, the DU may perform the network coding function, and the UE may perform the network decoding function. For uplink transmission, the UE performs the network coding function, and the DU performs the network decoding function.

The bit rate of network coding equals a data volume of original data packets/(the quantity of original data packets+ the quantity of redundancy packets). The network coding type includes but is not limited to: a fountain code, packet network coding, or a convolutional code.

The convolution depth applies only to the convolutional code.

The size of the finite field for the coding operation is a vector size or a vector ratio of the finite field. The vector size of the finite field is a matrix size of a coefficient matrix G. Optionally, the size of the finite field for the coding operation may also be referred to as a size of a GF(q) field.

The maximum data volume capable of being processed by the terminal device during network coding is, for example, a quantity of original data packets on which the terminal device can perform processing of the network coding function.

The network coding type in the first capability information may indicate a network coding type that supports coding (or decoding) in the network coding function supported by the terminal device. The size of the code block in the first capability information indicates a size of a code block that supports coding in the network coding function supported by the terminal device. The quantity of original data packets in the first capability information indicates a quantity of original data packets that support coding in the network coding function supported by the terminal device. The quantity of redundancy packets in the first capability information indicates a quantity of redundancy packets that support coding in the network coding function supported by the terminal device. The bit rate of network coding in the first capability information indicates a bit rate of network coding that supports coding (or decoding) in the network coding function supported by the terminal device. When the network coding type in the first capability information is the convolutional code, the convolution depth indicates a convolution depth of coding (or decoding) supported by the terminal device. The size of the finite field for the coding operation in the first capability information indicates a size of a finite field for a coding (or decoding) operation supported by the terminal device. The maximum data volume capable of being processed by the terminal device during network coding in the first capability information may be a maximum quantity of original data packets that can be processed by the terminal device during network coding.

The code block is a concept when the network coding type is the packet network coding, and the size of the code block (block size for short) is a quantity of original data packets that are encoded together. The size of the code block that supports coding may include a plurality of supported values, one or more ranges, or a maximum value. This is not limited herein.

For example, when the network coding type is the fountain code, the first capability information may include the size of the code block and/or the maximum data volume capable of being processed by the terminal device during network coding. When the network coding type is the packet network coding, the first capability information may include at least one piece of information of the size of the code block, the quantity of original data packets, the quantity of redundancy packets, the bit rate of network coding, the size of the finite field for the coding operation, or the maximum data volume capable of being processed by the terminal device during network coding. When the network coding type is the convolutional code, the first capability information may include at least one piece of information of the size of the code block, the quantity of original data packets, the quantity of redundancy packets, the bit rate of network coding, the convolution depth, the size of the finite field for the coding operation, or the maximum data volume capable of being processed by the terminal device during network coding.

For example, when the first access network device activates a downlink NC function, the first access network device configures, for the terminal device, information needed for decoding downlink data. Optionally, the first access network device sends the first configuration information to the terminal device, to configure information needed for the terminal device to perform downlink decoding. The first configuration information includes at least one of the following information: a network coding type, a quantity of system packets, or indication information for activating the downlink NC function.

The terminal device may configure, based on the network coding type of the first configuration information, a network coding type for performing network decoding, to ensure that the terminal device can successfully decode data from the first access network device.

Because the system packets are obtained by performing network coding on the original data packets, the quantity of system packets is equal to the quantity of original data packets. The terminal device configures, based on the quantity of system packets in the first configuration information, a quantity of original data packets that need to be recovered when network decoding is performed.

The terminal device determines, based on the indication information for activating the downlink NC function, to activate the network decoding function.

For example, when the first access network device activates an uplink NC function, the first access network device configures, for the terminal device, information needed for coding uplink data. The first access network device sends the first configuration information to the terminal device, to configure information needed for the terminal device to perform uplink coding. The first configuration information includes at least one of the following information: a network coding type, a size of a code block, a size of a system packet, a quantity of system packets, a quantity of redundancy packets, selection of a coding coefficient, a convolution depth, or indication information for activating the uplink NC function.

The terminal device may configure, based on the network coding type of the first configuration information, a network coding type for performing network coding, to ensure that the first access network device can successfully decode data from the terminal device.

The size of the code block is a quantity of original data packets included in one code block. The terminal device determines, based on the size of the code block in the first configuration information, a quantity of original data packets that need to be processed when network coding is performed.

The size of the system packet is a data volume of a single system packet. The terminal device determines, based on the size of the system packet in the first configuration information, a size of a system packet generated when network coding is performed.

The terminal device determines, based on the quantity of redundancy packets in the first configuration information, a quantity of redundancy packets generated when network coding is performed.

The terminal device determines, based on the selection of the coding coefficient in the first configuration information, a codebook used during network coding.

When the network coding type is a convolutional code, the terminal device configures a type of the convolutional code based on the convolution depth in the first configuration information.

The terminal device determines, based on the indication information for activating the uplink NC function, to activate the network coding function.

For example, when the first access network device activates both an uplink NC function and a downlink NC function, the first access network device configures, for the terminal device, information needed for coding uplink data and information needed for decoding downlink data. The first access network device sends the first configuration information to the terminal device, to configure information needed for the terminal device to perform uplink coding and information needed for the terminal device to perform downlink decoding. The first configuration information includes at least one of the following information; a network coding type, a size of a code block, a size of a system packet, a quantity of system packets, a quantity of redundancy packets, selection of a coding coefficient, a convolution depth, or indication information for activating the NC function.

When the uplink NC function and the downlink NC function use different coding policies, the first configuration information may separately configure the uplink NC function and the downlink NC function. For example, configuration information for configuring the uplink NC function in the first configuration information includes at least one of the following information: a network coding type –A, a size –A of a code block, a size –A of a system packet, a quantity –A of system packets, a quantity –A of redundancy packets, selection of coding coefficient –A, a convolution depth –A, or indication information for activating the uplink NC function. Information for configuring the downlink NC function in the first configuration information includes at least one of the following information: a network coding type –B, a quantity –B of system packets, or indication information for activating the downlink NC function. In an example, the network coding type –A is a convolutional code, and the network coding type –B is a fountain code.

When the uplink NC function and the downlink NC function use a same coding policy, the terminal device may configure the uplink NC function and the downlink NC function based on the same first configuration information.

In some embodiments of this application, the NC function is implemented on the first access network device. Information needed for the terminal device to perform network coding and/or network decoding is configured by the first access network device, to enable network coding and decoding between the first access network device and the terminal device to be possible. After the NC function is introduced to an access layer, both latency performance and spectral efficiency performance are considered by transmitting an encoded packet. The first access network device may flexibly adjust a quantity of to-be-sent encoded packets based on quality of an air interface link, to ensure that the terminal device can successfully perform decoding, reducing a data transmission latency while ensuring service transmission reliability.

In a possible implementation, the first access network device receives network coding feedback information from the terminal device, where the network coding feedback information indicates one or more of the following information: a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

The terminal device sends, based on a status of received encoded packets, the network coding feedback information to the first access network device. Correspondingly, the first access network device receives the network coding feedback information sent by the terminal device. The quantity of redundancy packets requested by the terminal device is information about a quantity of redundancy packets that further need to be received by the terminal device to successfully perform decoding (that is, recovering original data).

For example, the terminal device receives a group of encoded packets sent by the first access network device, and performs network decoding processing on the received group of encoded packets. When the terminal device further needs x redundancy packets to complete decoding processing, where x is a positive integer, the network coding feedback information indicates that the terminal device further needs x redundancy packets to complete the network decoding.

For another example, when a quantity of encoded packets needed for the terminal device to correctly perform decoding is y (that is, the terminal device may successfully perform decoding provided that the terminal device correctly receives y encoded packets), where y is a positive integer greater than or equal to x. When the network coding feedback information indicates that a quantity of encoded packets incorrectly received by the terminal device is z, where z is a positive integer, the first access network device may determine, based on the quantity z of the encoded packets incorrectly received by the terminal device and a quantity of encoded packets that have been sent by the first access network device to the terminal, a quantity of redundancy packets that further need to be received by the terminal device to complete decoding processing. Alternatively, when the network coding feedback information indicates that a quantity of encoded packets correctly received by the terminal device is w; where w is a positive integer, the first access network device may determine, based on the quantity w of the encoded packets correctly received by the terminal device, a quantity of redundancy packets that further need to be received by the terminal device to complete decoding processing.

In some embodiments of this application, the terminal device sends the network coding feedback information to the first access network device, to notify the first access network device of a current decoding status of the terminal device. In this way, the first access network device flexibly adjusts the quantity of to-be-sent encoded packets based on the network coding feedback information, to ensure that the terminal device can successfully perform decoding, reducing a data transmission latency while ensuring service transmission reliability.

In a possible implementation, the first access network device includes a first CU, and the communication system further includes a first DU and a second DU, where the first CU manages the first DU and the second DU. The method further includes: The first CU receives first indication information from the first DU, and the first CU sends the first indication information to the second DU, where the first indication information includes information about the code block, for example, information that indicates the code block. For example, the information about the code block may be information about an identifier of the code block (block id).

After the first DU receives the network coding feedback information from the terminal device, the first DU may determine a status of receiving the encoded packets by the terminal device, and determine a quantity of redundancy packets that further need to be received by the terminal device to correctly recover the original data through decoding. Further, the first DU sends the first indication information to the first CU. The first indication information includes the information about the code block, for example, the information that indicates the code block. The information that indicates the code block includes information about a current code block, or includes information about a next code block. The current code block is a last code block on which network coding processing is being performed by the first DU. The next code block is a code block closely following the current code block, or is a code block that is after the current code block and on which network coding processing is to be performed. For example, the information about the code block may be the information about the identifier of the code block (block id).

Optionally, the first indication information further includes indication information that indicates a quantity of redundancy packets that the terminal device still lacks, or includes information used to request/indicate a quantity of redundancy packets to be sent by the transmit end.

The first CU sends the first indication information to the second DU. Correspondingly, the second DU receives the first indication information sent by the first CU. In a possible implementation, the first CU sends the first indication information to the second DU through an F1 application protocol (F1AP) message.

It should be noted that the first DU sends the first indication information to the second DU through the first CU. In a possible implementation, the first indication information may be transparently transmitted, that is, the first CU does not process the first indication information. After the first CU receives the first indication information from the first DU, the first CU directly forwards the first indication information to the second DU. In another possible implementation, the first CU may alternatively process the received first indication information, and then send processed first indication information to the second DU. In another possible implementation, a message type of the first indication information sent by the first DU to the first CU is inconsistent with a message type of the first indication information sent by the first CU to the second DU. For example, the first DU sends the first indication information to the first CU through a downlink data delivery status (DDDS) message. After receiving the first indication information, the first CU sends the first indication information to the second DU through the F1AP message.

In some embodiments of this application, in a scenario in which the UE is handed over from the first DU to the second DU, the UE notifies the first DU of a current network decoding status of the UE through the network coding feedback information, to enable the first DU to trigger sending of the first indication information to the first CU. The first CU indicates, through the first indication information, the second DU to send the redundancy packet to the terminal device, to enable the terminal device to recover the original data by performing joint decoding on the encoded packets received from the first DU and the redundancy packet received from the second DU, reducing a packet loss in a handover process of the terminal device.

In a possible implementation, the first access network device includes a first CU, and the communication system further includes a second CU, a first DU, and a second DU, where the first CU manages the first DU, and the second CU manages the second DU. The method further includes: The first CU receives first indication information from the first DU, and the first CU sends the first indication information to the second CU, where the first indication information includes information about the code block, for example, information that indicates the code block.

In some embodiments of this application, in a scenario in which the UE is handed over from the first DU to the second DU, the UE notifies the first DU of a current network decoding status of the UE through the network coding feedback information, to enable the first DU to trigger sending of the first indication information to the first CU. For example, the first indication information is sent through a DDDS message. The first CU sends the first indication information to the second CU. The second CU indicates, through the first indication information, the second DU to send the redundancy packet to the terminal device, to enable the terminal device to successfully complete network decoding. The foregoing method ensures normal communication between the terminal device and an access network device.

In a possible implementation, the first access network device includes a first CU, and the communication system further includes a first DU and a second DU, where the first CU manages the first DU and the second DU. The method further includes: The first CU sends second indication information and first data to the second DU, where the second indication information indicates whether network coding processing needs to be performed on the first data.

In a possible implementation, the first CU sends the first data and the second indication information to the second DU through a GTP tunnel. Optionally, the second indication information is carried in a header field of the GTP tunnel for sending.

In some embodiments of this application, in a scenario in which the UE is handed over from the first DU to the second DU, the first CU indicates the second DU whether to perform network coding processing on the received first data through the second indication information, and the second DU sends the second data to the terminal device based on the second indication information. The second data may be an encoded packet generated after the second DU performs network coding processing on the received first data, or may be the first data (that is, processing of the network coding function does not need to be performed on the first data). In addition, the second DU indicates the terminal device to perform differentiation, to ensure that the terminal device correctly processes the second data, and reduce a packet loss in a handover process.

In a possible implementation, the first CU sends third configuration information to the second DU, where the third configuration information is used to configure the network coding function of the second DU, and the third configuration information includes configuration information used by the first DU to perform network coding processing. The third configuration information is configuration information needed for the first DU to perform the NC function. The first CU may send configuration information for the first DU to perform encoding to the second DU. This ensures that configuration information for the second DU to perform encoding is consistent with the configuration information for the first DU to perform encoding, enabling the terminal device to perform joint decoding on a redundancy packet generated by the second DU and an encoded packet generated by the first DU. The configuration information for the first DU to perform encoding may be determined by the first CU, or may be determined by the first DU. Content of the configuration information is the same as that of the first configuration information in the foregoing embodiment, and details are not described herein again. When the configuration information for the first DU to perform encoding is determined by the first CU, the first CU directly sends the determined configuration information for the first DU to perform encoding to the second DU. When the configuration information for the first DU to perform encoding is determined by the first DU, before the first CU sends the configuration information for the first DU to perform encoding to the second DU, the first CU needs to obtain, from the first DU, the configuration information for the first DU to perform encoding.

In a possible implementation, the first access network device includes a first CU, and the communication system further includes a second CU, a first DU, and a second DU, where the first CU manages the first DU, and the second CU manages the second DU. The method further includes: The first CU sends second indication information to the second CU, to enable the second CU to send first data and the second indication information to the second DU, where the second indication information indicates whether network coding processing needs to be performed on the first data.

When there is a communication port, for example, an Xn communication port, between the first CU and the second CU, the first CU may send the second indication information and third data to the second CU through the Xn communication port. The second CU generates the first data based on the third data. For example, the third data is a packet data convergence protocol service data unit (PDCP SDU), and the first data is a packet data convergence protocol protocol data unit (PDCP PDU).

In some embodiments of this application, in a scenario in which the UE is handed over from the first DU to the second DU, the UE notifies the first DU of a current network decoding status of the UE through the network coding feedback information, to enable the first DU to trigger sending of a DDDS message to the first CU. The first CU sends the second indication information to the second CU. The second CU indicates, through the second indication information, the second DU whether to perform processing of the network coding function on the received first data. The second DU sends the second data to the terminal device based on the second indication information. The second data may be the second DU that performs network coding processing on the received first data to generate an encoded packet, or may be the first data (that is, processing of the network coding function does not need to be performed on the first data), and indicates the terminal device to distinguish the second data, so as to ensure that the terminal device correctly processes the second data, and reduce a packet loss in a handover process.

In a possible implementation, when the second indication information indicates that the network coding processing needs to be performed on the first data, the second DU sends data obtained after the network coding processing is performed on the first data to the terminal device through a first logical channel: or when the second indication information indicates that the network coding processing does not need to be performed on the first data, the second DU sends the first data to the terminal device through a second logical channel, where the first logical channel is different from the second logical channel. In this way, the terminal device performs different processing on data received from different logical channels.

In a possible implementation, the first access network device includes a first CU, and the communication system further includes a first DU and a second DU, where the first CU manages the first DU and the second DU. The method further includes: The first CU sends third indication information to the first DU, where the third indication information indicates a rule for the first DU to send the system packet or the original data packet to the terminal device. The first CU sends fourth indication information to the second DU, where the fourth indication information indicates a rule for the second DU to send the system packet or the original data packet to the terminal device. According to the foregoing method, the terminal device can perform joint decoding on encoded packets received by the first DU and the second DU.

In a possible implementation, the fourth indication information includes a number of the system packet. For example, the second DU performs processing of the network coding function on the PDCP PDUs 1, 2, and 3, to generate system packets 1 to 4, and a redundancy packet 1 and a redundancy packet 2. The fourth indication information indicates the second DU to send a system packet whose number is an even number to the terminal device. The fourth indication information may include numbers of the system packet 2 and the system packet 4, to enable the second DU to send the system packet 2 and the system packet 4 to the terminal device.

In another possible implementation, the fourth indication information includes information about a range/quantity of system packets to be sent. For example, the fourth indication information indicates the second DU to send system packets whose numbers are in a specified range from front to back to the terminal device. For example, the fourth indication information indicates the second DU to send the system packet 1 and the system packet 2 to the terminal device.

When the fourth indication information indicates the rule for the second DU to send the redundancy packet to the terminal device:

In a possible implementation, the second DU detects quality of a current link between the second DU and the terminal device, and determines whether to send the redundancy packet to the terminal device and a quantity of redundancy packets to be sent to the terminal device. In this implementation, the fourth indication information does not exist.

In another possible implementation, the third indication information is preconfigured in the first DU, and the fourth indication information is preconfigured in the second DU. In other words, there is no explicit third indication information and fourth indication information.

In a possible implementation, the first access network device includes the first CU, the communication system further includes the first DU, and the first access network device receives the first capability information from the terminal device includes: The first CU receives the first capability information from the terminal device.

The terminal device may send the first capability information to the first CU through the first DU, where the first capability information may indicate a network coding capability supported by the terminal device. The first capability information includes at least one of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding.

In a possible implementation, the first access network device includes the first CU, the communication system further includes the first DU, and the first access network device determines the first configuration information based on the first capability information includes: The first CU sends the first capability information to the first DU, to enable the first DU to determine the first configuration information based on the first capability information. Alternatively, the first CU determines the first configuration information based on the first capability information.

For example, the first DU receives the first capability information through an F1AP message.

The first DU determines configuration information needed for the terminal device to perform the NC function. In other words, for a downlink, the first DU performs a coding operation on downlink data, the terminal device performs decoding processing on the downlink data, and configuration information needed for the terminal device to perform decoding is determined by the first DU. For an uplink, the terminal device performs a coding operation on uplink data, the first DU performs decoding processing on the uplink data, and configuration information needed for the terminal device to perform encoding is determined by the first DU.

When the first DU determines to activate a downlink NC function, the first DU may send the first configuration information to the UE. The first configuration information may include at least one of the following: a network coding type, a quantity of system packets, or indication information for activating the downlink NC function.

When the first DU determines to activate an uplink NC function, the first DU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

When the first DU determines to activate both the downlink NC function and the uplink NC function, the first DU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the NC function.

In a possible implementation, the first access network device sends the first configuration information to the terminal device includes:

The first CU sends the first configuration information to the terminal device. The first CU determines whether UE activates the NC function based on the first capability information reported by the UE and information about a network coding capability supported by the first CU.

When the first CU determines to activate a downlink NC function, the first CU may send the first configuration information to the UE. The first configuration information may include at least one of the following: a network coding type, a quantity of system packets, or indication information for activating the downlink NC function.

When the first CU determines to activate an uplink NC function, the first CU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

When the first CU determines to activate both the downlink NC function and the uplink NC function, the first CU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the NC function.

Alternatively, the first CU receives the first configuration information from the first DU, and the first CU sends the first configuration information to the terminal device. The first DU may send the first configuration information to the terminal device through the first CU. The first DU may send the first configuration information through the F1AP message to the first CU, so that the first CU sends the first configuration information through an RRC message to the terminal device.

In a possible implementation, the first access network device includes the first CU, and the communication system further includes the first DU. The method further includes: The first CU receives second capability information from the first DU, where the second capability information indicates a network coding capability supported by the first DU, and the second capability information includes one or more of the following: a network coding type, a size of a code block, a quantity of original data packets, a quantity of redundancy packets, a bit rate of network coding, a convolution depth, a size of a finite field for a coding operation, or a maximum data volume capable of being processed by the first DU during network coding.

In addition to learning the information about the network coding capability supported by the terminal device, the first CU further needs to learn information about a network coding capability supported by the first DU.

The first DU sends the second capability information to the first CU. Correspondingly; the first CU receives the second capability information sent by the first DU. For example, the first DU may send the second capability information through an F1AP message to the first CU. The F1AP message may be an F1 setup request message, a configuration update (gNB-DU configuration update) message, or another F1AP message. This is not limited herein.

The second capability information indicates the network coding capability supported by the first DU, and the second capability information includes at least one of the following: a network coding type, a size of a code block, a quantity of original data packets, a quantity of redundancy packets, a bit rate of network coding, a convolution depth, a size of a finite field for a coding operation, or a maximum data volume capable of being processed by the first DU during network coding.

In a possible implementation, the network coding capability supported by the first DU may be obtained from an operation, administration and maintenance (OAM) server. That is, the second capability information is configured by the OAM server for the first DU.

In a possible implementation, the first CU sends second configuration information to the first DU, where the second configuration information is used to configure the network coding function of the first DU, and the second configuration information includes one or more of the following: a network coding type, a size of a system packet, a size of an original data packet, a quantity of system packets, a quantity of original data packets, a quantity of redundancy packets, a selection of a coding coefficient, a convolution depth, or indication information for activating the network coding function. For example, the first CU sends the second configuration information to the first DU through an F1AP message.

When the first CU determines to activate a downlink NC function, the first CU may send the second configuration information to the first DU, where the second configuration information includes at least one of the following: a network coding type, a size of a code block, a size of a system packet, a quantity of system packets, a quantity of redundancy packets, selection of a coding coefficient, a convolution depth, or indication information for activating the downlink NC function.

When the first CU determines to activate an uplink NC function, then:

The first CU sends the first configuration information to the terminal device, where the first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

The first CU sends the second configuration information to the first DU, where the second configuration information includes at least one of the following: a network coding type, a size of a system packet, or indication information for activating the uplink NC function.

When the first CU determines to activate both a downlink NC function and an uplink NC function, the first CU sends the second configuration information to the first DU, and the first CU sends the first configuration information to the terminal device. The first configuration information and the second configuration information include at least one of the following: a network coding type, a size of a code block, a size of a system packet, a quantity of system packets, a quantity of redundancy packets, selection of a coding coefficient, a convolution depth, or indication information for activating the NC function.

It should be noted that the first configuration information and the second configuration information may be similar configuration information, to enable the first DU and the terminal device to smoothly complete data coding and decoding processing. Similar network coding configuration parameters and/or network decoding configuration parameters may be configured for the first DU and the terminal device.

In a possible implementation solution, the first access network device sends fifth indication information to the terminal device, where the fifth indication information indicates the terminal device to disable a sequence numbering function of a PDCP SDU during uplink data transmission. Consequently, the first access network device obtains an incorrect sequence number.

After the NC function is introduced to a packet data convergence layer protocol (PDCP) layer, the PDCP SDU and the PDCP PDU may no longer be in a one-to-one correspondence. Therefore, the first access network device (the transmit end, for example, the gNB, the CU, or the DU) may send the fifth indication information to the terminal device (the receive end). The fifth indication information indicates the UE to disable (or cancel) a sequence numbering function/operation of a PDCP SDU (PDCP SN) during uplink data transmission. Alternatively, the fifth indication information indicates the UE to separately associate each original data packet and each redundancy packet with one sequence number during uplink data transmission (for a solution in which the transmit end sends the original data packet and the redundancy packet), or separately associate each system packet and each redundancy packet with one sequence number (for a solution in which the transmit end sends the system packet and the redundancy packet). The sequence number may be a PDCP SN, or may be another SN.

In a possible implementation, the fifth indication information indicates the UE to enable the network coding function for a DRB. After the fifth indication information is received, that the UE disables (or cancels), at the PDCP layer, the sequence numbering function/operation of the PDCP SDU (PDCP SN) is changed to that the UE separately associates each original data packet and each redundancy packet with one sequence number, or separately associates each encoded packet (a system packet and a redundancy packet) with one sequence number. Similarly, that the first access network device disables (or cancels), at the PDCP layer, the sequence numbering function/operation of the PDCP SDU (PDCP SN) is changed to that the first access network device separately associates each original data packet and each redundancy packet with one sequence number, or separately associates each encoded packet (a system packet and a redundancy packet) with one sequence number.

In a possible implementation solution, that the first access network device performs network coding processing on the first data to generate an encoded packet includes: The encoded packet includes an encoded packet header, and the encoded packet header performs integrity protection processing, but does not perform ciphering processing. According to the foregoing method, changes to a standard are reduced.

The encoded packet may include a system packet and a redundancy packet, or include only a redundancy packet. The system packet and the redundancy packet include encoded packet headers. For a solution in which the NC function is located at the PDCP layer, that is, the first access network device newly introduces an encoded packet header between a conventional PDCP header field and SDAP header field, and the first access network device performs integrity protection processing and ciphering processing on each system packet and/or redundancy packet. The first access network device may perform the integrity protection processing on an encoded packet header of each system packet and/or redundancy packet, but does not perform the ciphering processing.

According to a second aspect, an embodiment of this application provides a configuration method for a network coding function, where the method is applied to a communication system, and the communication system includes a first access network device and a terminal device. The method includes: The terminal device sends first capability information to the first access network device, where the first capability information indicates a network coding capability supported by the terminal device, and the first capability information includes one or more of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, where the code block is a set of one or more of the original data packets. The terminal device receives the first configuration information from the first access network device, where the first configuration information indicates the terminal device to configure a network coding function, and the first configuration information includes one or more of the following: a network coding type, a size of a system packet, a size of an original data packet, a quantity of system packets, a quantity of original data packets, a quantity of redundancy packets, selection of a coding coefficient, a convolution depth, or indication information for activating the network coding function.

In some embodiments of this application, the NC function is implemented on the first access network device. Information needed for the terminal device to perform network coding and/or network decoding is configured by the first access network device, to enable network coding and decoding between the first access network device and the terminal device to be possible. After the NC function is introduced to an access layer, both latency performance and spectral efficiency performance are considered by transmitting an encoded packet. The first access network device may flexibly adjust a quantity of to-be-sent encoded packets based on quality of an air interface link, to ensure that the terminal device can successfully perform decoding, reducing a data transmission latency while ensuring service transmission reliability.

In a possible implementation, the terminal device sends network coding feedback information to the first access network device, where the network coding feedback information includes one or more of the following information:
  a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

The terminal device sends, based on a status of received encoded packets, the network coding feedback information to the first access network device. Correspondingly, the first access network device receives the network coding feedback information sent by the terminal device. The network coding feedback information includes at least one of the following: a quantity of redundancy packets requested by the terminal device, a quantity of encoded packets incorrectly received by the terminal device, or a quantity of encoded packets correctly received by the terminal device. The quantity of redundancy packets requested by the terminal device is information about a quantity of redundancy packets that further need to be received by the terminal device to successfully perform decoding (that is, recovering original data).

In some embodiments of this application, the terminal device sends the network coding feedback information to the first access network device, to notify the first access network device of a current decoding status of the terminal device. In this way, the first access network device flexibly adjusts the quantity of to-be-sent encoded packets based on the network coding feedback information, to ensure that the terminal device can successfully perform decoding, reducing a data transmission latency while ensuring service transmission reliability.

According to a third aspect, this application provides a communication apparatus. The communication apparatus may be a device, for example, an access network device, or a chip used in a device, for example, a chip in an access network device. The communication apparatus includes a module configured to perform the method described in any one of the first aspect or the possible implementations of the first aspect.

According to a fourth aspect, this application provides a communication apparatus. The communication apparatus may be a device, for example, a terminal device, or a chip used in a device, for example, a chip in a terminal device. The communication apparatus includes a module configured to perform the method described in any one of the second aspect or the possible implementations of the second aspect. According to a fifth aspect, this application provides a communication apparatus. The communication apparatus may include a processor. The processor may be coupled to a memory, and optionally includes the memory. The processor and the memory may be units that are physically independent of each other, or the memory may be integrated with the processor. The communication apparatus may include a transceiver. The memory is configured to store a program. The transceiver circuit is configured to receive and send various data packets or signals. The program includes program instructions. When the processor runs the program instructions, the communication apparatus is enabled to perform the communication method described in any one of the first aspect, the second aspect, or the possible implementations of either the first aspect or the second aspect. The transceiver may be a radio frequency module in the communication apparatus, a combination of the radio frequency module and an antenna, or an input/output interface of a chip or a circuit. The communication apparatus may be a device, for example, an access network device or a terminal device, or a chip used for a device, for example, a chip used for an access network device or a terminal device.

According to a sixth aspect, this application provides a readable storage medium, where the readable storage medium stores program instructions. When the program instructions are run on a processor, an apparatus including the processor is enabled to perform the communication method described in any one of the first aspect, the second aspect, or the possible implementations of either the first aspect or the second aspect.

According to a seventh aspect, this application provides a program product including program instructions. When the program product is run, the communication method described in any one of the first aspect, the second aspect, or the possible implementations of either the first aspect or the second aspect is performed.

According to an eighth aspect, this application provides a communication system. The communication system includes the communication apparatus that performs the method according to any one of the first aspect or the implementations of the first aspect and the communication apparatus that performs the method according to any one of the second aspect or the implementations of the second aspect.

The solutions provided in the third aspect to the eighth aspect are used to implement or cooperate to implement the method provided in the first aspect or the second aspect, and therefore, may achieve beneficial effects the same as or corresponding to those in the first aspect or the second aspect. Details are not described herein again.

DESCRIPTION OF EMBODIMENTS

In the specification, claims, and accompanying drawings of this application, the terms "first", "second", and the like are intended to distinguish between similar objects but do not necessarily indicate an order or sequence. It should be understood that the terms used in such a way are interchangeable in appropriate circumstances, which is merely a discrimination manner that is used when objects having a same attribute are described in embodiments of this application. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, system, product, or device.

To facilitate understanding of a configuration method for a network coding function provided in embodiments of this application, the following describes a system architecture and an application scenario of the configuration method for the network coding function provided in embodiments of this application. It may be understood that the system architecture and the application scenario described in embodiments of this application are intended to describe technical solutions in embodiments of this application more clearly, and do not constitute a limitation on the technical solutions provided in embodiments of this application.

Figures 1A, 1B, 1C, 1D, 1E:
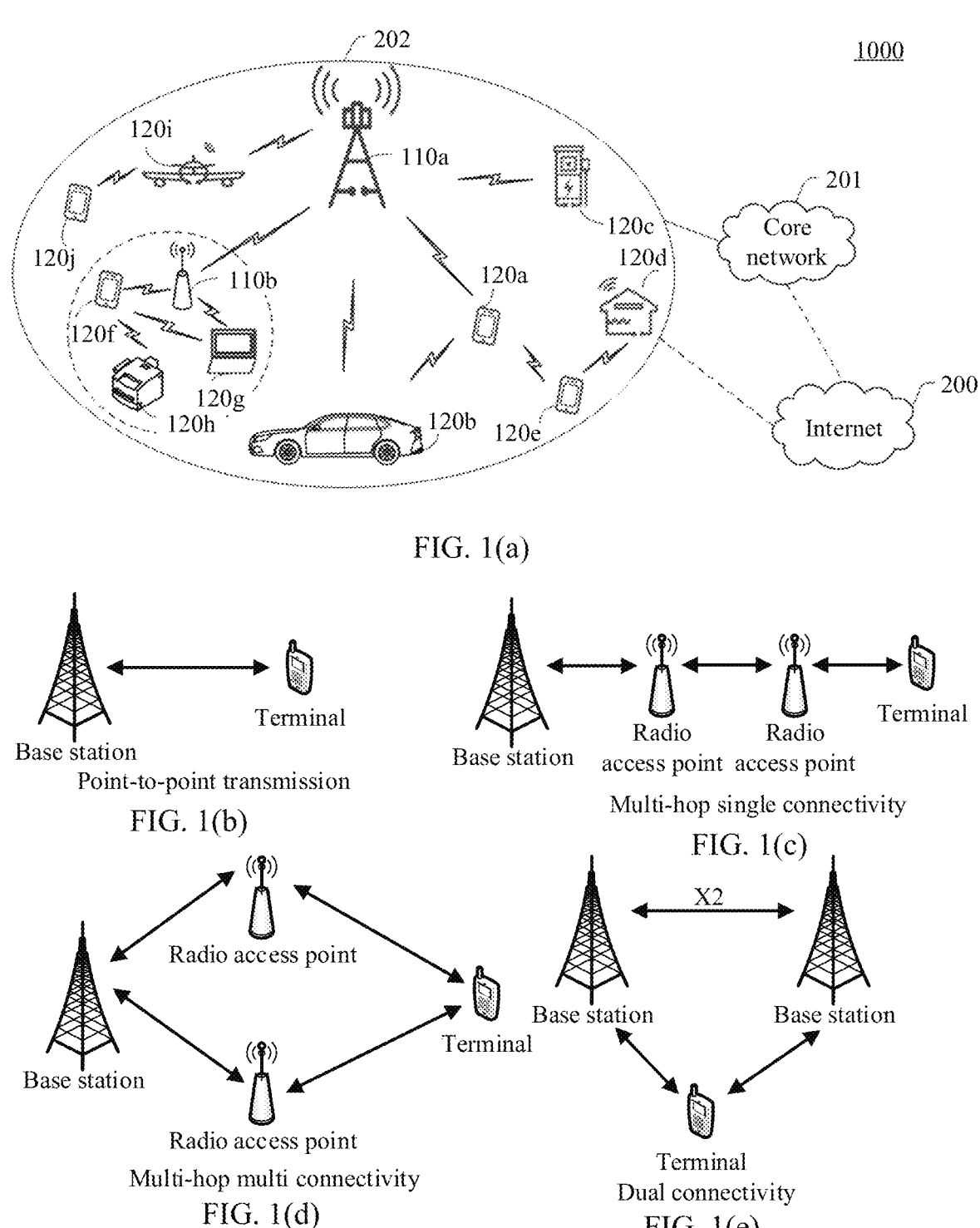
FIG. 1(a) is a schematic diagram of an architecture of a communication system 1000 applied to an embodiment of this application.
FIG. 1(b) to FIG. 1(e) are schematic diagrams of architectures of a communication system according to an embodiment of this application.

FIG. 1(a) is a schematic diagram of an architecture of a communication system 1000 applied to an embodiment of this application. As shown in FIG. 1(a), the communication system includes a radio access network 202 and a core network 201. Optionally, the communication system 1000 may further include the internet 200. The radio access network 202 may include at least one radio access network device (110a and 110b in FIG. 1(a)), and may further include at least one terminal (120*a* to 120*j* in FIG. 1(*a*)). The terminal is connected to the radio access network device in a wireless manner, and the radio access network device is connected to a core network in a wireless or wired manner. The core network device and the radio access network device may be independent and different physical devices, or functions of the core network device and logical functions of the radio access network device are integrated into a same physical device, or a part of functions of the core network device and a part of functions of the radio access network device are integrated into one physical device. Terminals may be connected to each other in a wired or wireless manner, and radio access network devices may be connected to each other in a wired or wireless manner. FIG. 1(*a*) is merely a schematic diagram. The communication system may further include another network device, for example, may further include a radio relay device and a radio backhaul device, which are not shown in FIG. 1(*a*).

The radio access network device may be a device having a wireless transceiver function. The radio access network device may be a device providing a wireless communication function service, and is usually located on a network side. The radio access network device includes but is not limited to: a next generation base station (gNodeB, gNB) in a 5th generation (5G) communication system, a next generation base station in a 6th generation (6G) mobile communication system, a base station in a future mobile communication system, an access node or the like in a Wi-Fi system, an evolved nodeB (eNB) in an LTE system, a radio network controller (RNC), a nodeB (NB), a base station controller (BSC), a home base station (for example, a home evolved NodeB, or a home NodeB. HNB), a radio access point, a baseband unit (BBU), a transmission reception point (TRP), a transmitting point (TP), a base transceiver station (BTS), and the like. In a network structure, the access network device may include a central unit (CU) node, a distributed unit (DU) node, a RAN device including a CU node and a DU node, or a RAN device including a control plane CU node, a user plane CU node, and a DU node. The access network device may serve a cell. User equipment communicates with a base station by using a transmission resource (for example, a frequency domain resource, or in other words, a frequency spectrum resource) used by the cell. The cell may be a cell corresponding to the base station (for example, a base station). The cell may belong to a macro base station, or a base station corresponding to a small cell. The small cell herein may include a metro cell, a micro cell, a pico cell, a femto cell, or the like. These small cells feature small coverage and low transmit power, and are applicable to providing a high-speed data transmission service. The radio access network device may be a macro base station (for example, 110*a* in FIG. 1(*a*)), or may be a micro base station or an indoor station (for example, 110*b* in FIG. 1(*a*)), or may be further a relay node or a donor node, a device providing a wireless communication service for user equipment in a V2X communication system, a radio controller in a cloud radio access network (CRAN) scenario, a relay station, a vehicle-mounted device, a wearable device, a network device in a future evolved network, or the like. A specific technology and a specific device form that are used by the radio access network device are not limited in embodiments of this application. For ease of description, the following uses an example in which the radio access network device is a base station for description.

The terminal may also be referred to as a terminal device, user equipment (UE), a mobile station (MS), a mobile terminal (MT), or the like. The terminal may be an entity that is on a user side and that is configured to receive or transmit a signal, for example, a mobile phone. The terminal device may be UE. The UE includes a handheld device, a vehicle-mounted device, a wearable device, or a computing device having a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like. The terminal may be widely used in various scenarios, for example, device-to-device (D2D), vehicle to everything (V2X) communication, machine-type communication (MTC), internet of things (IOT), virtual reality, augmented reality, industrial control, self-driving, remote medical, smart grid, smart furniture, smart office, smart wearable, smart transportation, a smart city, and the like. The terminal may be a mobile phone, a tablet computer, a computer having a wireless transceiver function, a wearable device, a vehicle, an unmanned aerial vehicle, a helicopter, an airplane, a ship, a robot, a robot arm, a smart home device, or the like. In embodiments of this application, an apparatus for implementing a function of the terminal may be a terminal, or may be an apparatus that can support the terminal in implementing the function, for example, a chip system, a communication module, a modem, or the like. The apparatus may be installed in the terminal. In embodiments of this application, the chip system may include a chip, or may include a chip and another discrete device. In the technical solutions provided in embodiments of this application, the technical solutions provided in embodiments of this application are described by using an example in which the apparatus for implementing the function of the terminal is a terminal and the terminal is UE. A specific technology and a specific device form that are used by the terminal device are not limited in embodiments of this application.

Optionally: the UE may alternatively act as a base station. For example, the UE may act as a scheduling entity that provides sidelink signals between UEs in V2X, D2D, peer-to-peer (P2P), or the like.

The base station and the terminal may be located at a fixed location, or may be mobile. The base station and the terminal may be deployed on land, including an indoor or outdoor scenario, a handheld scenario, or an in-vehicle scenario, may be deployed on water, or may be deployed on an airplane, in a balloon, or on a satellite in air. Application scenarios of the base station and the terminal are not limited in embodiments of this application.

Roles of the base station and the terminal may be relative. For example, a helicopter or an unmanned aerial vehicle 120*i* in FIG. 1(*a*) may be configured as a mobile base station. For a terminal 120*j* that accesses the radio access network 202 through 120*i*, the terminal 120*i* is a base station. However, for a base station 110*a*, 120*i* is a terminal. In other words. 110*a* and 120*i* communicate with each other by using a wireless air interface protocol. Alternatively. 110*a* and 120*i* may communicate with each other by using an interface protocol between base stations. In this case, for 110*a*, 120*i* is also a base station. Therefore, the base station and the terminal may be collectively referred to as communication apparatuses. 110*a*. 110*b*, and 120*a* to 120*j* in FIG. 1(*a*) may be referred to as communication apparatuses having respective corresponding functions, for example, a communication apparatus having a base station function or a communication apparatus having a terminal function.

Communication between a base station and a terminal, between base stations, and between terminals may be performed by using a licensed spectrum, may be performed by using an unlicensed spectrum, or may be performed by using both a licensed spectrum and an unlicensed spectrum. The communication may be performed by using a spectrum below 6 gigahertz. (GHz), may be performed by using a spectrum above 6 GHZ, or may be performed by using both a spectrum below 6 GHZ and a spectrum above 6 GHZ. A spectrum resource for wireless communication is not limited in embodiments of this application.

In embodiments of this application, the function of the base station may alternatively be performed by a module (for example, a chip) in the base station, or may alternatively be performed by a control subsystem including the base station function. The control subsystem including the base station function herein may be a control center in the foregoing application scenarios of the terminal such as a smart grid, industrial control, smart transportation, and a smart city: The function of the terminal may alternatively be performed by a module (for example, a chip or a modem) in the terminal, or may alternatively be performed by an apparatus including the terminal function. It may be understood that the communication system shown in FIG. 1(a) is merely intended to describe the technical solutions in embodiments of this application more clearly, and does not constitute a limitation on the technical solutions provided in embodiments of this application. For example, the communication system may further include another device such as a network control device (not shown in FIG. 1(a)). The network control device may include an operation, administration, and maintenance (OAM) system. The OAM system may also be referred to as a network management system. The network control device may manage the access network device and the core network device.

The core network 201 may be an access and mobility management function (AMF) entity; and has functions of access control, mobility management, attach and detach, gateway selection, and the like. Alternatively, the core network device is a user plane function (UPF) entity, and has functions of data routing/forwarding, quality of service (QoS) flow processing, and the like. It should be noted that the core network device may alternatively be another device in the core network. This is not specifically limited in this application.

Further, this application may be applied to a plurality of communication scenarios, for example, a point-to-point transmission scenario between a base station and a terminal or between terminals (for example, a point-to-point transmission scenario between the base station and the terminal as shown in FIG. 1(b)), a multi-hop (as shown in FIG. 1(c) and FIG. 1(d)) transmission scenario between a base station and a terminal, and dual-connectivity (DC) (as shown in FIG. 1(e)) scenario, a multi-connectivity scenario, or another scenario. It should be noted that the foregoing communication application scenarios are merely examples, and do not constitute a limitation. Particularly, from a perspective of a service, embodiments of this application are applicable to a plurality of service scenarios, for example, a data coding scenario in an extended reality (XR) service, an uplink large-capacity scenario, and the like. In addition, FIG. 1(a) to FIG. 1(f) do not impose a limitation on a network architecture applicable to this application, and uplink, downlink, access link, backhaul link, or sidelink transmission or another type of transmission is not limited in this application.

Figure 1F:
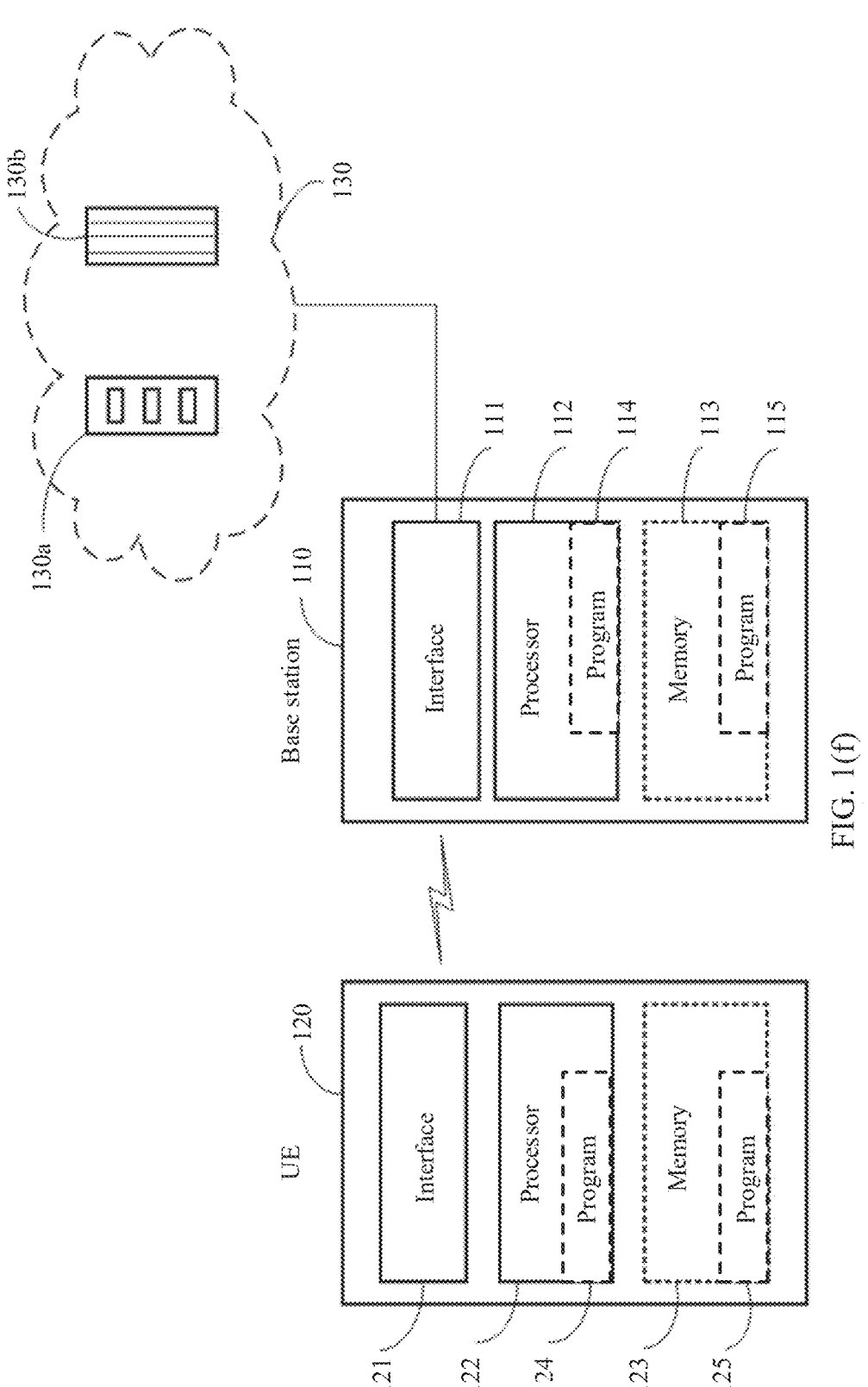
FIG. 1(f) is a simplified schematic diagram of a communication system according to an embodiment of this application.

FIG. 1(f) is a simplified schematic diagram of a communication system according to an embodiment of this application. For simplicity, FIG. 1(f) shows only a base station 110, UE 120, and a network 130. The base station 110 includes an interface 111 and a processor 112. The processor 112 may optionally store a program 114. The base station 110 may optionally include a memory 113. The memory 113 may optionally store a program 115. The UE 120 includes an interface 121 and a processor 122. The processor 122 may optionally store a program 124. The UE 120 may optionally include a memory 123. The memory 123 may optionally store a program 125. These components work together to provide various functions described in this application. For example, the processor 112 and the interface 121 work together to provide a wireless connection between the base station 110 and the UE 120. The processor 122 and the interface 121 work together to implement downlink transmission and/or uplink transmission for the UE 120.

The network 130 may include one or more network nodes 130a and 130b to provide a core network function. The network nodes 130a and 130b may be 5G core network nodes, or core network nodes of an earlier generation (for example, 4G, 3G, or 2G). For example, the network nodes 130a and 130b may be access management function entities (AMFs), mobility management entities (MMEs), and the like. The network 130 may further include one or more network nodes in a public switched telephone network (PSTN), a packet data network, an optical network, and an internet protocol (IP) network, or a wide area network (WAN), a local area network (LAN), a wireless local area network (WLAN), a wired network, a wireless network, a metropolitan area network, and another network, to enable communication between the UE 120 and/or the base station 110.

A processor (for example, the processor 112 and/or the processor 122) may include one or more processors and be implemented as a combination of computing devices. The processor (for example, the processor 112 and/or the processor 122) may separately include one or more of the following: a microprocessor, a microcontroller, a digital signal processor (DSP), a digital signal processing device (DSPD), an application-specific integrated circuit (ASIC), a field programmable gate array (FPGA), a programmable logic device (PLD), gating logic, transistor logic, a discrete hardware circuit, a processing circuit, or other proper hardware, firmware, and/or a combination of hardware and software, and is configured to perform various functions described in this application. The processor (for example, the processor 112 and/or the processor 122) may be a general-purpose processor or a dedicated processor. For example, the processor 112 and/or the processor 122 may be a baseband processor or a central processing unit. The baseband processor may be configured to process a communication protocol and communication data. The central processing unit may be configured to enable the base station 110 and/or the UE 120 to execute a software program and process data in the software program.

An interface (for example, the interface 111 and/or the interface 121) may include an interface for implementing communication with one or more computer devices (for example, UEs. BSs, and/or network nodes). In some embodiments, the interface may include a wire for coupling a wired connection, a pin for coupling a wireless transceiver, or a chip and/or a pin for a wireless connection. In some embodiments, the interface may include a transmitter, a receiver, a transceiver, and/or an antenna. The interface may be configured to use any available protocol (for example, a 3GPP standard).

A program in this application represents software in a broad sense. A non-limiting example of software is program code, a program, a subprogram, instructions, an instruction set, code, a code segment, a software module, an application, a software application, or the like. The program may run in the processor and/or a computer, to enable the base station 110 and/or the UE 120 to perform various functions and/or processes described in this application.

A memory (for example, the memory 113 and/or the memory 123) may store data manipulated by the processor 112 and the processor 122 when executing the software. The memory 113 and the memory 123 may be implemented by using any storage technology. For example, the memory may be any available storage medium that can be accessed by the processor and/or the computer. A non-limiting example of the storage medium includes: a RAM, a ROM, an EEPROM, a CD-ROM, removable media, a compact disc storage, a magnetic disk storage medium, a magnetic storage device, a flash memory, a register, a state memory, a remote mounted memory, a local or remote storage component, or any other medium that can carry or store software, data, or information and that can be accessed by the processor/computer.

The memory (for example, the memory 113 and/or the memory 123) and the processor (for example, the processor 112 and/or the processor 122) may be separately disposed or integrated. The memory may be connected to the processor, to enable the processor to read information from the memory, and store and/or write information into the memory. The memory 113 may be integrated into the processor 112. The memory 123 may be integrated into the processor 122. The processor (for example, the processor 113 and/or the processor 123) and the memory (for example, the processor 112 and/or the processor 122) may be disposed in an integrated circuit (for example, the integrated circuit may be disposed in UE, a base station, or another network node).

The following describes a possible segmentation structure of the access network device by using an example in which the radio access network 202 is a gNB. This is further applicable to another type of access network device.

Figure 2:
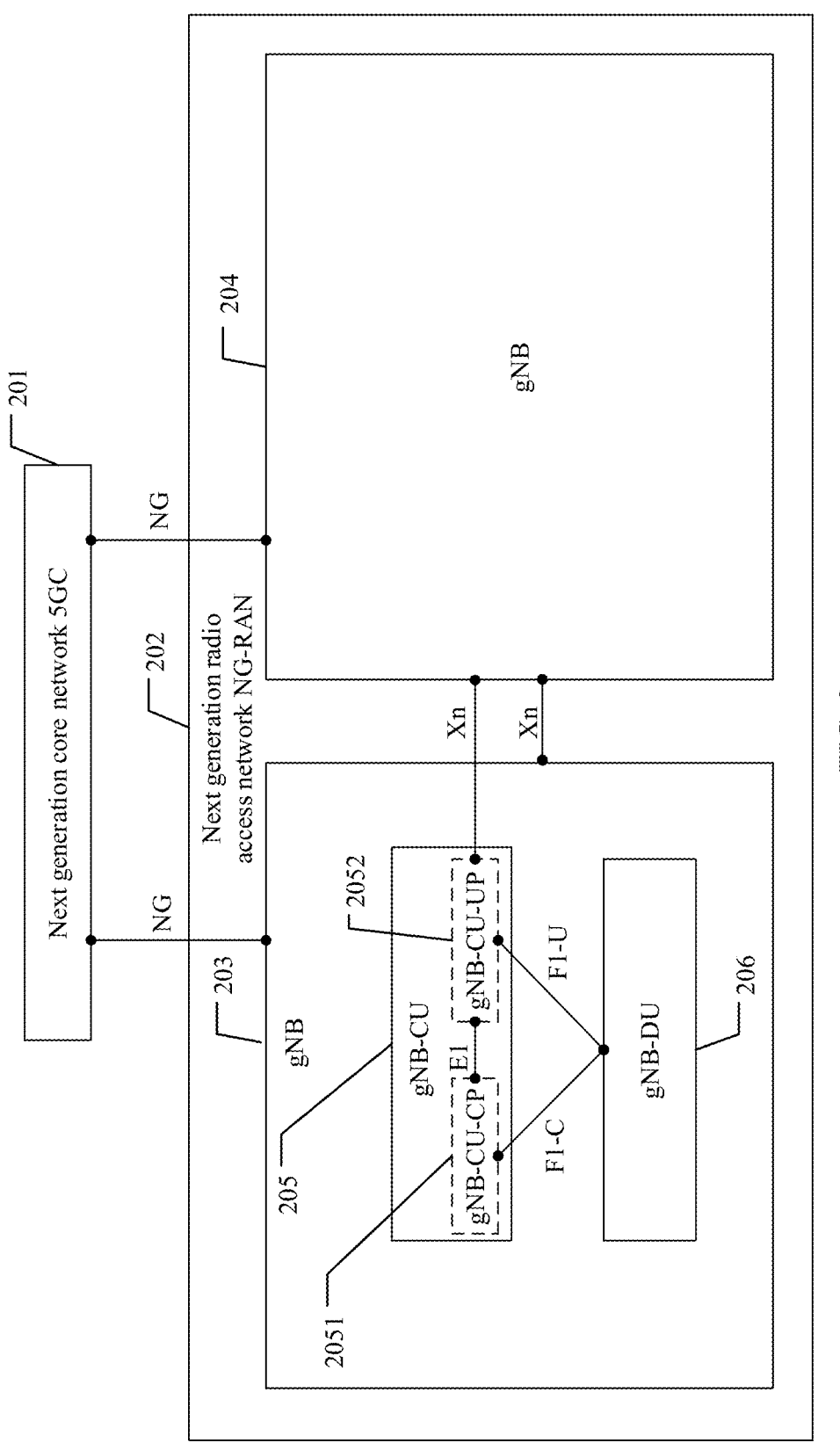
FIG. 2 is a schematic diagram of an architecture of another communication system according to an embodiment of this application.

Refer to FIG. 2. A core network device in a next generation core network 201 is connected to a gNB 203 and a gNB 204 in a next generation radio access network 202 through an NG interface, and the gNB 203 is connected to the gNB 204 through an Xn interface.

The following describes a possible segmentation structure of the gNB by using a gNB 1 as an example. The gNB may be divided into one CU (referred to as a gNB-CU 205 herein, and referred to as a CU for short in this application) and one or more DUs (referred to as a gNB-DU 206 herein, and referred to as a DU for short in this application) based on logical functions. The gNB-CU 205 and the gNB-DU 206 may be physically separate, or may alternatively be deployed together. This is not limited in embodiments of this application. The gNB-CU 205 and the gNB-DU 206 may be connected through an interface. For example, the gNB-CU 205 and the gNB-DU 206 may be connected through an F1 interface.

The gNB-CU 205 and the gNB-DU 206 may be divided based on a protocol layer of a wireless network. For example, functions of a radio resource control (RRC) layer, a service data adaptation protocol (SDAP) layer, and a packet data convergence protocol (PDCP) layer are deployed on the gNB-CU 205. Functions of a radio link control (RLC) layer, a media access control (MAC) layer, and a physical (PHY) layer are deployed on the gNB-DU 206. For example, for an NR communication system, the gNB-CU 205 includes an RRC layer, an SDAP layer, and a PDCP layer of a gNB 203, and the gNB-DU 206 includes an RLC layer, a MAC layer, and a PHY layer of the gNB 203.

It may be understood that the foregoing manner of dividing the gNB-CU 205 and the gNB-DU 206 based on the protocol layer of the wireless network is merely an example. During actual application, the gNB-CU 205 and the gNB-DU 206 may alternatively be divided in another manner. This is not limited in embodiments of this application.

Further, the gNB-CU 205 may include one CU control plane (CU-CP) (referred to as a gNB-CU-CP 2051 herein) and one or more CU user planes (CU-UPs) (referred to as a gNB-CU-UP 2052 herein). In FIG. 2, an example in which the gNB-CU 205 includes one gNB-CU-CP 2051 and one gNB-CU-UP 2052 is used for description. The gNB-CU-CP 2051 and the gNB-CU-UP 2052 may be understood as division of the gNB-CU 205 from a perspective of a logical function. The gNB-CU-CP 2051 and the gNB-CU-UP 2052 may be divided based on the protocol layer of the wireless network. For example, control plane functions of the RRC layer and the PDCP layer are set in the gNB-CU-CP 2051, and a function of an SDAP layer and a user plane function of the PDCP layer are set in the gNB-CU-UP 2052.

The gNB-CU-CP 2051 and the gNB-CU-UP 2052 may be connected through an interface. For example, as shown in FIG. 2, the gNB-CU-CP 2051 and the gNB-CU-UP 2052 are connected through an E1 interface. The gNB-CU-CP 2051 and the gNB-DU 206 may be connected through an F1 control plane interface (F1-C). The gNB-CU-UP 2052 and the gNB-DU 206 may be connected through an F1 user plane interface (F1-U).

It may be understood that the foregoing manner of dividing the gNB-CU-CP 2051 and the gNB-CU-UP 2052 based on the protocol layer of the wireless network is merely an example. During actual application, the gNB-CU-CP 2051 and the gNB-CU-UP 2052 may alternatively be divided in another manner. This is not limited in embodiments of this application.

It may be understood that some embodiments of this application may be further applied to a relay system, and the relay system may be referred to as an integrated access and backhaul (IAB) system. In IAB, a relay node is referred to as an IAB node. The IAB node is divided based on functions, and may include a mobile terminal (MT) function and a DU function. An MT of the IAB node (IAB-MT for short) communicates with a parent node of the IAB-MT. A link for the IAB-MT to communicate with the parent node of the IAB-MT is referred to as a backhaul link. A DU of the IAB node (IAB-DU for short) communicates with a child node of the IAB-DU. The child node of the IAB-DU includes another IAB node or UE. When the child node of the IAB-DU is the another IAB node, a link for the IAB-DU to communicate with the child node of the IAB-DU is referred to as the backhaul link. When the child node of the IAB-DU is the UE, a link for the IAB-DU to communicate with the child node of the IAB-DU is referred to as an access link.

To better understand the technical solutions in embodiments of this application, the following describes some technical concepts in embodiments of this application.

(1) Network Coding (NC)

A network coding function in this application includes performing network coding on and adding an encoded packet header to an original data packet. The network coding may be implemented by using an encoder. An input of the encoder is K original data packets, and an output of the encoder is N encoded data packets (encoded packets for short), where both N and K are positive integers, and N is greater than K. The encoded packets include N-K (N minus K) redundancy packets and K system packets, or N redundancy packets (that is, the encoded packets are all redundancy packets and do not include the system packet). Content of a packet body of the system packet is consistent with content of the original data packet (in other words, the system packet includes the encoded packet header and the original data packet). Therefore, the system packet may alternatively be obtained by directly adding the encoded packet header to the original data packet without coding the original data packet by using the encoder. In this case, a coding coefficient of the system packet is equivalent to a unit vector. A coding coefficient of the redundancy packet is a non-unit vector. Based on an association between content of the redundancy packet and content of an original data packet for generating the redundancy packet, a receive end may decode the redundancy packet together with a successfully received original data packet or system packet, to recover an unsuccessfully received original data packet. Based on characteristics of the network coding, the original data packets have a same packet size. Further, the network coding function may further include a process of performing processing on an original data unit, for example, a service data unit (SDU) or a protocol data unit (PDU), to obtain original data packets of an equal size. The processing may include one or more of segmentation, concatenation, or padding. A network coding function of a transmit end is corresponding to a network decoding function of the receive end. The receive end may recover the K original data packets by decoding at least K successfully received encoded packets together. A protocol layer having the network coding function or a decoding function corresponding to network coding is referred to as a network coding/decoding layer. In this application, the network coding/decoding layer is referred to as a network coding layer for short, that is, the protocol layer having the network coding function is referred to as the network coding layer.

The network coding layer may be a protocol layer such as an RRC layer, an SDAP layer, a PDCP layer, a backhaul adaptation protocol (BAP) layer, an RLC) layer, a MAC layer, or a physical layer (PHY). Alternatively, the network coding layer may be a new protocol layer other than a PHY layer, a MAC layer, an RLC layer, a BAP layer, a PDC-Player, an SDAP layer, and an RRC layer, or may be a network coding layer added above a PDCP layer (for example, in 5G NR, a network coding layer is added between the PDCP layer and an SDAP layer), a network coding layer added above a BAP layer, a network coding layer added between a PDCP layer and an RLC layer, a network coding layer added between an RLC layer and a MAC layer, or a network coding layer added between a MAC layer and a PHY layer.

Common network coding solutions include block codes and convolutional codes. Solutions of the block codes include one or more of the following: random linear network coding (RLNC), deterministic linear network coding (DLNC), a batch sparse code (BATS code), an erasure code, a fountain code, a maximum distance separable code (MDS code), a Luby transform (LT) code, a rapid tornado code, a RaptorQ code, a rateless code, a Reed-Solomon (RS) code, and the like. Solutions of the convolutional codes include one or more of the following: convolutional network coding (CNC), streaming coding, sliding window network coding, and the like.

The following describes two possible network coding procedures of the network coding function of the transmit end (a transmit for short).

A first possible network coding procedure is as follows.

Original data (the PDU or the SDU) is first obtained. The PDU is used as an example. One or more of processing such as segmentation, concatenation, or padding is performed on one or more PDUs to obtain original data packets of an equal size. The original data packets carry a correspondence between each original data packet and one or more PDUs corresponding to the original data packet. The carrying may be explicit carrying, for example, carrying a location mapping relationship between each original data packet and one or more PDUs corresponding to the original data packet. The carrying may alternatively be implicit carrying, for example, a correspondence between each original data packet and one or more PDUs corresponding to the original data packet is default. In this way, the receive end (a receive for short) may recover the PDU from the original data packet based on the correspondence.

Optionally, a packet header of each original data packet carries a correspondence between the original data packet and one or more PDUs corresponding to the original data packet. In this case, in a possible implementation, one or more of the foregoing processing such as the segmentation, the concatenation, or the padding is first performed on the PDU to obtain the original data, and then a packet header is added to the original data to obtain an original data packet of an equal size.

Optionally; the correspondence may be indicated through the segmentation and/or the concatenation of the one or more PDUs.

It may be understood that, when the original data is of an equal size, the foregoing step of obtaining the original data packets of the equal size by performing the one or more of processing such as the segmentation, the concatenation, or the padding on the one or more PDUs or SDUs may be skipped. That is, the PDUs or the SDUs are original data packets of an equal size.

Figure 3:
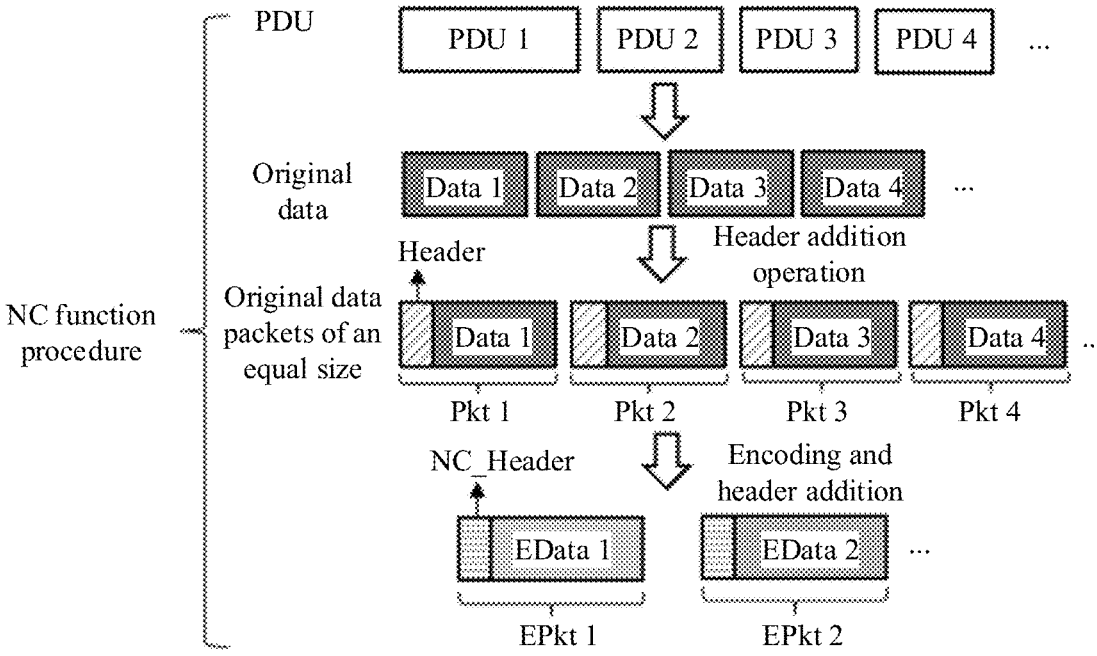
FIG. 3 is a schematic flowchart of a network coding function according to an embodiment of this application.
Figure 4:
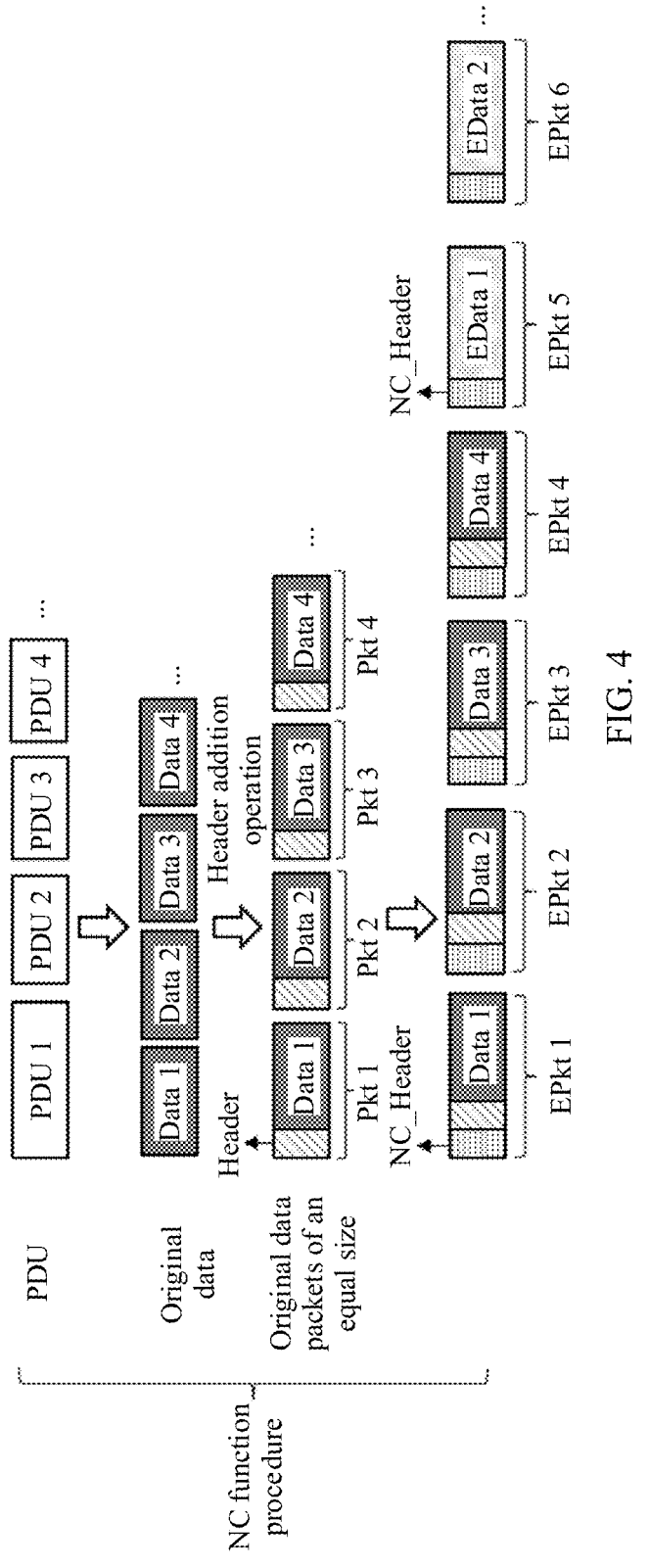
FIG. 4 is a schematic flowchart of another network coding function according to an embodiment of this application.

FIG. 3 and FIG. 4 use an example in which sizes of PDUs are unequal and the foregoing correspondence is carried by using a packet header. PDUs 1 to 4 are first processed to obtain original data Data 1 to 4. Herein, the processing on the PDUs may be one or more of operations such as the segmentation, the concatenation, or the padding. Size of the original data may be equal or unequal. Then, an operation of adding a packet header to the group of original data is performed to obtain K original data packets, that is, Pkts 1 to 4 in FIG. 3 and FIG. 4. The original data packets may be understood as data packets that are not encoded, and sizes of the original data packets are equal.

Then, a plurality of original data packets of the equal size are encoded.

The plurality of original data packets of the equal size may be encoded in any one of the three manners.

Manner 1 is shown in FIG. 3. A group of K original data packets are encoded, and encoded packet headers are added to the group of K original data packets, to obtain N-K encoded packets. The encoded packets herein may be referred to as checksum packets or redundancy packets, that is, the EPkt 1 and the EPkt 2 shown in FIG. 3. K is a positive integer, and N is a positive integer not less than K.

Through the foregoing operations, the transmit end finally sends the K original data packets and the N-K redundancy packets.

Manner 2 and manner 3 are shown in FIG. 4. The K original data packets are processed to obtain N encoded packets, for example, EPkts 1 to 6 in the figure. The encoded packets may be classified into system packets and checksum packets. The system packets may also be referred to as system data packets, and the checksum packets may be referred to as redundancy packets. The encoded packet header may include a coefficient factor field, and the coefficient factor field indicates that a coding coefficient of the encoded packet is obtained. The system packets (the EPkts 1 to 4) include encoded packet headers and packet bodies. Content of the packet bodies is consistent with content of the original data packets. A coefficient factor field included in the packet header is a unit vector. Therefore, a process of processing the original data packet to obtain the system packet may include the two manners of manner 2 and manner 3, where K is a positive integer, and N is a positive integer not less than K.

In manner 2, the system packets are generated by directly adding encoded packet headers to the original data packets, that is, encoding processing is not performed.

In manner 3, encoding processing is performed on the original data packets. The system packets may be generated after the original data packets are encoded by using the coefficient factor that is the unit vector and encoded packet headers are added to the original data packets.

A manner of generating the checksum packets in manner 2 is the same as that in manner 3, in which the checksum packets are generated by encoding the original data packets and adding the encoded packet headers to the original data packets. As shown in FIG. 4, the N-K checksum packets (for example, the EPkt 5 and the EPkt 6) are generated by encoding the K original data packets (for example, the Pkts 1 to 4) and adding encoded packet headers to the K original data packets. Packet body parts (EData 1 to EData 4) of the K original data packets are results of multiplying the K original data packets by a coefficient factor and then adding results obtained, where the coefficient factor is a non-unit vector.

Through the foregoing operations, the transmit end finally sends the N encoded packets.

Correspondingly, FIG. 3 is still used as an example. For the receive end, in manner 1, the receive end receives at least K data packets, and the K data packets are linearly independent, that is, a rank of a corresponding coefficient matrix is equal to K. In this way, the receive end may recover K original data packets through decoding, and then recover a corresponding PDU. All of the at least K data packets may be redundancy packets, or some of the at least K data packets are original data packets and some of the at least K data packets are redundancy packets. This is not limited herein. It may be understood that if the receive end receives K original data packets, decoding may not be performed.

In manner 2 and manner 3, FIG. 4 is still used as an example. The receive end receives at least K data packets, and the K data packets are linearly independent, that is, a rank of a corresponding coefficient matrix is equal to K. In this way, the receive end may recover K original data packets through decoding, and then recover a corresponding PDU. All of the at least K data packets may be redundancy packets, or some of the at least K data packets are system packets and some of the at least K data packets are redundancy packets. This is not limited herein. It may be understood that, if the receive end receives K system packets, decoding may not be performed, and only encoded packet header removal processing may be performed.

In the foregoing network coding function, the one or more of processing such as the segmentation, the concatenation, or the padding is performed on one or more pieces of original data to obtain original data packets of an equal size. The original data packets carry a correspondence between each original data packet and one or more pieces of original data corresponding to the original data packet.

A second possible network coding procedure is as follows.

In the second possible network coding procedure, one or more of processing of virtual segmentation, concatenation, or padding may be performed to obtain original data packets of an equal size. In this manner, original data and information about a header of each piece of original data are first mapped to a cache, where the cache may be a real cache or a virtual cache, and the information about the header of each piece of original data indicates a location of each piece of original data mapped to the cache. Then, a plurality of original data packets of an equal size are obtained from the cache. The plurality of original data packets of the equal size are then encoded to obtain encoded packets. A manner of obtaining the plurality of original data packets of the equal size from the cache may be preset, may be indicated by the transmit end to the receive end, or may be indicated by one party in a control position of two parties of data transmission to the other party after the manner is determined by the party. In this manner, the original data packet does not have a packet header. However, considering alignment with the description in the first manner, data segments of an equal size obtained from the cache in this solution are still referred to as the original data packet. It may be understood that the original data packet in this solution may also be referred to as an original data segment.

A manner of encoding the plurality of original data packets of the equal size to obtain the encoded packet is similar to manner 1 in the first possible implementation procedure. A difference from manner 1 lies in that after encoding, the transmit end sends one or more pieces of original data and information about headers of the one or more pieces of original data, and one or more redundancy packets obtained through encoding.

It may be understood that an input of the network coding layer may be one or more original data units, for example, original data, and an output of the network coding layer may be one or more PDUs. The one or more PDUs may include the foregoing original data packet and redundancy packet, or the foregoing system packet and redundancy packet. Outputting the one or more PDUs may be understood as outputting, through a communication interface, the one or more PDUs in a terminal device or a network device to a module that subsequently processes the one or more PDUs. It may be understood that the output in this application means to send a signal or data over an air interface, or output, in an apparatus (for example, the terminal device or the network device) through a communication interface, a signal or data to another module of the apparatus. Details are not described herein.

Figure 5:
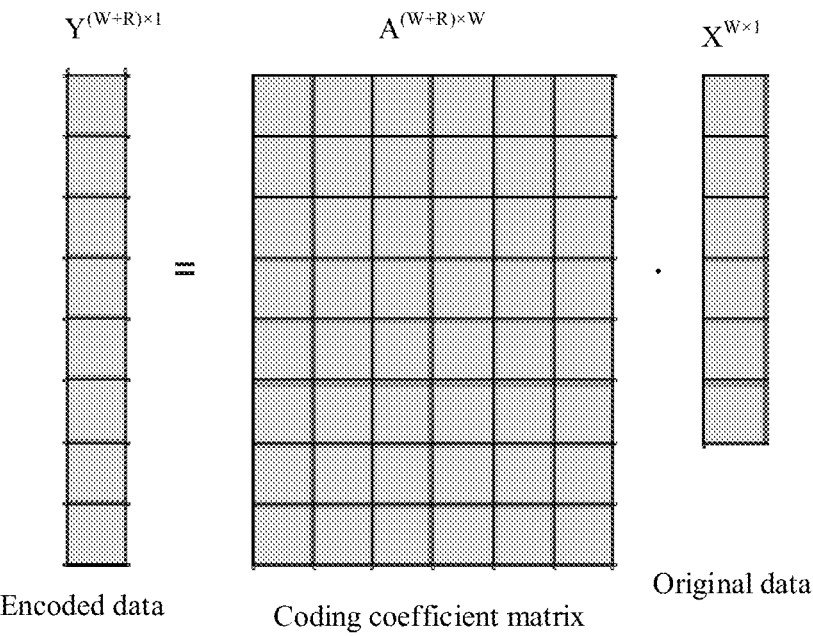
FIG. 5 is a schematic diagram of random linear network coding.

An example coding operation is briefly described by using the RLNC as an example. In an RLNC solution, one code block is used as one code unit, where one code block includes a plurality of original data packets of a same size, and a group of encoded packets may be obtained by forming a coding coefficient matrix to encode the original data packets. Generally, coefficients in the coding coefficient matrix are randomly selected in a finite field, such as a Galois field (GF). FIG. 5 is a schematic diagram of random linear network coding. As shown in FIG. 5, a size of the coding coefficient matrix (that is. $A^{(W+R)\times W}$ in FIG. 5) is (W+R)×W, that is, (W+R) rows and W columns. In this example, a row vector in the coding coefficient matrix is referred to as a coding coefficient vector. Network coding is performed on a code block ($X^{W\times 1}$ in FIG. 5) including W original data packets. (W+R) pieces of encoded data are obtained ($Y^{(W+R)\times 1}$ in FIG. 5), and a corresponding bit rate is represented as W/(W+R), or a corresponding redundancy rate is represented as R/(W+R). The coding coefficient matrix randomly selects a coefficient in a GF(q) field, where q represents a size of the Galois field, and a value of the Galois field is in a range of [0, q−1]. W and R are positive integers. It should be understood that, in the RLNC solution, there is no association between code blocks. In the solution, the network coding is performed on the code block including the W original data packets to obtain the W+R pieces of encoded data, that is, coding operations are performed on each independent code block, and redundancy (bit rate) of each code block may be the same or different. The encoding end/transmit end adds information about packet headers to both the W original data packets and the generated W+R pieces of encoded data, and then sends the W original data packets and the generated W+R pieces of encoded data. When the decoding end/receive end receives at least W correct encoded packets whose coding coefficient vectors are linearly independent, or when the decoding end/receive end receives at least W correct encoded packets and a rank of a coding coefficient matrix corresponding to the received encoded packets is W, decoding may be correctly performed and the W original data packets may be recovered. This is because information of several original data packets is integrated by the encoded data packets, and therefore, the receive end may use the encoded packets to recover the original data.

The following describes some terms in this application.

System packet: The system packet is obtained by adding an encoded packet header to encoded data generated by multiplying an original data packet by a coding coefficient that is a unit vector, or by directly adding an encoded packet header to an original data packet. For example, the original data packet uses a coding coefficient matrix with a size of (W+R)×W (that is, A (W+R)×W in FIG. 7) to perform network coding to obtain W+R pieces of encoded data, where the coding coefficient matrix may be written as $$\begin{bmatrix} I_W \\ G_{R\times W} \end{bmatrix}.$$

A submatrix $I_W$ formed by first W rows is a unit matrix and is formed by W unit vectors. In the obtained W+R pieces of encoded data, W pieces of encoded data corresponding to the $I_W$ part are data parts of W system packets, and the system packets are obtained by adding information about packet headers to the encoded data.

Redundancy packet: The redundancy packet is generated by performing network coding on an original data packet. A coding coefficient of the redundancy packet is a non-unit vector. For example, a coding coefficient matrix with a size of (W+R)×W (that is, A (W+R)×W in FIG. 7) is used to perform network coding to obtain W+R pieces of encoded data, where the coding coefficient matrix may be written as $$\begin{bmatrix} I_W \\ G_{R\times W} \end{bmatrix}.$$

In the W+R pieces of encoded data, R pieces of encoded data corresponding to a $G_{(R\times W)}$ part are data parts of R redundancy packets, and the redundancy packets are obtained by adding information about packet headers to the R pieces of encoded data. In embodiments of this application, the term "redundancy packet" may also be referred to as a "checksum packet", and the two may be used interchangeably.

Network coding packet: A term related to a block code. In the block code, the network coding packet is a set including a plurality of original data packets. For example, every W original data packets are grouped into one network coding packet for independent network coding, to obtain encoded data corresponding to the network coding packet. In embodiments of this application, the term "network coding packet" may also be referred to as a "network code block", a "coding packet", or a "code block".

Network coding window: The network coding window is a term used for a network coding solution including sliding a sliding window or for a convolutional code. The network coding window is a set including a plurality of original data packets, and original data packets included in different network coding windows may be partially the same. For example, W original data packets are obtained by sliding a window for L original data packets, where L and W are both positive integers and L is not less than W, and the W original data packets are used as a current network coding window: Network coding is performed on the W original data packets in the network coding window to obtain encoded data corresponding to the network coding window; and the network coding window is slid to obtain another group of original data packets as to-be-encoded data packets. It should be noted that a size of the network coding window may be different before and after the sliding. The size of the network coding window means a quantity of original data packets included in the network coding window: The original data packets included in the network coding window before and after the sliding may be partially the same. In embodiments of this application, the term "network coding window" may also be referred to as a "network coding sliding window", a "coding window", a "sliding window", or a "sliding window".

Network coding depth: The network coding window is a term used for the network coding solution including sliding the window or for the convolutional code. The network coding depth is a quantity of original data packets encoded in the network coding window; or the size of the network coding window. For example, the W original data packets are obtained by sliding the window for the L original data packets, where L and W are both positive integers and L is not less than W, and the W original data packets are used as the current network coding window: The network coding is performed on the W original data packets in the network coding window to obtain the encoded data corresponding to the network coding window: In this case, the current network coding depth is W. In embodiments of this application, the term "network coding depth" may also be referred to as a "network coding convolution depth", a "coding depth", a "convolution depth", a "sliding window size", a "window size", or the like.

Network coding convolution depth: The network coding convolution depth is the same as the network coding depth.

Network coding sliding window: The network coding sliding window is the same as the network coding window.

Finite field: The finite field is further referred to as a Galois field, and is a field including only a limited quantity of elements. Addition, subtraction, multiplication, and division operations may be performed on the finite field, and results of the addition, subtraction, multiplication, and division operations do not exceed a set of the field.

Decoding status corresponding to network coding: The decoding status indicates a success rate and/or a failure rate of decoding corresponding to a network coding packet or a network coding sliding window in a period of time. When all original data packets in the network coding packet or the network coding sliding window are successfully decoded, the network coding packet or the network coding sliding window is successfully decoded. Otherwise, when not all original data packets in the network coding packet or the network coding sliding window are successfully decoded, the network coding packet or the network coding sliding window is failed to be decoded. The success rate is a percentage of network coding packets successfully decoded in a period of time in all network coding packets, or a percentage of network coding sliding windows successfully decoded in a period of time in all network coding sliding windows. The failure rate is a percentage of network coding packets failed to be decoded in a period of time in all network coding packets, or a percentage of network coding sliding windows failed to be decoded in a period of time in all network coding sliding windows.

Bit rate of network coding: The bit rate of network coding means a percentage of a quantity of original data packets to a quantity of encoded packets. Alternatively, the bit rate of network coding means a percentage of a quantity of original data packets newly participating in coding in a current coding window to a total quantity of data packets corresponding to the current coding window, or a percentage of a quantity of original data packets included in a current network coding window to a quantity of encoded packets corresponding to the current network coding window: The quantity of original data packets newly participating in coding is a quantity of original data packets included after a sliding window is slid minus a quantity of original data packets that are included after the sliding window is slid and that are the same as those included before the sliding window is slid. The quantity of encoded packets is a sum of a quantity of system packets and a quantity of redundancy packets, or is a quantity of redundancy packets.

Network coding layer: The network coding layer is a protocol layer having a network coding function. The network coding layer may be one or more of protocol layers having a network coding function, such as an RRC layer, an SDAP layer, a PDCP layer, a BAP layer, an RLC layer, a MAC layer, or a PHY layer. A specific layer is not limited in this application. Alternatively, the network coding layer may be a new protocol layer other than the foregoing protocol layer. For example, the new protocol layer may be above the PDCP layer, above the BAP layer, between the PDCP layer and the RLC layer, between the RLC layer and the MAC layer, or between the MAC layer and the PHY layer. A location of the new protocol layer may not be limited in this application. In embodiments of this application, the term "network coding layer" may also be referred to as a "coding-decoding layer", a "network coding-decoding layer", a "network coding/decoding layer", or another name. This is not limited in this application.

Decoding corresponding to network coding: The decoding corresponding to network coding is an inverse process of network coding. An original data packet may be recovered, based on received encoded data, by multiplying an inverse matrix of a matrix corresponding to the encoded data by the encoded data.

A rank of a matrix corresponding to encoded data: The rank of the matrix corresponding to the encoded data may reflect a quantity of data packets whose coding coefficient vectors are linearly independent.

Protocol data unit (PDU): The PDU is a data unit transmitted between protocol entities. The PDU includes information from an upper layer and additional information about an entity at a current layer. The PDU is transmitted to a next lower layer.

Service data unit: The SDU is a data unit transmitted between protocol layers, and is data from or to an upper layer.

The size of the finite field for the coding operation is a vector size or a vector ratio of the finite field. The vector size of the finite field is a matrix size of a coefficient matrix G. Optionally, the size of the finite field for the coding operation may also be referred to as a size of a GF(q) field.

(2) Protocol Stack in a CU-DU Architecture

Figure 6:
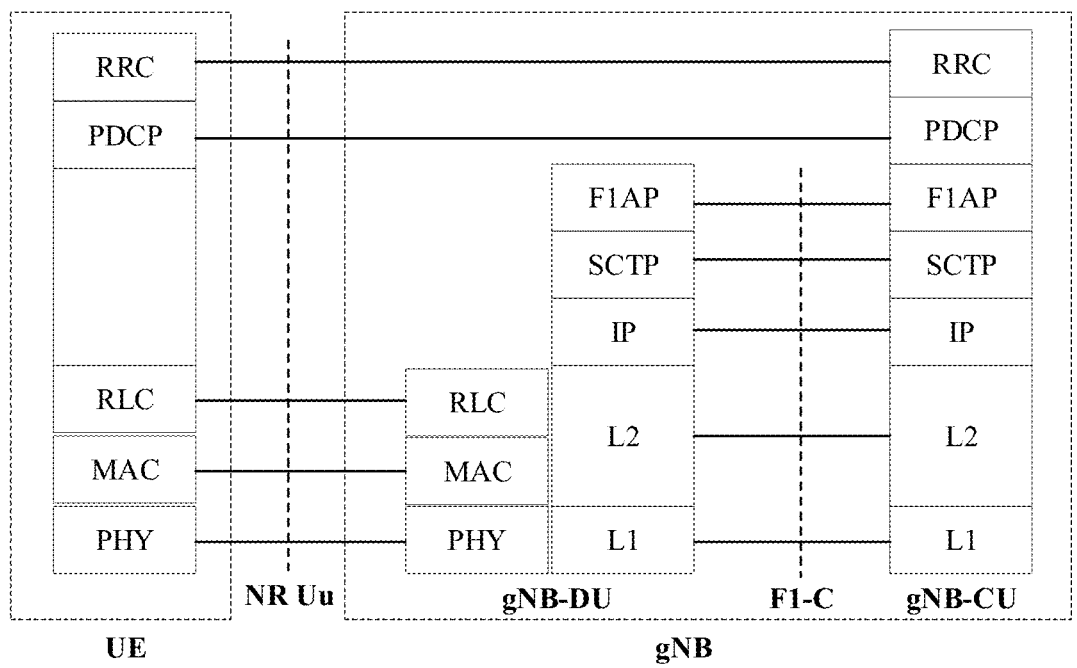
FIG. 6 is a schematic diagram of a control plane protocol stack in a central unit-distributed unit (CU-DU) architecture.

First, the control plane is described. FIG. 6 is a schematic diagram of a control plane protocol stack in a CU-DU architecture. In an uplink (UL) direction, a gNB-DU sends, to a gNB-CU, an RRC message generated by the UE by encapsulating the RRC message in an F1 application protocol (F1AP) message of the F1 interface. In a downlink (DL) direction, the gNB-CU sends, to the gNB-DU, the RRC message by encapsulating the RRC message in the F1AP message. The gNB-DU extracts the RRC message from the F1AP message, maps the RRC message to a signaling radio bearer (SRB) corresponding to a user to network interface-universal (Uu), and sends the RRC message to the UE, for example, mapping to an SRB 0, an SRB 1, or an SRB 2 and sending to the UE. The control plane protocol stack on the F1 interface between the gNB-CU and the gNB-DU further includes a stream control transmission protocol (SCTP) layer, an IP layer, a layer 2 (L2) layer, and a layer 1 (L1) layer.

Figure 7:
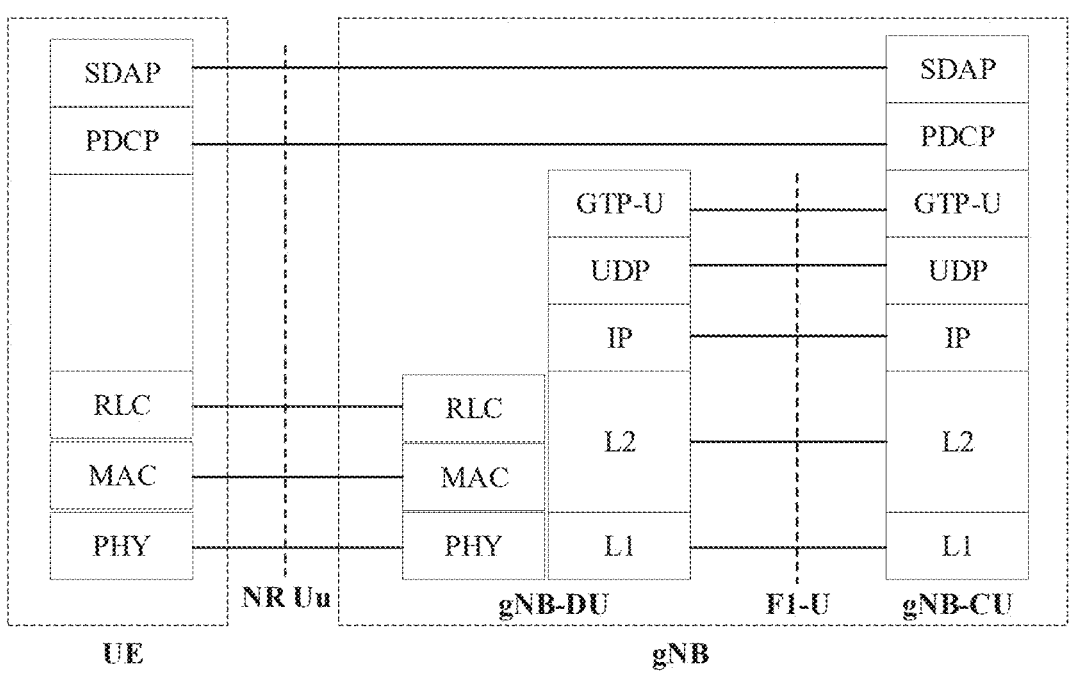
FIG. 7 is a schematic diagram of a user plane protocol stack in a CU-DU architecture.

Next, the user plane is described. FIG. 7 is a schematic diagram of a user plane protocol stack in a CU-DU architecture. In a UL direction, the gNB-DU maps a UE data packet received from a Uu interface data radio bearer (DRB) to a corresponding general packet radio service tunneling protocol (GPRS tunneling protocol, GTP-U) tunnel and sends the UE data packet to the gNB-CU. In a DL direction, the gNB-CU maps a UE data packet to a GTP-U tunnel and sends the UE data packet to the gNB-DU. The gNB-DU extracts the UE data packet from the GTP tunnel, and maps the UE data packet to a DRB corresponding to the Uu interface and sends the DRB to the UE. The user plane protocol stack on the F1 interface between the gNB-CU and the gNB-DU further includes a user datagram protocol (UDP) layer, an IP layer, an L2 layer, and an L1 layer.

Figure 8:
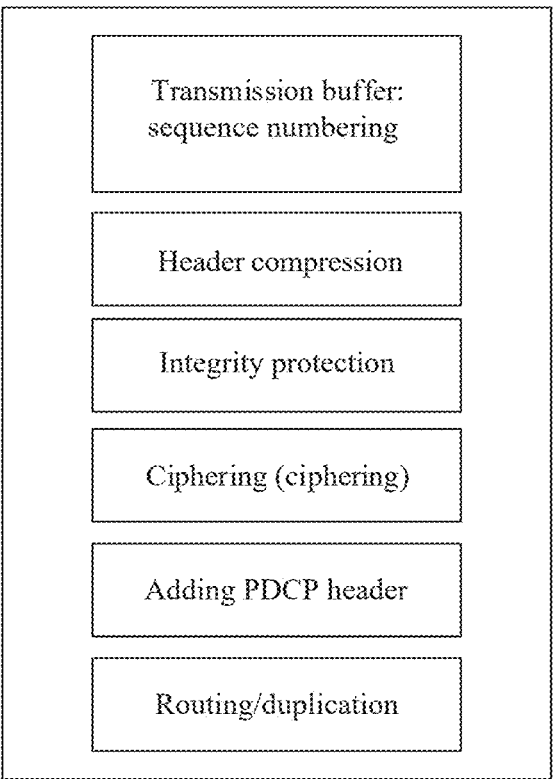
FIG. 8 is a schematic diagram of a function of a packet data convergence protocol (PDCP) layer.

For the PDCP layer, refer to FIG. 8. FIG. 8 is a schematic diagram of a function of a PDCP layer. The PDCP layer may include one or more of the following: transmission buffer: sequence numbering, header compression, integrity protection, ciphering, adding a PDCP header, and routing/duplication. The sequence numbering means to associate a PDCP SDU with one PDCP SN.

After receiving a PDCP service data unit from an upper layer (the SDAP layer or the RRC layer), the PDCP layer may associate the PDCP SDU with the PDCP sequence number (SN), and buffer the PDCP SDU in a buffer. Then, header compression processing, security processing, and PDCP header addition processing are sequentially performed on the PDCP SDU to generate a PDCP PDU. In conventional NR, the PDCP SDU and the PDCP PDU are in a one-to-one correspondence. A conventional PDCP status report feeds back a status of receiving the PDCP SDU by the receive end, so that the transmit end triggers retransmission of the PDCP SDU.

The security processing of PDCP SDU includes the following.

Figure 9:
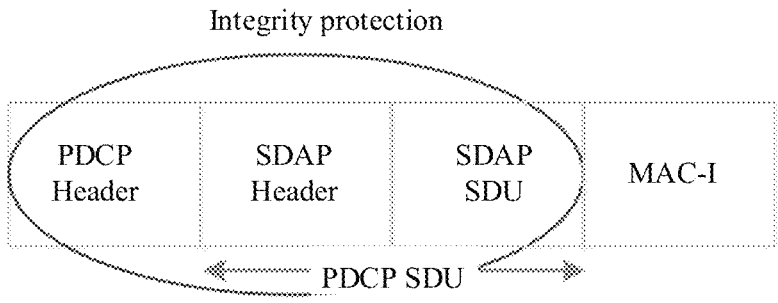
FIG. 9 is a schematic diagram of integrity protection according to an embodiment of this application.

Integrity protection. FIG. 9 is a schematic diagram of integrity protection according to an embodiment of this application. The integrity protection is performed on a PDCP header, an SDAP header, and an SDAP SDU, and an integrity checksum value (MAC-I) is generated and carried after the PDCP SDU.

Figure 10:
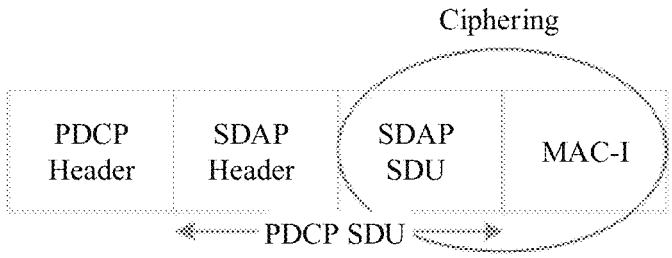
FIG. 10 is a schematic diagram of ciphering processing according to an embodiment of this application.

Ciphering. FIG. 10 is a schematic diagram of ciphering processing according to an embodiment of this application. As shown in FIG. 10, only the SDAP SDU and the MAC-I are ciphered, and the ciphering processing is not performed on the PDCP header, the SDAP header, and an SDAP control PDU.

(3) CU-DU Architecture

Embodiments of this application relate to a plurality of application scenarios, and the following provides descriptions with reference to the accompanying drawings.

Figure 11:
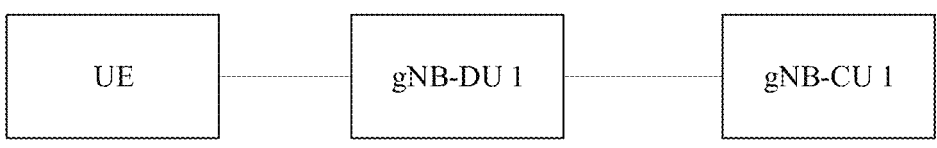
FIG. 11 is a schematic diagram of an application scenario according to an embodiment of this application.

(3.1) A communication system includes UE, a first DU, and a first CU. The first CU manages the first DU. The UE is connected to the first DU through the Uu interface, and the first DU is connected to the first CU through the F1 interface. FIG. 11 is a schematic diagram of an application scenario according to an embodiment of this application.

Figure 12:
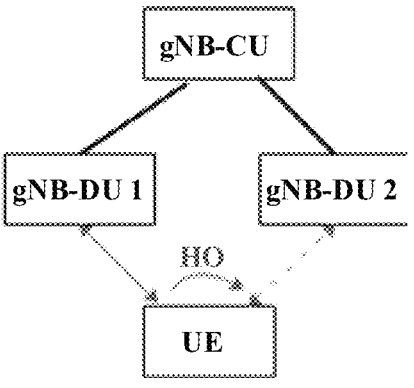
FIG. 12 is a schematic diagram of another application scenario according to an embodiment of this application.

(3.2) A communication system includes UE, a first DU (gNB-DU 1), a second DU (gNB-DU 2), and a first CU (gNB-CU 1). The first CU manages the first DU, and the first CU manages the second DU. The UE is handed over from the first DU to the second DU. FIG. 12 is a schematic diagram of another application scenario according to an embodiment of this application.

Figure 13A:
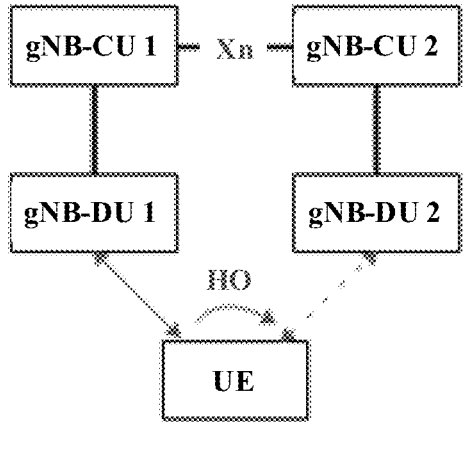
FIG. 13a is a schematic diagram of another application scenario according to an embodiment of this application.

(3.3) A communication system includes UE, a first DU (gNB-DU 1), a second DU (gNB-DU 2), a first CU (gNB-CU 1), and a second CU (gNB-CU 2). The first CU manages the first DU, and the second CU manages the second DU. The UE is handed over from the first DU to the second DU. The first CU is connected to the second CU through the Xn interface. FIG. 13a is a schematic diagram of another application scenario according to an embodiment of this application.

Figure 13B:
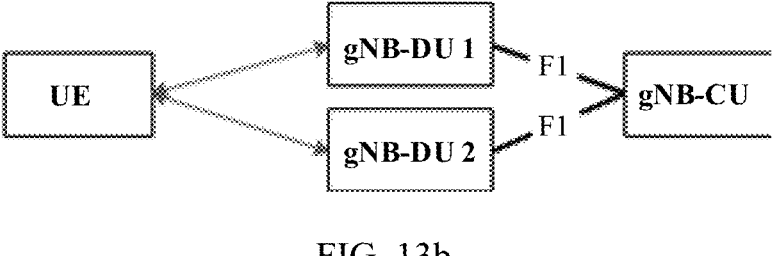
FIG. 13b is a schematic diagram of another application scenario according to an embodiment of this application.

(3.4) A communication system includes UE, a first DU (gNB-DU 1), a second DU (gNB-DU 2), and a first CU (gNB-CU 1). The UE is connected to the first CU separately through the first DU and the second DU. This scenario is also referred to as a dual-connectivity (DC) scenario. FIG. 13b is a schematic diagram of another application scenario according to an embodiment of this application.

In the foregoing scenario, the CU is used as a logical node, includes functions of an RRC layer, an SDAP layer, and a PDCP layer of the gNB, or includes functions of an RRC layer, an SDAP layer, and a PDCP layer of the en-gNB, and is configured to control one or more DUs. As a logical node, the DU includes functions of the RLC layer, the MAC layer, and the PHY layer of the gNB or the en-gNB. One DU supports one or more cells, but one cell can belong to only one DU.

In addition to the foregoing application scenarios of the CU-DU architecture, embodiments of this application are further applicable to application scenarios of a non-CU-DU architecture. For the communication system in (3.1), the base station gNB may replace the first DU and the first CU, and for the communication system in (3.3), the gNB 1 may replace the first DU and the first CU, and a gNB 2 may replace the second DU and the second CU.

Embodiments of this application are further applicable to an IAB scenario. The UE in the foregoing application scenarios may be replaced with an IAB node, and the base station gNB in the foregoing application scenarios is replaced with an IAB donor. Details are not described herein again.

Figure 14:
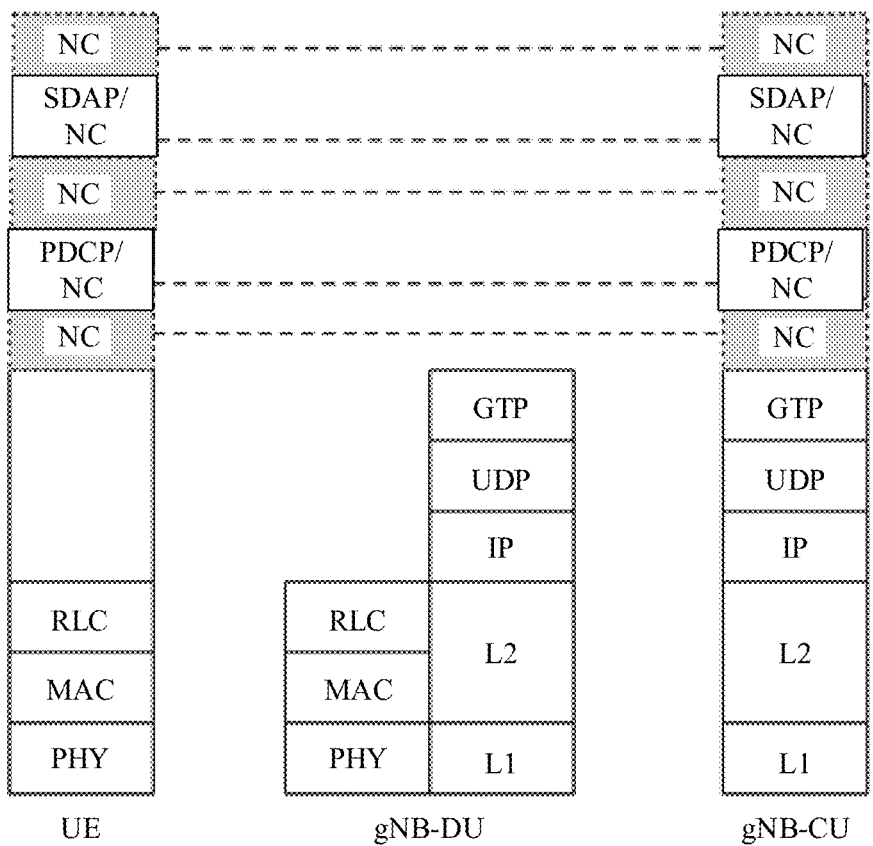
FIG. 14 is a schematic diagram of a deployment of network coding according to an embodiment of this application.

The following describes technical solutions provided in embodiments of this application. First, possible deployment solutions of a network coding (NC) function between protocol stacks of an access network are described. The following provides descriptions with reference to the accompanying drawings. FIG. 14 is a schematic diagram of a deployment of network coding according to an embodiment of this application. The term "network coding function" may also be referred to as an "NC function" for short, and the two may be used interchangeably. In some embodiments of this application, the NC function may be separately deployed on a gNB and UE. For downlink transmission, the gNB may perform the network coding function, and the UE may perform the network decoding function. For uplink transmission, the UE may perform the network coding function, and the gNB may perform the network decoding function. In some embodiments of this application, when the gNB considers a CU-DU separation architecture, the NC function may be separately deployed on a CU and the UE. For downlink transmission, the CU may perform the network coding function, and the UE may perform the network decoding function. For uplink transmission, the UE may perform the network coding function, and the CU may perform the network decoding function. In some embodiments of this application, the NC function may be further separately deployed on a DU and the UE. For downlink transmission, the DU may perform the network coding function, and the UE may perform the network decoding function. For uplink transmission, the UE may perform the network coding function, and the DU may perform the network decoding function.

Figure 15:
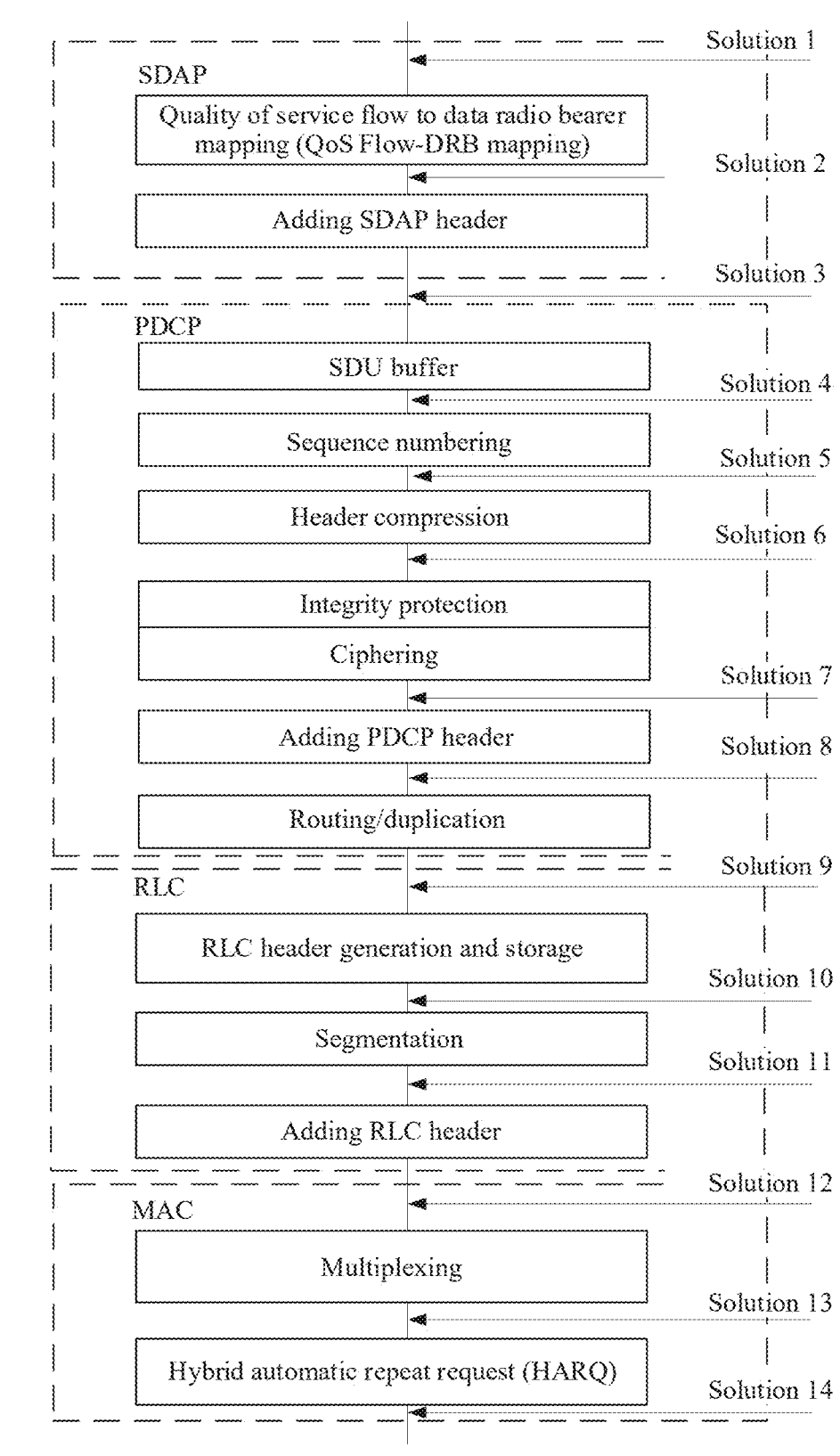
FIG. 15 is a schematic diagram of another deployment of network coding according to an embodiment of this application.

Based on FIG. 14, the possible deployment solutions of the NC in different protocol stacks of the access network are described in detail. FIG. 15 is a schematic diagram of another deployment of network coding according to an embodiment of this application. The following separately provides descriptions. For ease of description, the descriptions are provided from a perspective of a transmit end (the transmit end may be the gNB, the CU, the DU, or the UE).

Solution 1: The NC function is located above an SDAP layer.

For example, an NC layer is newly introduced above the SDAP layer. In this scenario, the transmit end performs an NC operation based on a granularity of a quality of service flow (QoS flow). QoS flows with a same QoS flow ID (QFI) may perform the NC operation. The QFI is a unique identifier of the QoS flow:

Solution 2: The NC function is located before an SDAP header addition function (adding an SDAP packet header), that is, the NC function is located at an SDAP layer.

Same as solution 1. In this scenario, the transmit end performs processing of the network coding function based on a granularity of a QoS flow:

Solution 3: The NC function is located between an SDAP layer and a PDCP layer.

For example, an NC layer is newly introduced between the SDAP layer and the PDCP layer. In this scenario, the transmit end may perform processing of the network coding function based on a granularity of a QoS flow, or may perform processing of the network coding function based on a granularity of a DRB. Performing the processing of the network coding function based on the granularity of the DRB may mean performing the processing of the network coding function on different QoS flows mapped to a same DRB together.

Solution 4: The NC function is located before an SDU sequence numbering (SN) function (the NC function is located at a PDCP layer).

In this scenario, the transmit end performs processing of the network coding function based on a granularity of a DRB, that is, performs the processing of the network coding function for a PDCP service data unit.

Solution 5: The NC function is located between an SDU SN function and a header compression function (the NC function is located at a PDCP layer).

Same as solution 4. In this scenario, the transmit end performs processing of the network coding function based on a granularity of a DRB, that is, performs the processing of the network coding function for a PDCP SDU.

Solution 6: The NC function is located between a header compression function and an integrity protection function (the NC function is located at a PDCP layer).

In this scenario, the transmit end performs processing of the network coding function based on a granularity of a DRB, that is, performs the processing of the network coding function on data obtained after header compression processing is performed for a PDCP SDU.

Solution 7: The NC function is located between a ciphering function and a PDCP header addition function (the NC function is located at a PDCP layer).

In this scenario, the transmit end performs processing of the network coding function based on a granularity of a DRB, that is, performs the processing of the network coding function on data obtained after header compression and security processing (integrity protection and ciphering) are performed for a PDCP SDU.

Solution 8: The NC function is located between a PDCP header addition function and a routing function (the NC function is located at a PDCP layer).

In this scenario, the transmit end performs processing of the network coding function based on a granularity of a DRB, that is, performs the processing of the network coding function for a PDCP PDU.

Solution 9): The NC function is located between a PDCP layer and an RLC layer.

For example, an NC layer is newly introduced between the PDCP layer and the RLC layer. In this scenario, the transmit end performs processing of the network coding function based on a granularity of a DRB, that is, performs the processing of the network coding function for a PDCP PDU. When the gNB uses a CU-DU separation architecture, the NC function may be located on a gNB-CU (that is, the NC layer is newly introduced below a PDCP layer of the gNB-CU), or may be located on a gNB-DU (that is, the NC layer is newly introduced above an RLC layer of the gNB-DU).

Solution 10: The NC function is located before an RLC segmentation function (the NC function is located at an RLC layer).

In this scenario, the transmit end performs processing of the network coding function based on a granularity of a DRB, that is, performs the processing of the network coding function for an RLC SDU.

Solution 11: The NC function is located after an RLC segmentation function and before an RLC header addition function (the NC function is located at an RLC layer).

Same as solution 10, in this scenario, the transmit end performs processing of the network coding function based on a granularity of a DRB, that is, performs the processing of the network coding function on data obtained after segmentation processing is performed for an RLC SDU.

Solution 12: The NC function is located between an RLC layer and a MAC layer.

For example, an NC layer is newly introduced between the RLC layer and the MAC layer. In this scenario, the transmit end performs processing of the network coding function based on a granularity of a DRB, that is, performs the processing of the network coding function for an RLC PDU.

Solution 13: The NC function is located between a MAC multiplexing function and a HARQ function (the NC function is located at a MAC layer).

In this scenario, the transmit end performs processing of the network coding function on data obtained after multiplexing processing is performed for a MAC SDU.

Solution 14: The NC function is located below a MAC layer (the NC function may be located between the MAC layer and a PHY layer, or may be located at a PHY layer).

In this scenario, the transmit end performs processing of the network coding function for a MAC PDU or a code block (CB).

In some embodiments of this application, the possible deployment solutions of the NC function between various protocol stacks of the access network are mainly protected, to ensure a possibility that the NC function is implemented in the access network.

With reference to embodiments shown in the foregoing solutions 1 to 14, the following describes impact on a conventional protocol after the NC function is introduced to the access network.

(1) When the NC function is located at the PDCP layer, for embodiments shown in the foregoing solutions 4 to 7, impact on a current PDCP layer protocol is as follows.

In a conventional mechanism, after receiving one PDCP service data unit sent by an upper layer (the SDAP layer or the RRC layer), the PDCP layer associates the PDCP SDU with one PDCP sequence number. Each PDCP SDU is corresponding to one PDCP PDU.

In addition to network coding/decoding and adding an encoded packet header, optionally: the NC function may further include one or more of processing of concatenation, segmentation, or padding on data. After the NC function is introduced to the PDCP layer, when the NC function includes the concatenation/segmentation processing, the PDCP SDU cannot be in a one-to-one correspondence with the PDCP PDU.

After the NC function is introduced to the PDCP layer, the PDCP SDU and the PDCP PDU may no longer be in a one-to-one correspondence. Therefore, the first access network device (the transmit end, for example, the gNB, the CU, or the DU) may send indication information to the terminal device (the receive end). The indication information indicates the UE to disable (or cancel) a sequence numbering function/operation of a PDCP SDU (PDCP SN) during uplink data transmission. Alternatively, the indication information indicates the UE to separately associate each original data packet and each redundancy packet with one sequence number during uplink data transmission (for a solution in which the transmit end sends the original data packet and the redundancy packet, that is, the solution shown in FIG. 3), or separately associate each system packet and each redundancy packet with one sequence number (for a solution in which the transmit end sends the system packet and the redundancy packet, that is, the solution shown in FIG. 4). The sequence number may be a PDCP SN, or may be another SN. In a possible implementation, the indication information indicates the UE to enable the network coding function for a DRB. In this embodiment of this application, the indication information is referred to as fifth indication information. Once the fifth indication information is received, that the UE disables (or cancels), at the PDCP layer, the sequence numbering function/operation of the PDCP SDU (PDCP SN) is changed to that the UE separately associates each original data packet and each redundancy packet with one sequence number, or separately associates each encoded packet (a system packet and a redundancy packet) with one sequence number. Similarly, that the first access network device disables (or cancels), at the PDCP layer, the sequence numbering function/operation of the PDCP SDU (PDCP SN) is changed to that the first access network device separately associates each original data packet and each redundancy packet with one sequence number, or separately associates each encoded packet (a system packet and a redundancy packet) with one sequence number.

For example, after receiving three data packets (original data) of SDUs 1, 2, and 3 from the upper layer, the PDCP layer disables a function/operation of associating the PDCP SN for the SDUs 1, 2, and 3. Then, header compression is sequentially performed on the SDUs 1, 2, and 3, and processing of the network coding function is performed. After the one or more of processing of the concatenation, the segmentation, or the padding are performed on the SDUs 1, 2, and 3, two original data packets may be generated (a first original data packet includes an SDU 1 and a part of an SDU 2, and a second original data packet includes a remaining part of the SDU 2 and an SDU 3). In a possible implementation, two redundancy packets are generated after a coding operation is performed on and encoded packet headers are added to the two original data packets. After each original data packet and each redundancy packet are separately associated with one PDCP SN, integrity protection processing and ciphering processing are sequentially performed on the original data packet and the redundancy packet, and then PDCP headers are added to generate PDCP PDUs. In another possible implementation, four encoded packets (including two system packets and two redundancy packets) are generated after a coding operation is performed on and encoded packet headers are added to the two original data packets. After each encoded packet is associated with one PDCP SN, integrity protection processing and ciphering processing are sequentially performed on the encoded packet, and then PDCP headers are added to generate PDCP PDUs.

Optionally, the system packets and the redundancy packets include encoded packet headers. For a solution (solutions 4 to 7) in which the NC function is located at the PDCP layer, that is, the transmit end newly introduces encoded packet headers between a conventional PDCP header field and SDAP header field, and the transmit end performs integrity protection processing and ciphering processing on each system packet and/or redundancy packet. The transmit end may perform the integrity protection processing on an encoded packet header of each system packet and/or redundancy packet, but may not perform the ciphering processing.

(2) When the NC function is located below the PDCP layer, for embodiments shown in the foregoing solutions 8 and 9, impact on a current protocol is as follows.

In this solution, because the NC function is located below the PDCP layer, a conventional function of the PDCP layer is not affected. In other words, the PDCP SDU and the PDCP PDU are still in a one-to-one correspondence. A CU-DU architecture is used as an example for description. A CU at the transmit end sends, to a DU at the transmit end, an original data packet and a redundancy packet in which the PDCP PDU is encapsulated, or a system packet and a redundancy packet (that is, an encoded packet) in which the PDCP PDU is encapsulated, rather than the PDCP PDU. In other words, the DU at the transmit end receives, from the CU at the transmit end, the original data packet and the redundancy packet, or receives the encoded packet. An example in which the encoded packet is received is used for description. The encoded packet carries the PDCP PDU. Because a sequence number (PDCP SN) is encapsulated in the encoded packet, the DU at the transmit end cannot directly obtain the sequence number. Consequently, the DU at the transmit end cannot feed back a downlink data transmission status (DDDS) to the CU at the transmit end, and stream control of the CU at the transmit end on downlink data is affected. Based on this, when the CU at the transmit end sends an encoded packet to the DU at the transmit end through a GTP tunnel, PDCP SNS corresponding to all PDCP PDUs included in the encoded packet need to be carried in a header field of the GTP tunnel.

Figure 16:
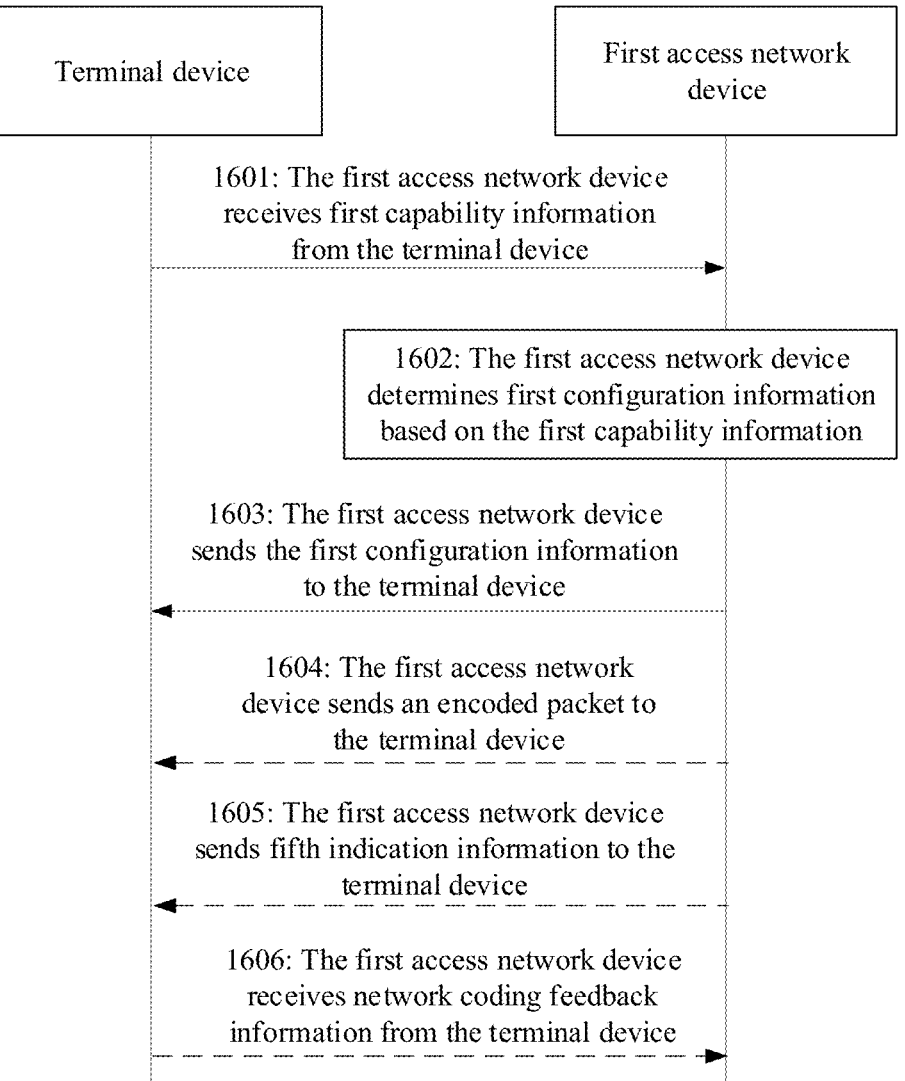
FIG. 16 is a schematic diagram of an embodiment of a configuration method for a network coding function according to an embodiment of this application.

The following describes embodiments of this application with reference to the foregoing solutions 1 to 14. It may be understood that a first access network device and a terminal device in embodiments of this application may perform network coding processing by using any one of the foregoing solutions 1 to 14. This is not limited herein. FIG. 16 is a schematic diagram of an embodiment of a configuration method for a network coding function according to an embodiment of this application. In this embodiment, a solution in which the first access network device sends encoded packets to the terminal device is used as an example for description (that is, the solution shown in FIG. 4, in which the encoded packets include redundancy packets and system packets). The configuration method for the network coding function includes the following steps.

1601: The first access network device receives first capability information from the terminal device.

The first capability information indicates a network coding capability supported by the terminal device. The first capability information includes at least one of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, where the code block is a set of one or more of the original data packets.

The bit rate of network coding equals a data volume of original data packets/(the quantity of original data packets+ the quantity of redundancy packets). The network coding type includes but is not limited to: a fountain code, packet network coding, or a convolutional code.

The convolution depth applies only to the convolutional code.

The size of the finite field for the coding operation is a vector size or a vector ratio of the finite field. The vector size of the finite field is a matrix size of a coefficient matrix G.

Optionally, the size of the finite field for the coding operation may also be referred to as a size of a GF(q) field.

The maximum data volume capable of being processed by the terminal device during network coding is, for example, a quantity of original data packets on which the terminal device can perform processing of the network coding function.

For example, when the network coding type is the fountain code, the first capability information may include the size of the code block and/or the maximum data volume capable of being processed by the terminal device during network coding. When the network coding type is the packet network coding, the first capability information may include at least one piece of information of the size of the code block, the quantity of original data packets, the quantity of redundancy packets, the bit rate of network coding, the size of the finite field for the coding operation, or the maximum data volume capable of being processed by the terminal device during network coding. When the network coding type is the convolutional code, the first capability information may include at least one piece of information of the size of the code block, the quantity of original data packets, the quantity of redundancy packets, the bit rate of network coding, the convolution depth, the size of the finite field for the coding operation, or the maximum data volume capable of being processed by the terminal device during network coding.

1602: The first access network device determines first configuration information based on the first capability information.

The first access network device determines the first configuration information based on the first capability information. The first configuration information includes at least one of the following: a network coding type, a size of a code block, a size of a system packet, a quantity of system packets, a quantity of redundancy packets, selection of a coding coefficient, a convolution depth, or indication information for activating the network coding function.

When the first access network device sends the system packet and the redundancy packet (that is, the solution shown in FIG. 4) to the terminal device, the first configuration information includes at least one of the following: the network coding type, the size of the system packet, the quantity of system packets, the quantity of redundancy packets, selection of the coding coefficient, the convolution depth, or the indication information for activating the network coding function.

The indication information for activating the NC function indicates the terminal device to activate the NC function. For example, when a value of the indication information is true, the terminal device is indicated to activate the NC function, that is, both coding and decoding are activated. Optionally, coding and decoding may be separately activated for the terminal device. The indication information for activating the NC function may further include indication information for activating an uplink NC function and indication information for activating a downlink NC function. The indication information for activating the uplink NC function indicates the terminal device to activate network coding, and the indication information for activating the downlink NC function indicates the terminal device to activate network decoding.

The selection of the coding coefficient indicates information about a coding coefficient used by the terminal device when the terminal device performs network coding on uplink data. In a possible implementation, the selection of the coding coefficient indicates index information corresponding to the coding coefficient used by the terminal device, including but not limited to index information of a codebook and/or index information of a coefficient in the codebook. The index information of the codebook indicates a codebook used by the terminal device, and the index information of the coefficient in the codebook indicates a group of coding coefficients in a specified codebook used by the terminal device. In another possible implementation, the selection of the coding coefficient indicates index information of a codebook used by the terminal device and a plurality of groups of coding coefficients in a specified codebook (which may be considered as indicating a group of ranges corresponding to coding coefficient indexes in the codebook), for example, a coding coefficient corresponding to a coefficient index $\{0\text{-}L\}$ in a codebook A. The terminal device determines, within a range specified by the first access network device, a group of coding coefficients to be selected. For example, the terminal device determines, from the coefficient index $\{0\text{-}L\}$, a group of coding coefficients corresponding to a coefficient index L.

For example, when the network coding type is the fountain code, the first configuration information may include the size of the code block and/or the indication information for activating the NC function. When the network coding type is the packet network coding, the first configuration information may include at least one piece of information of the size of the system packet, the quantity of system packets, the quantity of redundancy packets, the selection of the coding coefficient, and the indication information for activating the NC function. When the network coding type is the convolutional code, the first configuration information may include at least one piece of information of the size of the system packet, the quantity of system packets, the quantity of redundancy packets, the selection of the coding coefficient, the convolution depth, and the indication information for activating the NC function.

Optionally, the first configuration information may further configure information needed by the terminal device to perform decoding. The network decoding is corresponding to the foregoing network coding, and details are not described herein again.

For example, when the first access network device activates a downlink NC function, the first access network device configures, for the terminal device, information needed for decoding downlink data. Optionally, the first access network device sends the first configuration information to the terminal device, to configure information needed for the terminal device to perform downlink decoding. The first configuration information includes at least one of the following information: a network coding type, a size of a system packet, or indication information for activating the downlink NC function.

For example, when the first access network device activates an uplink NC function, the first access network device configures, for the terminal device, information needed for coding uplink data. The first access network device sends the first configuration information to the terminal device, to configure information needed for the terminal device to perform uplink coding. The first configuration information includes at least one of the following information: a network coding type, a size of a code block, a size of a system packet, a quantity of system packets, a quantity of redundancy packets, selection of a coding coefficient, a convolution depth, or indication information for activating the uplink NC function.

For example, when the first access network device activates both an uplink NC function and a downlink NC function, the first access network device configures, for the terminal device, information needed for coding uplink data and information needed for decoding downlink data. The first access network device sends the first configuration information to the terminal device, to configure information needed for the terminal device to perform uplink coding and information needed for the terminal device to perform downlink decoding. The first configuration information includes at least one of the following information: a network coding type, a size of a code block, a size of a system packet, a quantity of system packets, a quantity of redundancy packets, selection of a coding coefficient, a convolution depth, or indication information for activating the NC function.

In another possible solution, when the first access network device sends the original data packet and the redundancy packet (that is, the solution shown in FIG. 3) to the terminal device, the first configuration information includes at least one of the following: the network coding type, a size of the original data packet, a quantity of original data packets, the quantity of redundancy packets, the selection of the coding coefficient, the convolution depth, or the indication information for activating the network coding function.

1603: The first access network device sends the first configuration information to the terminal device.

Optionally, the first access network device sends the first configuration information to the terminal device by using an RRC message.

Optionally, the first access network device sends the first configuration information to the terminal device by using a downlink control information (DCI) message, a medium access control control element (MAC CE) message, or a network coding layer control plane message (control pdu).

1604: The first access network device sends the encoded packet to the terminal device.

Step 1604 is an optional step. After the first access network device sends the first configuration information to the terminal device, the first access network device may send the encoded packet to the terminal device (for downlink transmission), or the first access network device may receive the encoded packet from the terminal device (for uplink transmission). A process of generating the encoded packet by performing the processing of the network coding function is similar to the foregoing solutions 1 to 14, and details are not described herein again.

1605: The first access network device sends fifth indication information to the terminal device.

Step 1605 is an optional step, and is mainly applicable to uplink transmission. Before step 1604, that is, before the first access network device receives the encoded packet from the terminal device, the first access network device may further send the fifth indication information to the terminal device. After receiving the fifth indication information, the terminal device associates each encoded packet with one sequence number.

A definition of the fifth indication information and a process of associating each encoded packet with the sequence number are described in the foregoing solutions 4 to 7 in the impact on the current PDCP layer protocol. Details are not described herein again.

1606: The first access network device receives network coding feedback information from the terminal device.

Step 1606 is an optional step. The terminal device sends, based on a status of received encoded packets, the network coding feedback information to the first access network device. Correspondingly, the first access network device receives the network coding feedback information sent by the terminal device. The network coding feedback information includes at least one of the following: a quantity of redundancy packets requested by the terminal device, a quantity of encoded packets incorrectly received by the terminal device, or a quantity of encoded packets correctly received by the terminal device. The quantity of redundancy packets requested by the terminal device is information about a quantity of redundancy packets that further need to be received by the terminal device to successfully perform decoding (that is, recovering original data).

For example, the terminal device receives a group of encoded packets sent by the first access network device, and performs network decoding processing on the received group of encoded packets. When the terminal device further needs x redundancy packets to complete decoding processing, where x is a positive integer, the network coding feedback information indicates that the terminal device further needs x redundancy packets to complete the network decoding.

For another example, when a quantity of encoded packets needed for the terminal device to correctly perform decoding is y (that is, the terminal device may successfully perform decoding provided that the terminal device correctly receives y encoded packets), where y is a positive integer greater than or equal to x. When the network coding feedback information indicates that the quantity of encoded packets incorrectly received by the terminal device is z, where z is a positive integer, the first access network device may determine, based on the quantity z of the encoded packets incorrectly received by the terminal device and a quantity of encoded packets that have been sent by the first access network device to the terminal, a quantity of redundancy packets that further need to be received by the terminal device to complete decoding processing. Alternatively, when the network coding feedback information indicates that the quantity of encoded packets correctly received by the terminal device is w; where w is a positive integer, the first access network device may determine, based on the quantity w of the encoded packets correctly received by the terminal device, a quantity of redundancy packets that further need to be received by the terminal device to complete decoding processing.

In another possible implementation, when the first access network device sends the original data packet and the redundancy packet (that is, the solution shown in FIG. 3) to the terminal device, the network coding feedback information includes at least one of the following: a quantity of redundancy packets requested by the terminal device, a total quantity of original data packets and redundancy packets that are incorrectly received by the terminal device, or a total quantity of original data packets and redundancy packets that are correctly received by the terminal device.

It should be noted that in this embodiment of this application, the solution in which the first access network device sends the encoded packets to the terminal device is used as an example for description. This embodiment is further applicable to a solution in which the first access network device sends original data packets and redundancy packets to the terminal device (that is, the solution shown in FIG. 3, in which the transmit end sends the original data packets and the redundancy packets). In the solution in which the first access network device sends the original data packet and the redundancy packet to the terminal device, the bit rate of network coding in step 1601 equals a data volume of the system packet/(the quantity of system packets+the quantity of redundancy packets), the system packet in step 1602 is replaced with the original data packet, and the encoded packet in step 1606 is replaced with the original data packet and the redundancy packet. Details are not described herein again.

In some embodiments of this application, the NC function is implemented in the first access network device (the first access network device may be a CU in a CU-DU architecture, or the first access network device may be an integrated access network device such as a gNB). Information needed for the terminal device to perform network coding and/or network decoding is configured by the first access network device, to enable network coding and decoding between the first access network device and the terminal device to be possible. After the NC function is introduced to an access layer, both latency performance and spectral efficiency performance are considered by transmitting an encoded packet. The first access network device may flexibly adjust a quantity of to-be-sent encoded packets based on quality of an air interface link, to ensure that the terminal device can successfully perform decoding, reducing a data transmission latency while ensuring service transmission reliability.

Figure 17:
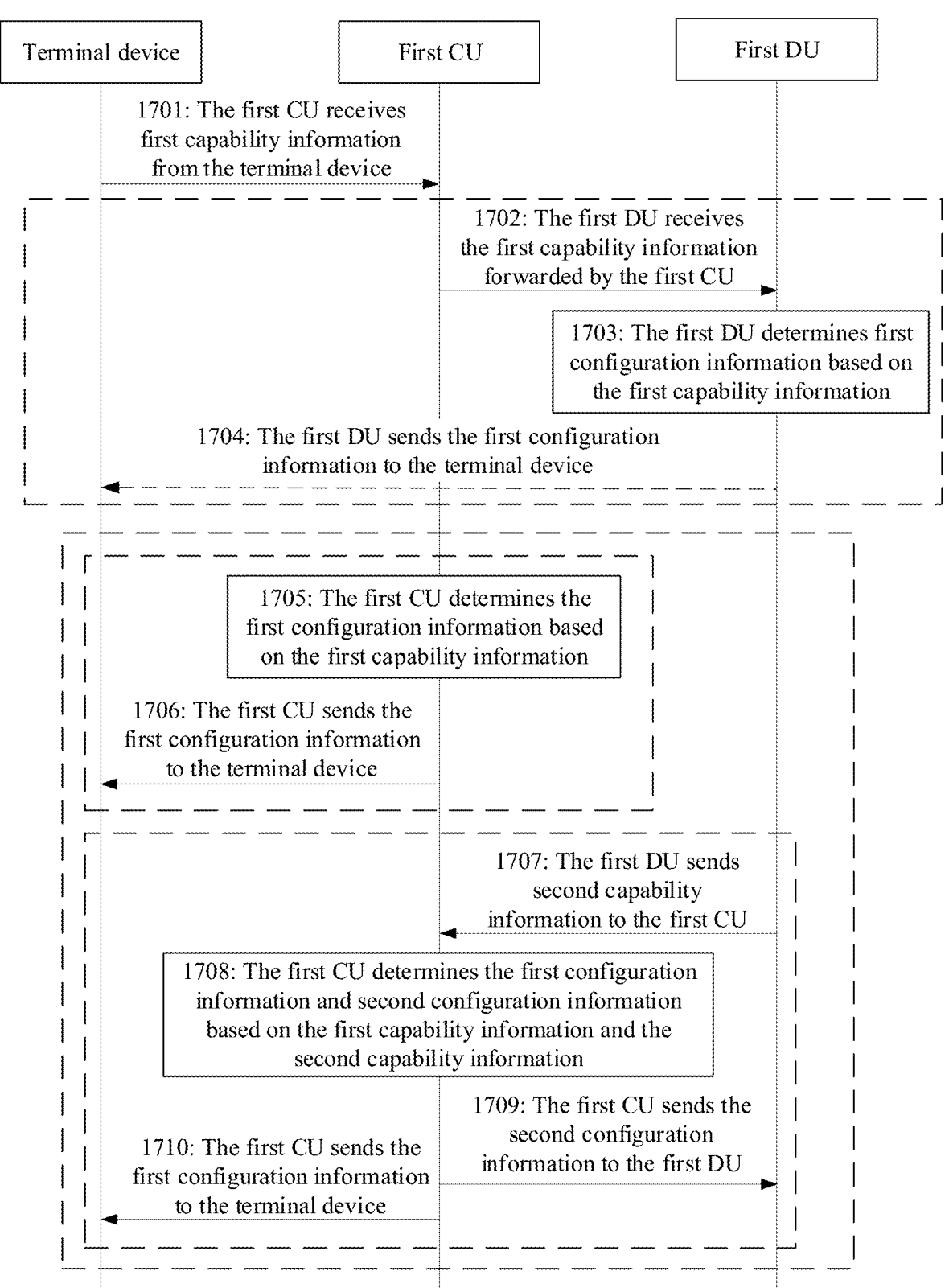
FIG. 17 is a schematic diagram of another embodiment of a configuration method for a network coding function according to an embodiment of this application.

With reference to the foregoing embodiment, the following describes a CU-DU scenario. FIG. 17 is a schematic diagram of another embodiment of a configuration method for a network coding function according to an embodiment of this application. In some embodiments of this application, an example in which a first access network device includes a first CU is used for description. A communication system includes the first CU, a first DU, and a terminal device, where the first CU manages the first DU. In some embodiments of this application, a solution in which the terminal device receives encoded packets from the first DU is used as an example for description (that is, the solution shown in FIG. 4, in which the encoded packets include redundancy packets and system packets). The configuration method for the network coding function includes the following steps.

1701: The first CU receives first capability information from the terminal device.

In step 1701, the terminal device sends the first capability information to the first CU through the first DU, where the first capability information indicates a network coding capability supported by the terminal device. The first capability information includes at least one of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding.

After step 1701, there are two possible implementation solutions.

(1) A DU (that is, the first DU) determines configuration information needed for the terminal device to perform the NC function. In other words, for a downlink, the first DU performs a coding operation on downlink data, the terminal device performs decoding processing on the downlink data, and configuration information needed for the terminal device to perform decoding is determined by the first DU. For an uplink, the terminal device performs a coding operation on uplink data, the first DU performs decoding processing on the uplink data, and configuration information needed for the terminal device to perform encoding is determined by the first DU, that is, steps 1702 to 1704.

(2) A CU (that is, the first CU) determines configuration information needed for the terminal device to perform the NC function.

In a possible implementation, for a downlink, the first CU performs a coding operation on downlink data, the terminal device performs decoding processing on the downlink data, and configuration information needed for the terminal device to perform decoding is determined by the first CU. For an uplink, the terminal device performs a coding operation on the uplink data, the first CU performs decoding processing on uplink data, and configuration information needed for the terminal device to perform encoding is determined by the first CU, that is, steps 1705 and 1706.

In another possible implementation, for a downlink, the first DU performs a coding operation on downlink data, the terminal device performs decoding processing on the downlink data, and both configuration information needed for the first DU to perform encoding and configuration information needed for the terminal device to perform decoding are determined by the first CU. For an uplink, the terminal device performs a coding operation on uplink data, the first DU performs decoding processing on the uplink data, and both configuration information needed for the terminal device to perform encoding and configuration information needed for the first DU to perform decoding are determined by the first CU, that is, steps 1707 to 1710. Descriptions are separately provided below:

Solution 1:

In this solution, the first DU determines the configuration information needed for the terminal device to perform the NC function, and is corresponding to steps 1702 to 1704. A procedure may include the following steps.

1702: The first DU receives first capability information forwarded by the first CU.

In step 1702, the first DU receives the first capability information that is from the terminal device and that is forwarded by the first CU. Correspondingly, the first CU forwards the first capability information from the terminal device to the first DU.

For example, the first DU receives the first capability information through an F1AP message.

1703: The first DU determines first configuration information based on the first capability information.

In step 1703, the first DU determines whether UE activates the NC function based on the first capability information reported by the UE and information about a network coding capability supported by the first DU.

When the first DU determines to activate a downlink NC function, the first DU may send the first configuration information to the UE. The first configuration information includes at least one of the following: a network coding type, a quantity of system packets, or indication information for activating the downlink NC function.

When the first DU determines to activate an uplink NC function, the first DU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

When the first DU determines to activate both the downlink NC function and the uplink NC function, the first DU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the NC function.

1704: The first DU sends the first configuration information to the terminal device.

Correspondingly, the terminal device receives the first configuration information sent by the first DU.

Optionally, the first DU may send the first configuration information to the terminal device through the first CU. The first DU may send the first configuration information through the F1AP message to the first CU, so that the first CU sends the first configuration information through an RRC message to the terminal device.

Optionally, the first DU may directly send the first configuration information to the terminal device. The first DU may send the first configuration information through a DCI message, a MAC CE message, or an NC layer control plane message (control pdu) to the terminal device.

This solution is described by using the solution in which the terminal device receives the encoded packets from the first DU as an example. Some embodiments are further applicable to a solution in which the terminal device receives original data packets and redundancy packets from the first DU (that is, the solution shown in FIG. 3). In the solution in which the terminal device receives the original data packet and the redundancy packet, the system packet included in the first configuration information in step 1703 needs to be replaced with the original data packet. Details are not described herein again.

Solution 2.1:

In this solution, the first CU determines the configuration information needed for the terminal device to perform the NC function, that is, the NC function is separately located on the first CU and the terminal device, and is corresponding to steps 1705 and 1706. A procedure may include the following steps.

1705: The first CU determines first configuration information based on the first capability information.

The first CU determines whether UE activates the NC function based on the first capability information reported by the UE and information about a network coding capability supported by the first CU.

When the first CU determines to activate a downlink NC function, the first CU may send the first configuration information to the UE. The first configuration information may include at least one of the following: a network coding type, a quantity of system packets, or indication information for activating the downlink NC function.

When the first CU determines to activate an uplink NC function, the first CU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

When the first CU determines to activate both the downlink NC function and the uplink NC function, the first CU sends the first configuration information to the UE. The first configuration information includes at least one of the following: a network coding type, a size of a code block, a size of a system packet, a quantity of system packets, a quantity of redundancy packets, selection of a coding coefficient, a convolution depth, or indication information for activating the NC function.

1706: The first CU sends the first configuration information to the terminal device.

The first CU sends the first configuration information to the terminal device.

Correspondingly, the terminal device receives the first configuration information sent by the first CU.

For example, the first CU sends the first configuration information to the terminal device through an RRC message.

This solution is described by using a solution in which the terminal device receives encoded packets from the first CU as an example. Some embodiments are further applicable to a solution in which the terminal device receives original data packets and redundancy packets from the first CU (that is, the solution shown in FIG. 3). In the solution in which the terminal device receives the original data packet and the redundancy packet, the system packet included in the first configuration information in step 1705 needs to be replaced with the original data packet. Details are not described herein again.

Solution 2.2: In this solution, the first CU determines configuration information needed for the first DU and the terminal device to perform the NC function, where the NC function is separately located on the first DU and the terminal device, and is corresponding to steps 1707 to 1710. A procedure may include the following steps.

1707: The first DU sends second capability information to the first CU.

In addition to learning the information about the network coding capability supported by the terminal device, the first CU further needs to learn information about a network coding capability supported by the first DU.

The first DU sends the second capability information to the first CU. Correspondingly, the first CU receives the second capability information sent by the first DU. For example, the first DU may send the second capability information through an F1AP message to the first CU. The F1AP message may be an F1 setup request message, a configuration update (gNB-DU configuration update) message, or another F1AP message. This is not limited herein.

The second capability information indicates the network coding capability supported by the first DU, and the second capability information includes at least one of the following: a network coding type, a size of a code block, a quantity of original data packets, a quantity of redundancy packets, a bit rate of network coding, a convolution depth, a size of a finite field for a coding operation, or a maximum data volume capable of being processed by the first DU during network coding.

In a possible implementation, the network coding capability supported by the first DU may be obtained from an operation, administration and maintenance (OAM) server. That is, the second capability information is configured by the OAM server for the first DU.

1708: The first CU determines the first configuration information and the second configuration information based on the first capability information and the second capability information.

In step 1708, the first CU determines the first configuration information and the second configuration information based on the second capability information reported by the first DU and the first capability information reported by the terminal device.

When the first CU determines to activate a downlink NC function, then:

(A) The first CU may send the second configuration information to the first DU, where the second configuration information includes at least one of the following: a network coding type, a size of a code block, a size of a system packet, a quantity of system packets, a quantity of redundancy packets, selection of a coding coefficient, a convolution depth, or indication information for activating the downlink NC function.

(B) The first CU may send the first configuration information to the terminal device, where the first configuration information includes at least one of the following: a network coding type, a quantity of system packets, or indication information for activating the downlink NC function.

When the first CU determines to activate an uplink NC function, then:

(A) The first may CU send the first configuration information to the terminal device, where the first configuration information includes at least one of the following: a network coding type, a size of a code block, a size of a system packet, a quantity of system packets, a quantity of redundancy packets, selection of a coding coefficient, a convolution depth, or indication information for activating the uplink NC function.

(B) The first may CU send the second configuration information to the first DU, where the second configuration information includes at least one of the following: a network coding type, a size of a system packet, or indication information for activating the uplink NC function.

When the first CU determines to activate both a downlink NC function and an uplink NC function, the first CU may send the second configuration information to the first DU, and the first CU sends the first configuration information to the terminal device. The first configuration information and the second configuration information include at least one of the following: a network coding type, a size of a code block, a size of a system packet, a quantity of system packets, a quantity of redundancy packets, selection of a coding coefficient, a convolution depth, or indication information for activating the NC function.

It should be noted that, the first configuration information and the second configuration information may be similar configuration information, to enable the first DU and the terminal device to smoothly complete data coding and decoding processing. Similar network coding configuration parameters and/or network decoding configuration parameters may be configured for the first DU and the terminal device.

1709: The first CU sends the second configuration information to the first DU.

In step 1709, the first CU sends the second configuration information to the first DU. Correspondingly, the first DU receives the second configuration information sent by the first CU. For example, the first CU sends the second configuration information to the first DU through an F1AP message.

1710: The first CU sends the first configuration information to the terminal device.

Correspondingly, the terminal device receives the first configuration information sent by the first CU.

Optionally, the first CU sends the first configuration information to the terminal device through an RRC message.

This solution is described by using the solution in which the terminal device receives the encoded packets from the first DU as an example. This embodiment is further applicable to a solution in which the terminal device receives original data packets and redundancy packets from the first DU (that is, the solution shown in FIG. 3). In the solution in which the terminal device receives the original data packet and the redundancy packet, the system packet included in the first configuration information in step 1708 needs to be replaced with the original data packet. Details are not described herein again.

In some embodiments of this application, in a CU-DU separation architecture, the configuration information needed for the terminal device to perform the NC function may be configured by the CU, or may be configured by the DU. When the NC function is separately performed on the DU and the terminal device, configuration information needed for the DU to perform the NC function may be configured by the CU, or may be determined by the DU. According to the foregoing method, network coding and decoding between an access network device (the CU and the DU) and the terminal device become possible. After the NC function is introduced to an access layer, both latency performance and spectral efficiency performance are considered by transmitting an encoded packet. The first access network device may flexibly adjust a quantity of to-be-sent encoded packets based on quality of an air interface link, to ensure that the terminal device can successfully perform decoding, reducing a data transmission latency while ensuring service transmission reliability.

With reference to the foregoing embodiment, the following describes an embodiment of this application applied to different communication systems. The following embodiment is mainly for a scenario in which an NC function is separately performed on a DU and UE in a CU-DU separation architecture. In this embodiment, a solution in which the terminal device separately receives, before and after the terminal device is handed over, encoded packets from the first DU and the second DU is used as an example for description (that is, the solution shown in FIG. 4, in which the encoded packets include redundancy packets and system packets). After the NC function is introduced, there are mainly two solutions for intra-CU handover.

Solution AA: Data forwarded by a first CU to the second DU based on feedback from the first DU is a group of corresponding original data that has not been successfully decoded by the terminal device. For example, the original data is a PDCP PDU. The first CU sends PDCP PDUs 1, 2, and 3 to the first DU. After receiving the three PDUs, the first DU uses the three PDUs as original data and performs one or more of processing such as segmentation, concatenation, and padding on the three PDUs to obtain a plurality of original data packets of an equal size. The first DU forms these original data packets to one code block for a coding operation and adds encoded packet headers to the original data packets to generate encoded packets to be sent to the terminal device. When the terminal device can recover only the PDCP PDU 1, but cannot recover the PDCP PDU 2 and the PDCP PDU 3 through decoding, the first CU forwards the three PDUs to the second DU. The second DU re-performs processing of the network coding function on the received original data to generate encoded packets and sends the encoded packets to the terminal device, to enable the terminal device to perform joint decoding on the encoded packets received from the first DU and the second DU to recover the original data, reducing a packet loss in a handover process. Refer to embodiments shown in FIG. 18 and FIG. 19.

Solution BB: Data forwarded by a first CU to the second DU based on feedback of the first DU is original data that has not been successfully recovered by the terminal device. For example, the original data is a PDCP PDU. The first CU sends PDCP PDUs 1, 2, and 3 to the first DU. After receiving the three PDUs, the first DU uses the three PDUs as original data and performs one or more of processing such as segmentation, concatenation, and padding on the three PDUs to obtain a plurality of original data packets of an equal size. The first DU forms these original data packets to one code block for a coding operation and adds encoded packet headers to the original data packets to generate encoded packets to be sent to the terminal device. When the terminal device can recover only the PDCP PDU 1, but cannot recover the PDCP PDU 2 and the PDCP PDU 3 through decoding, the first CU forwards the PDCP PDU 2 and the PDCP PDU 3 to the second DU, reducing a packet loss in a handover process. Refer to embodiments shown in FIG. 20 and FIG. 21.

Figure 18:
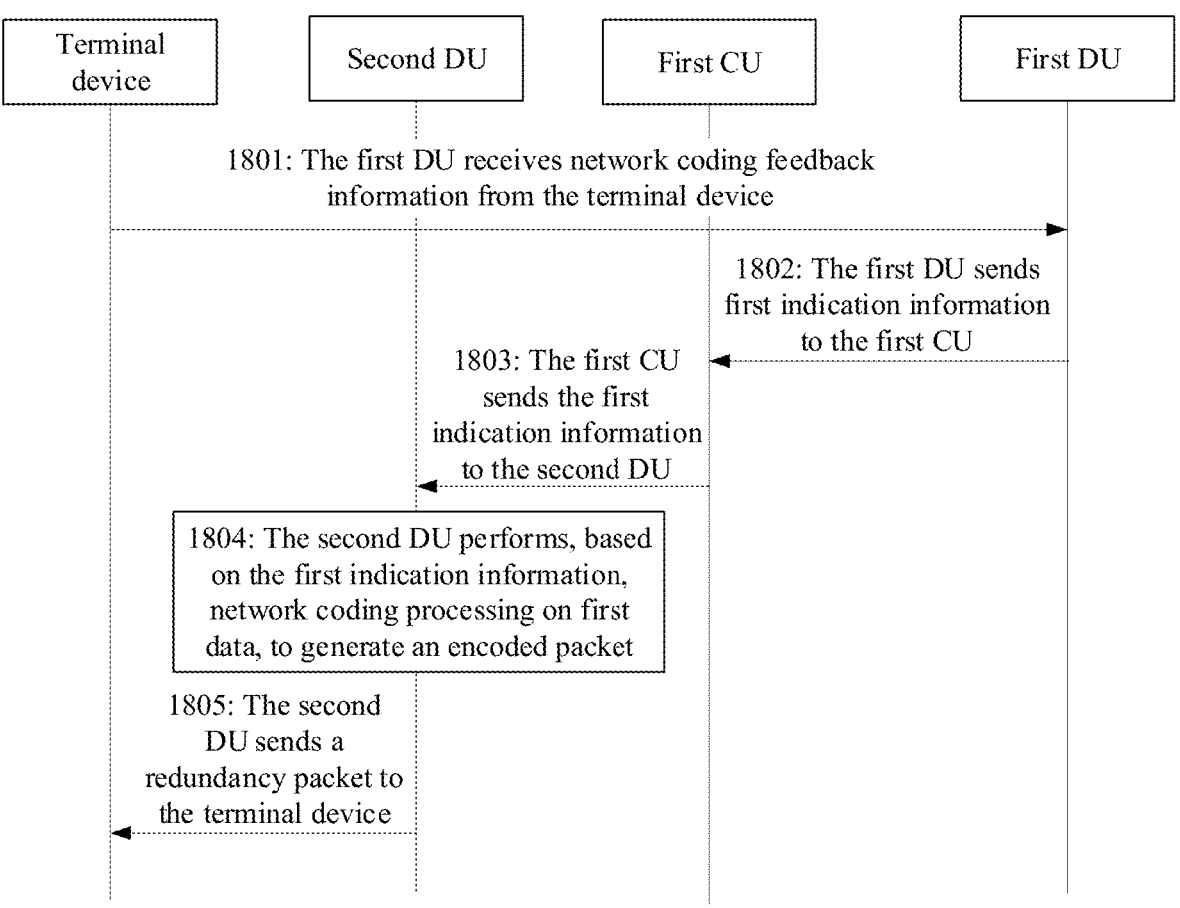
FIG. 18 is a schematic diagram of an embodiment of an intra-CU handover method after NC is introduced according to an embodiment of this application.

Solution AA is first described to describe a communication system corresponding to FIG. 12. A first access network device includes a first CU, and the communication system includes UE, a first DU, a second DU, and the first CU. The first CU manages the first DU, and the first CU manages the second DU. The UE is handed over from the first DU to the second DU. FIG. 18 is a schematic diagram of an embodiment of an intra-CU handover method after NC is introduced according to an embodiment of this application. In this embodiment, an example in which the NC function is separately performed on the DU and the UE is used as an example for description. For a downlink, the DU may perform a coding operation, and correspondingly, the UE may perform decoding processing. For an uplink, the UE may perform a coding operation, and correspondingly, the DU may perform decoding processing.

1801: The first DU receives network coding feedback information from the terminal device.

In step 1801, the terminal device sends, based on a status of received encoded packets, the network coding feedback information to the first access network device. Correspondingly, the first access network device receives the network coding feedback information sent by the terminal device. The network coding feedback information includes at least one of the following: a quantity of redundancy packets requested by the terminal device, a quantity of encoded packets incorrectly received by the terminal device, or a quantity of encoded packets correctly received by the terminal device. The quantity of redundancy packets requested by the terminal device is information about a quantity of redundancy packets that further need to be received by the terminal device to successfully perform decoding (that is, recovering original data).

For example, the terminal device receives a group of encoded packets sent by the first access network device, and performs network decoding processing on the group of encoded packets. When the terminal device further needs x redundancy packets to complete decoding processing, where x is a positive integer, the network coding feedback information indicates that the terminal device further needs x redundancy packets to complete the network decoding.

For another example, when a quantity of encoded packets needed for the terminal device to correctly perform decoding is y (that is, the terminal device may successfully perform decoding provided that the terminal device correctly receives y encoded packets), where y is a positive integer greater than or equal to x. When the network coding feedback information indicates that the quantity of encoded packets incorrectly received by the terminal device is z, where z is a positive integer, the first access network device may determine, based on the quantity z of the encoded packets incorrectly received by the terminal device and a quantity of encoded packets that have been sent by the first access network device to the terminal, a quantity of redundancy packets that further need to be received by the terminal device to complete decoding processing. Alternatively, when the network coding feedback information indicates that the quantity of encoded packets correctly received by the terminal device is w; where w is a positive integer, the first access network device may determine, based on the quantity w of the encoded packets correctly received by the terminal device, a quantity of redundancy packets that further need to be received by the terminal device to complete decoding processing.

Figure 23:
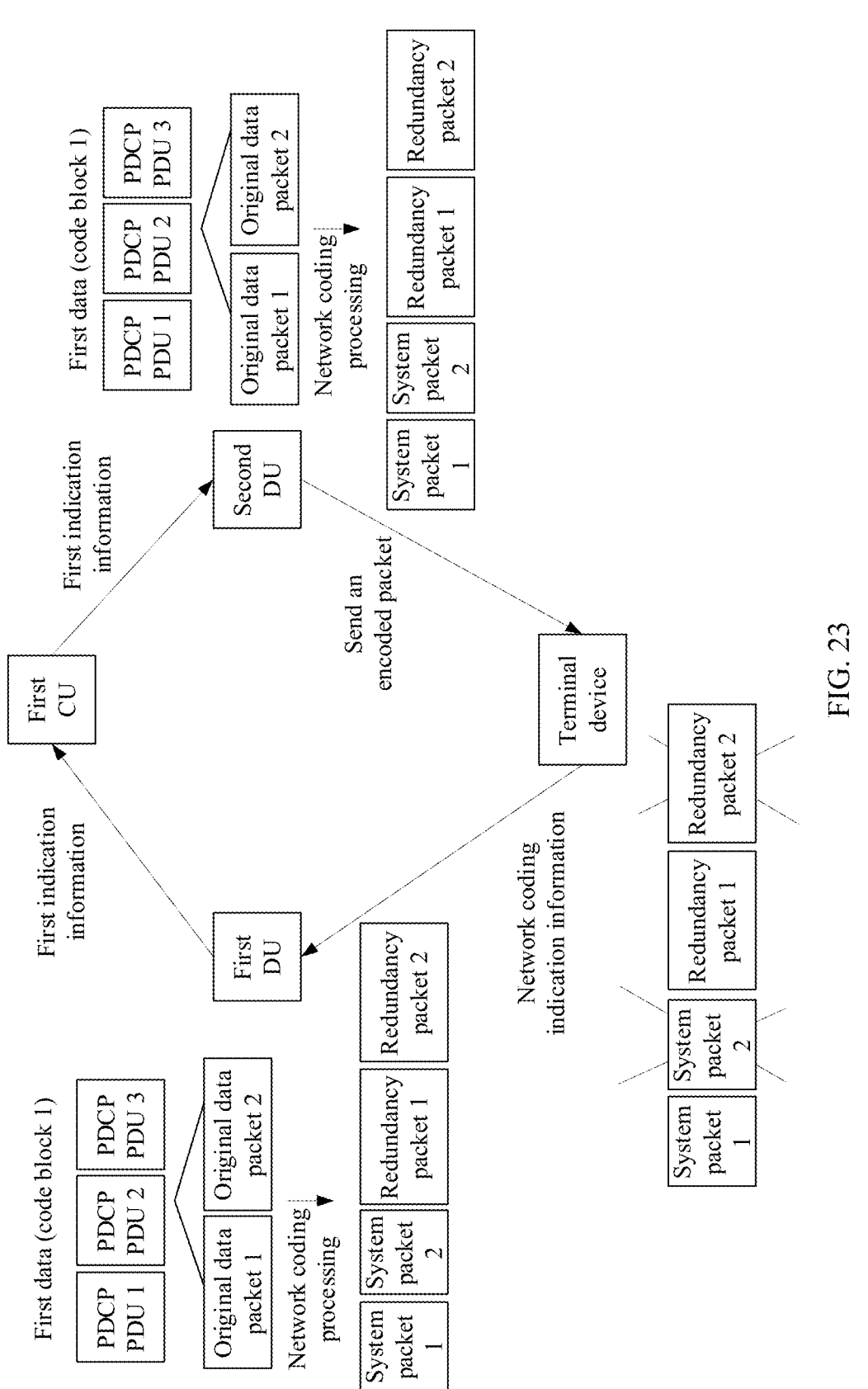
FIG. 23 is a schematic diagram of a scenario according to an embodiment of this application.

After the terminal device sends the network coding feedback information to the first DU, the terminal device is handed over from the first DU to the second DU. For ease of understanding, refer to FIG. 23. FIG. 23 is a schematic diagram of a scenario according to an embodiment of this application. In FIG. 23, for ease of description, it is assumed that the first DU generates encoded packets (including system packets and redundancy packets) after performing processing of the network coding function on a group of PDCP PDUs. For example, the first DU receives PDCP PDUs 1, 2, and 3 from the first CU, and the three PDUs are used as original data for performing the processing of the network coding function. The first DU may perform one or more of processing of segmentation, concatenation, and padding on the PDCP PDUs 1, 2, and 3 to obtain two original data packets of an equal size (that is, an original data packet 1 and an original data packet 2). The original data packet 1 includes the PDCP PDU 1 and a part of the PDCP PDU 2, and the original data packet 2 includes a remaining part of the PDCP PDU 2 and the PDCP PDU 3. The first DU forms the original data packet 1 and the original data packet 2 to one code block. Then, the first DU processes the two original data packets to generate four encoded packets. In a possible implementation, the first DU generates two corresponding system packets separately by adding encoded packet headers to the original data packet 1 and the original data packet 2. For example, a system packet 1 is generated based on the original data packet 1, and a system packet 2 is generated based on the original data packet 2. The first DU generates two redundancy packets (that is, a redundancy packet 1 and a redundancy packet 2) after performing a coding operation on and adding encoded packet headers to the original data packet 1 and the original data packet 2. In another possible implementation, the first DU generates two system packets and two redundancy packets after performing a coding operation on and adding encoded packet headers to the original data packet 1 and the original data packet 2. It is assumed that the terminal device can successfully recover the original data through decoding provided that the terminal device correctly receives the four encoded packets. When the terminal device correctly receives only the system packet 1 and the redundancy packet 1, the terminal device cannot correctly recover the PDCP PDUs 1, 2, and 3 through decoding because the terminal device does not receive plenty of encoded packets. Therefore, the terminal device sends the network coding feedback information to the first DU, to enable a transmit end to send a quantity of redundancy packets to the terminal device. For example, the quantity of redundancy packets to be sent is equal to or greater than 2, to enable the terminal device to successfully recover the PDCP PDUs 1, 2, and 3 through decoding.

1802: The first DU sends first indication information to the first CU.

In step 1802, after the first DU receives the network coding feedback information from the terminal device, the first DU may determine a status of receiving the encoded packets by the terminal device, and determine a quantity of redundancy packets that further need to be received by the terminal device to correctly recover the original data through decoding. Further, the first DU sends the first indication information to the first CU, where the first indication information includes information about a code block. The information about the code block includes information about a current code block, or includes information about a next code block. The current code block is a last code block on which network coding processing is being performed by the first DU. The next code block is a code block closely following the current code block, or is a code block that is after the current code block and on which network coding processing is to be performed. For example, the information about the code block may be information about an identifier of the code block (block id).

Optionally, the first indication information further includes indication information that indicates a quantity of redundancy packets that the terminal device still lacks, or includes information used to request/indicate a quantity of redundancy packets to be sent by the transmit end. FIG. 23 is used as an example. A quantity of redundancy packets included in the first indication information is 2.

In a possible implementation, the first indication information may be sent by the first DU through an F1AP message to the first CU. FIG. 23 is used as an example. A code block 1 includes content of the PDCP PDUs 1, 2, and 3, and a corresponding identifier of the code block is a block id 1. In this case, the first indication information includes an identifier of a current code block, which is the block 1, or the first indication information includes an identifier of a next code block, which is a block 2.

Optionally, the first indication information may further include the information about the current code block and an SN corresponding to a start (first) PDCP PDU included in the current code block. Alternatively, the first indication information may further include the information about the current code block, an SN corresponding to a start PDCP PDU included in the current code block, and an SN corresponding to an end (last) PDCP PDU included in the current code block. Alternatively, the first indication information may further include the information about the current code block, an SN corresponding to a start PDCP PDU of the current code block, and a quantity of PDCP PDUs included in the current code block. The first CU may learn, based on the first indication information, that the code block 1 includes the content of the PDCP PDUs 1, 2, and 3. Alternatively, the first indication information may further include information about the next code block and an SN corresponding to a start PDCP PDU included in the next code block.

1803: The first CU sends the first indication information to the second DU.

The first CU sends the first indication information to the second DU. Correspondingly: the second DU receives the first indication information sent by the first CU.

In a possible implementation, the first CU sends the first indication information through an F1AP message to the second DU.

Optionally: when the first indication information includes the identifier of the current code block or the identifier of the next code block (that is, an identifier of a next code block on which network coding processing is to be performed), the first CU may carry the first indication information in a header field of a GTP tunnel when forwarding downlink data to the second DU through the GTP tunnel.

Descriptions are provided with reference to FIG. 23. The first CU sends the PDCP PDUs 1, 2, and 3 included in the code block 1 to the second DU. Because the code block identifier corresponding to the code block is block 1, the first CU may carry the identifier of the corresponding code block in a corresponding header field of a GTP tunnel when forwarding the PDU to the second DU through the GTP tunnel. For example, when the GTP tunnel transmits the PDCP PDU 1, the header field of the GTP carries the identifier of the block 1. When the GTP tunnel transmits the PDCP PDU 2, the header field of the GTP carries the identifier of the block 1. When the GTP tunnel transmits the PDCP PDU 3, the header field of the GTP carries the identifier of the block 1. The second DU receives the PDCP PDUs from the GTP tunnel, and may learn, based on the identifier of the code block carried in the header field of the GTP, that the code block 1 includes the content of the PDCP PDUs 1, 2, and 3. Then, the second DU performs one or more of processing such as segmentation, concatenation, and padding on the received PDCP PDUs 1, 2, and 3 to obtain a plurality of original data packets of an equal size, and forms the plurality of original data packets to the code block 1. In addition, the second DU performs network coding processing on and adds encoded packet headers to the code block (the original data packets in the code block), to generate encoded packets to be sent to the terminal device. In addition, the second DU may deduce, based on the identifier of the current code block, the identifier of the next code block on which network coding processing is to be performed (that is, the identifier of the next code block), perform one or more of processing such as segmentation, concatenation, and padding on PDCP PDUs subsequently received from the first CU, to obtain a plurality of original data packets of an equal size, and forms the plurality of original data packets to the next code block. In addition, the second DU performs network coding processing on and adds encoded packet headers to the next code block, to generate encoded packets to be sent to the terminal device, and so on. Alternatively, similar to the identifier of the current code block, the identifier of the next code block is not deduced by the second DU based on the identifier of the current code block, but is directly obtained from the header field of the GTP.

Optionally, the first CU sends third configuration information to the second DU. The third configuration information is used to configure a network coding function of the second DU, and the third configuration information is configuration information needed for the first DU to perform the NC function. The first CU may send configuration information for the first DU to perform encoding to the second DU, to ensure that configuration information for the second DU to perform encoding is consistent with the configuration information for the first DU to perform encoding, to enable the terminal device to perform joint decoding on a redundancy packet generated by the second DU and an encoded packet generated by the first DU. The configuration information for the first DU to perform encoding may be determined by the first CU, or may be determined by the first DU. Content of the configuration information is the same as that of the first configuration information in the foregoing embodiment, and details are not described herein again. When the configuration information for the first DU to perform encoding is determined by the first CU, the first CU directly sends the determined configuration information for the first DU to perform encoding to the second DU. When the configuration information for the first DU to perform encoding is determined by the first DU, before the first CU sends the configuration information for the first DU to perform encoding to the second DU, the first CU needs to obtain, from the first DU, the configuration information for the first DU to perform encoding. For an example procedure, refer to the solution corresponding to FIG. 17. Details are not described herein again.

It should be noted that, selection of a coding coefficient included in the third configuration information may be the same or may be different. That is, if selection of a coding coefficient included in the configuration information for the first DU to perform encoding is different from selection of a coding coefficient for the second DU to perform an NC function, redundancy packets generated by the first DU and the second DU are different. Otherwise, redundancy packets generated by the first DU and the second DU are the same.

1804: The second DU performs, based on the first indication information, processing of the network coding function on first data, to generate an encoded packet.

In step 1804, the second DU performs, based on the first indication information, the processing of the network coding function on data received from the first CU, to generate the encoded packet.

The data from the first CU is also referred to as the first data. In this embodiment of this application, data forwarded by the first CU to the second DU is referred to as the first data. In FIG. 23, for example, the first data is a downlink PDCP PDU. The second DU performs, based on the first indication information, the processing of the network coding function on the first data to generate the encoded packet. A destination of the first data is the terminal device.

For example, a coding operation is performed on and encoded packet headers are added to the code block 1, to generate a system packet 1, a system packet 2, a redundancy packet 1, and a redundancy packet 2.

Optionally, after the second DU receives the third configuration information from the first CU, the second DU configures, based on the third configuration information, a network coding function (for downlink transmission) and/or a network decoding function (for uplink transmission).

1805: The second DU sends the redundancy packet to the terminal device.

In step 1805, the second DU sends, based on the first indication information, the redundancy packet generated in step 1804 to the terminal device. A quantity of redundancy packets sent by the second DU to the terminal device may be greater than or equal to a quantity of redundancy packets needed for the terminal device to complete network decoding processing.

FIG. 23 is used as an example. The encoded packets sent by the second DU to the terminal device may be the redundancy packet 1 and the redundancy packet 2. This is not limited herein.

In some embodiments of this application, in a scenario in which the UE is handed over from the first DU to the second DU, the UE notifies the first DU of a current network decoding status of the UE through the network coding feedback information, to enable the first DU to trigger sending of the first indication information to the first CU. The first CU indicates, through the first indication information, the second DU to send the redundancy packet to the terminal device, to enable the terminal device to recover the original data by performing joint decoding on the encoded packet received from the first DU and the redundancy packet received from the second DU, reducing a packet loss in a handover process of the terminal device.

This solution is described by using the solution in which the terminal device separately receives, before and after the terminal device is handed over, the encoded packets from the first DU and the second DU as an example (that is, before the terminal device is handed over, the first DU sends the encoded packets to the terminal device, and after the terminal device is handed over, the second DU sends the redundancy packet to the terminal device). This embodiment is further applicable to a solution in which the terminal device separately receives, before and after the terminal device is handed over, original data packets and redundancy packets from the first DU and the second DU (that is, the solution shown in FIG. 3). In the solution in which the terminal device receives the original data packet and the redundancy packet, the system packet in the foregoing step needs to be replaced with the original data packet, and the encoded packet needs to be replaced with the original data packet and the redundancy packet. Details are not described herein again.

Figure 19:
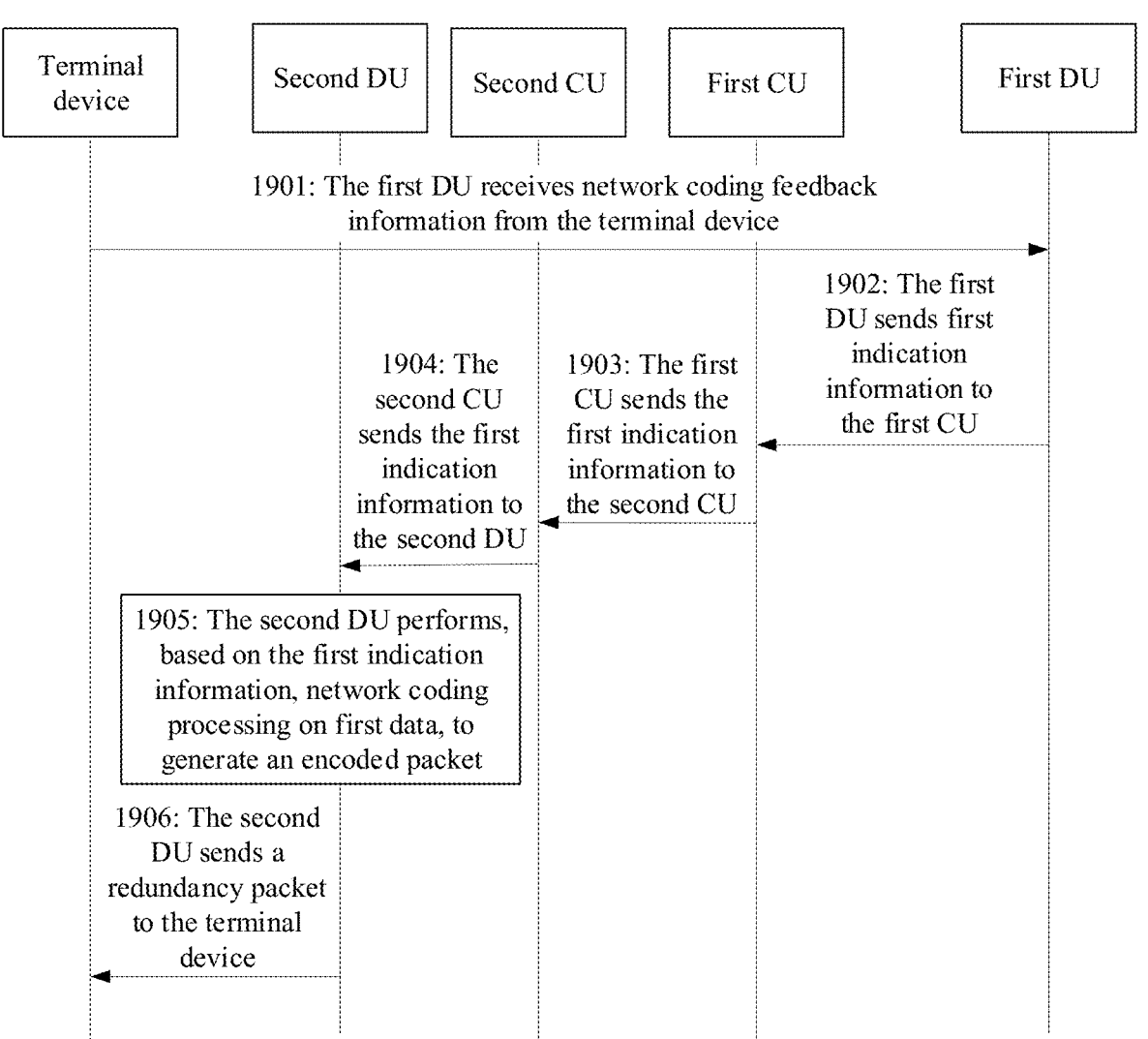
FIG. 19 is a schematic diagram of an embodiment of an inter-CU handover method according to an embodiment of this application.

With reference to the foregoing embodiment, a communication system corresponding to FIG. 13a is described, including UE, a first DU, a second DU, a first CU, and a second CU. The first CU manages the first DU, and the second CU manages the second DU. The UE is handed over from the first DU to the second DU. FIG. 19 is a schematic diagram of an embodiment of an inter-CU handover method according to an embodiment of this application. In this embodiment, a solution in which the terminal device separately receives, before and after the terminal device is handed over, encoded packets from the first DU and the second DU is used as an example for description (that is, the solution shown in FIG. 4, in which the encoded packets include redundancy packets and system packets). After the NC function is introduced, an inter-CU handover method includes the following steps.

1901: The first DU receives network coding feedback information from the terminal device.

1902: The first DU sends first indication information to the first CU.

Steps 1901 and 1902 are consistent with the foregoing steps 1801 and 1802, and details are not described herein again.

1903: The first CU sends the first indication information to the second CU.

Correspondingly, the second CU receives the first indication information sent by the first CU.

In step 1903, there is a communication port, for example, an Xn communication port, between the first CU and the second CU. The first CU sends the first indication information through the Xn communication port to the second CU.

Optionally, the first CU sends third configuration information to the second CU. The third configuration information is used to configure a network coding function of the second DU, and the third configuration information is configuration information needed for the first DU to perform the NC function. A definition is consistent with the definition in step 1803, and details are not described herein again.

1904: The second CU sends the first indication information to the second DU.

Correspondingly, the second DU receives the first indication information sent by the second CU.

In step 1904, for example, the second CU sends the first indication information through an F1AP message to the second DU, that is, the second CU forwards the first indication information from the first CU.

Optionally, the second CU sends third configuration information to the second DU. The third configuration information is used to configure a network coding function of the second DU, and the third configuration information is configuration information needed for the first DU to perform the NC function. The third configuration information is sent by the first CU to the second CU.

1905: The second DU performs, based on the first indication information, processing of the network coding function on first data, to generate an encoded packet.

1906: The second DU sends the redundancy packet to the terminal device.

Steps 1905 and 1906 are consistent with the foregoing steps 1804 and 1805, and details are not described herein again.

In some embodiments of this application, in a scenario in which the UE is handed over from the first DU to the second DU, the UE notifies the first DU of a current network decoding status of the UE through the network coding feedback information, to enable the first DU to trigger sending of a DDDS message to the first CU. The first CU sends the first indication information to the second CU. The second CU indicates, through the first indication information, the second DU to send the redundancy packet to the terminal device, to enable the terminal device to successfully complete network decoding. The foregoing method ensures normal communication between the terminal device and an access network device.

This solution is described by using the solution in which the terminal device separately receives, before and after the terminal device is handed over, the encoded packets from the first DU and the second DU as an example (that is, before the terminal device is handed over, the first DU sends the encoded packets to the terminal device, and after the terminal device is handed over, the second DU sends the redundancy packets to the terminal device). Some embodiments are further applicable to a solution in which the terminal device separately receives, before and after the terminal device is handed over, original data packets and redundancy packets from the first DU and the second DU (that is, the solution shown in FIG. 3). In the solution in which the terminal device receives the original data packet and the redundancy packet, the system packet in the foregoing step needs to be replaced with the original data packet, and the encoded packet needs to be replaced with the original data packet and the redundancy packet. Details are not described herein again.

It should be noted that the foregoing steps in this solution are mainly for the NC function located on a DU and the terminal device. Before the terminal device is handed over, the NC function may be located on the first DU and the terminal device, and after the terminal device is handed over, the NC function may be located on the second DU and the terminal device. In addition, this solution is further applicable to a scenario in which the NC function is located on a CU and the terminal device. In this scenario, the first CU also needs to send the first indication information to the second CU, and the second CU performs, based on the first indication information from the first CU, processing of the network coding function on the first data, to generate an encoded packet. An example generation method is similar to step 1905, and details are not described herein again. In other words, before the terminal device is handed over, the first CU sends the encoded packet to the terminal device, and after the terminal device is handed over, the second CU sends the redundancy packet to the terminal device.

Figure 20:
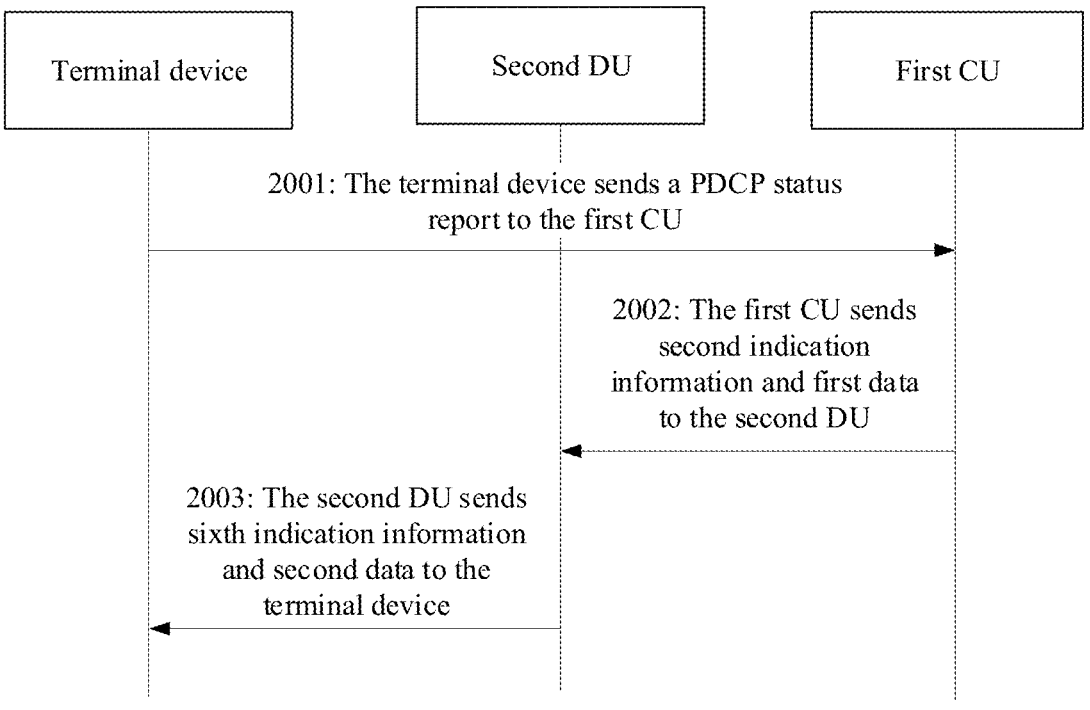
FIG. 20 is a schematic diagram of another embodiment of an intra-CU handover method after NC is introduced according to an embodiment of this application.

Next, solution BB is described. With reference to the foregoing embodiment, the following describes an embodiment of this application applied to different communication systems. A communication system corresponding to FIG. 12 is first described. A first access network device includes a first CU, and the communication system includes UE, a first DU, a second DU, and the first CU. The first CU manages the first DU, and the first CU manages the second DU. The UE is handed over from the first DU to the second DU. FIG. 20 is a schematic diagram of another embodiment of an intra-CU handover method after NC is introduced according to an embodiment of this application. In this embodiment, an example in which the NC function is separately performed on the DU and the UE is used as an example for description. For a downlink, the DU may perform network coding processing, and correspondingly, the UE may perform decoding processing. For an uplink, the UE may perform network coding processing, and correspondingly, the DU may perform decoding processing. In this embodiment of this application, an example in which original data is a PDCP PDU is used for description.

2001: A terminal device sends a PDCP status report to the first CU.

In step 2001, after the terminal device is handed over to the second DU, the terminal device sends the PDCP status report to the first CU through the second DU, to enable the first CU to learn of a status of receiving the PDCP PDU by the terminal device. The first CU triggers, based on the PDCP status report sent by the terminal device, forwarding of downlink data to the second DU, that is, forwarding a PDCP PDU that has not been successfully received by the terminal device to the second DU.

Descriptions are provided with reference to FIG. 23. Before the terminal device is handed over, the first DU receives PDCP PDUs 1, 2, and 3 from the first CU. The first DU performs processing of the network coding function on the three PDUs to generate an encoded packet, and sends the encoded packet to the terminal device. For the terminal device, only the PDCP PDU 1 is successfully recovered from the first DU through decoding. After the terminal device is handed over, the terminal device reports the PDCP status report to the first CU. The first CU sends, to the second DU based on the PDCP status report, forwarded downlink data of the PDCP PDU 2 and the PDCP PDU 3, and new downlink data PDCP PDUs 4, 5, and 6.

2002: The first CU sends second indication information and first data to the second DU.

In step 2002, the first CU sends the second indication information and the first data to the second DU. Correspondingly, the second DU receives the second indication information and the first data that are sent by the first CU. The second indication information indicates whether the second DU needs to perform the processing of the network coding function on the received first data.

In a possible implementation, the first CU sends the first data to the second DU through a GTP tunnel, and the second indication information is carried in a header field of the GTP tunnel for sending.

Descriptions are provided with reference to FIG. 23. The first data is PDCP PDUs 2 to 6. The first CU may send the PDCP PDUs 2 to 6 to the second DU. The second DU does not need to perform processing of the network coding function on the received PDCP PDU 2 and PDCP PDU 3 to generate an encoded packet, but needs to perform processing of the network coding function on the received PDCP PDUs 4, 5, and 6 to generate an encoded packet. Therefore, when the first CU sends the PDCP PDU 2 and the PDCP PDU 3 to the second DU through a GTP tunnel, the second DU does not perform processing of the network coding function on the received PDCP PDU 2 and PDCP PDU 3 based on the second indication information carried in the GTP tunnel. That is, the second DU directly sends the PDCP PDU 2 and the PDCP PDU 3 to the terminal device. When the first CU sends the PDCP PDUs 4, 5, and 6 to the second DU through the GTP tunnel, the second DU performs, based on the second indication information carried in the GTP tunnel, the processing of the network coding function on the received PDCP PDUs 4, 5, and 6 to generate an encoded packet, that is, the second DU sends the generated encoded packet to the terminal device.

2003: The second DU sends sixth indication information and second data to the terminal device.

In step 2003, the second DU sends the sixth indication information and the second data to the terminal device. Correspondingly, the terminal device receives the sixth indication information and the second data that are sent by the second DU. The sixth indication information indicates whether network coding processing is performed on the second data received by the terminal device.

The second data may be the first data, or may be data obtained after network coding processing is performed on the first data (for example, an encoded packet).

In step 2003, corresponding to second data on a same DRB, the second data sent by the second DU to the terminal device includes two types. One type of the second data is an encoded packet on which network coding processing is performed, and the other type is a PDCP PDU on which network coding processing is not performed. For ease of differentiation by the terminal device, there are two possible implementations:

Manner 1: The sixth indication information is carried in an RLC header field. For example, the sixth indication information occupies one bit, and indicates whether network coding processing is performed on a corresponding PDCP PDU, or indicates whether a payload carried in an RLC layer is a PDCP PDU or an encoded packet.

Descriptions are provided with reference to FIG. 23. For example, because the second DU does not need to perform processing of the network coding function on the received PDCP PDU 2 and PDCP PDU 3, when sending the PDCP PDU 2 and the PDCP PDU 3 to the terminal device, the second DU carries the sixth indication information in the RLC header field, to indicate that network coding processing is not performed on the PDCP PDU carried in the RLC layer. Because processing of the network coding function needs to be performed on the received PDCP PDUs 4, 5, and 6 to generate an encoded packet, when sending the encoded packet to the terminal device, the second DU carries the sixth indication information in the RLC header field, to indicate that network coding processing is performed on the PDCP PDU carried in the RLC layer. Alternatively, when sending the PDCP PDU 2 and the PDCP PDU 3 to the terminal device, the second DU carries the sixth indication information in the RLC header field, to indicate that the payload carried in the RLC layer is the PDCP PDU. When sending encoded packets generated after network coding processing is performed on the PDCP PDUs 4, 5, and 6 to the terminal device, the second DU carries the sixth indication information in the RLC header field, to indicate that the payload carried in the RLC layer is the encoded packet.

Manner 2: The two different types of second data are mapped to two different logical channels for transmission. For example, when a logical channel is established between the second DU and the terminal device, two logical channels may be established for a same DRB. The second DU sends the sixth indication information to the terminal device, to indicate, to the terminal device, a logical channel that is for transmitting the second data and on which network coding processing is performed. Alternatively: a protocol pre-specifies a logical channel that is for transmitting the second data and on which network coding processing is performed (that is, there is no explicit sixth indication information).

When the second indication information indicates that the network coding processing needs to be performed on the first data, the second DU may send data obtained after network coding processing is performed on the first data to the terminal device through a first logical channel, that is, the encoded packet on which network coding processing is performed. Alternatively, when the second indication information indicates that the network coding processing does not need to be performed on the first data, the second DU sends the first data to the terminal device through a second logical channel, where the first data is the PDCP PDU on which network coding processing is not performed. The first logical channel is different from the second logical channel.

Descriptions are provided with reference to FIG. 23. For example, the second DU sends the PDCP PDU 2 and the PDCP PDU 3 to the terminal device through a logical channel 1 (the second logical channel), and sends, to the terminal device through a logical channel 2 (the first logical channel), encoded packets generated after network coding processing is performed on the PDCP PDUs 4, 5, and 6. In this way, the terminal device performs different processing on the second data received from the different logical channels.

In this embodiment of this application, in a scenario in which the UE is handed over from the first DU to the second DU, the first CU indicates the second DU whether to perform network coding processing on the received first data through the second indication information, and the second DU sends the second data to the terminal device based on the second indication information. The second data may be an encoded packet generated after the second DU performs network coding processing on the received first data, or may be the first data (that is, processing of the network coding function does not need to be performed on the first data). In addition, the second DU indicates the terminal device to perform differentiation, to ensure that the terminal device correctly processes the second data, and reduce a packet loss in a handover process.

In this embodiment of this application, the solution in which the terminal device separately receives, before and after the terminal device is handed over, the encoded packets from the first DU and the second DU is used as an example for description (that is, before the terminal device is handed over, the first DU sends the encoded packets to the terminal device, and after the terminal device is handed over, the second DU sends the redundancy packets to the terminal device). This embodiment is further applicable to a solution in which the terminal device separately receives, before and after the terminal device is handed over, original data packets and redundancy packets from the first DU and the second DU (that is, the solution shown in FIG. 3). In the solution in which the terminal device receives the original data packet and the redundancy packet, the encoded packet in the foregoing step needs to be replaced with the original data packet and the redundancy packet. Details are not described herein again.

Figure 21:
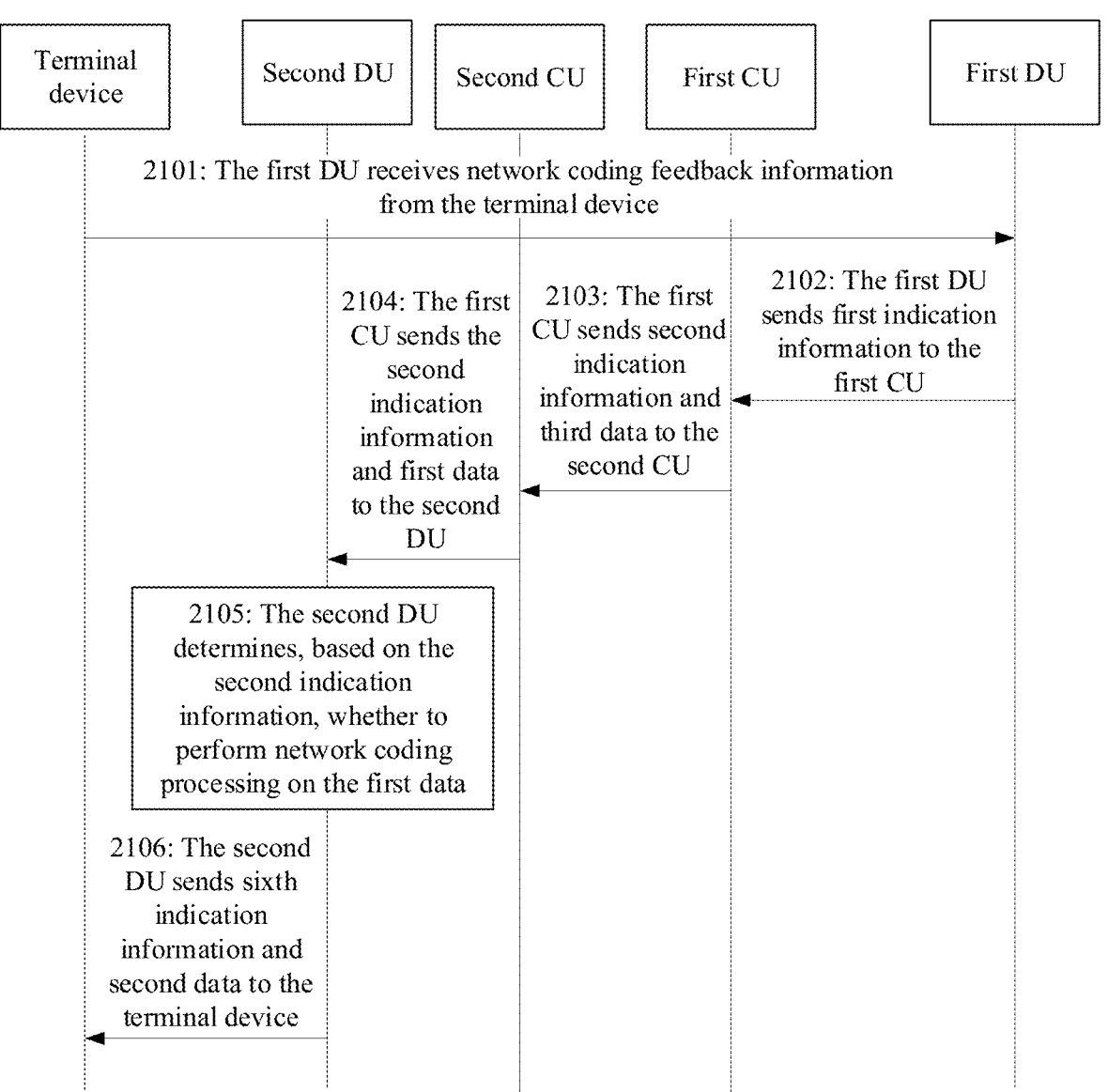
FIG. 21 is a schematic diagram of another embodiment of an inter-CU handover method according to an embodiment of this application.

With reference to the foregoing embodiment, a communication system corresponding to FIG. 13*a* is described, including UE, a first DU, a second DU, a first CU, and a second CU. The first CU manages the first DU, and the second CU manages the second DU. The UE is handed over from the first DU to the second DU. FIG. 21 is a schematic diagram of another embodiment of an inter-CU handover method according to an embodiment of this application. After an NC function is introduced, the inter-CU handover method includes the following steps.

2101: The first DU receives network coding feedback information from the terminal device.

Step 2101 is an optional step.

2102: The first DU sends first indication information to the first CU.

Step 2102 is an optional step.

Steps 2101 and 2102 are consistent with the foregoing steps 1801 and 1802, and details are not described herein again.

2103: The first CU sends second indication information and third data to the second CU.

In step 2103, when there is a communication port, for example, an Xn communication port, between the first CU and the second CU, the first CU sends the second indication information and the third data to the second CU through the Xn communication port. The second CU generates first data based on the third data. For example, the third data is a PDCP SDU, and the first data is a PDCP PDU.

2104: The second CU sends the second indication information and the first data to the second DU. Correspondingly, the second DU receives the second indication information and the first data that are sent by the second CU.

Step 2104 is consistent with step 2002. Details are not described herein again.

2105: The second DU determines, based on the second indication information, whether to perform processing of the network coding function on the first data.

2106: The second DU sends sixth indication information and second data to the terminal device.

Steps 2105 and 2106 are consistent with the foregoing step 2003, and details are not described herein again.

In some embodiments of this application, in a scenario in which the UE is handed over from the first DU to the second DU, the UE notifies the first DU of a current network decoding status of the UE through the network coding feedback information, to enable the first DU to trigger sending of a DDDS message to the first CU. The first CU sends the second indication information to the second CU. The second CU indicates, through the second indication information, the second DU whether to perform processing of the network coding function on the received first data. The second DU sends the second data to the terminal device based on the second indication information. The second data may be the second DU that performs network coding processing on the received first data to generate an encoded packet, or may be the first data (that is, processing of the network coding function does not need to be performed on the first data), and indicates the terminal device to distinguish the second data, so as to ensure that the terminal device correctly processes the second data, and reduce a packet loss in a handover process.

It should be noted that the foregoing steps in this solution are mainly for the NC function located on a DU and the terminal device. Before the terminal device is handed over, the NC function may be located on the first DU and the terminal device, and after the terminal device is handed over, the NC function may be located on the second DU and the terminal device. In addition, this solution is further applicable to a scenario in which the NC function is located on a CU and the terminal device. In this scenario, the first CU also needs to send the second indication information to the second CU, and the second CU performs, based on the second indication information from the first CU, processing of the network coding function on the first data, to generate an encoded packet. An example generation method is similar to step 2105, and details are not described herein again. In other words, before the terminal device is handed over, the first CU sends the encoded packet to the terminal device, and after the terminal device is handed over, the second CU sends the redundancy packet to the terminal device.

Figure 22:
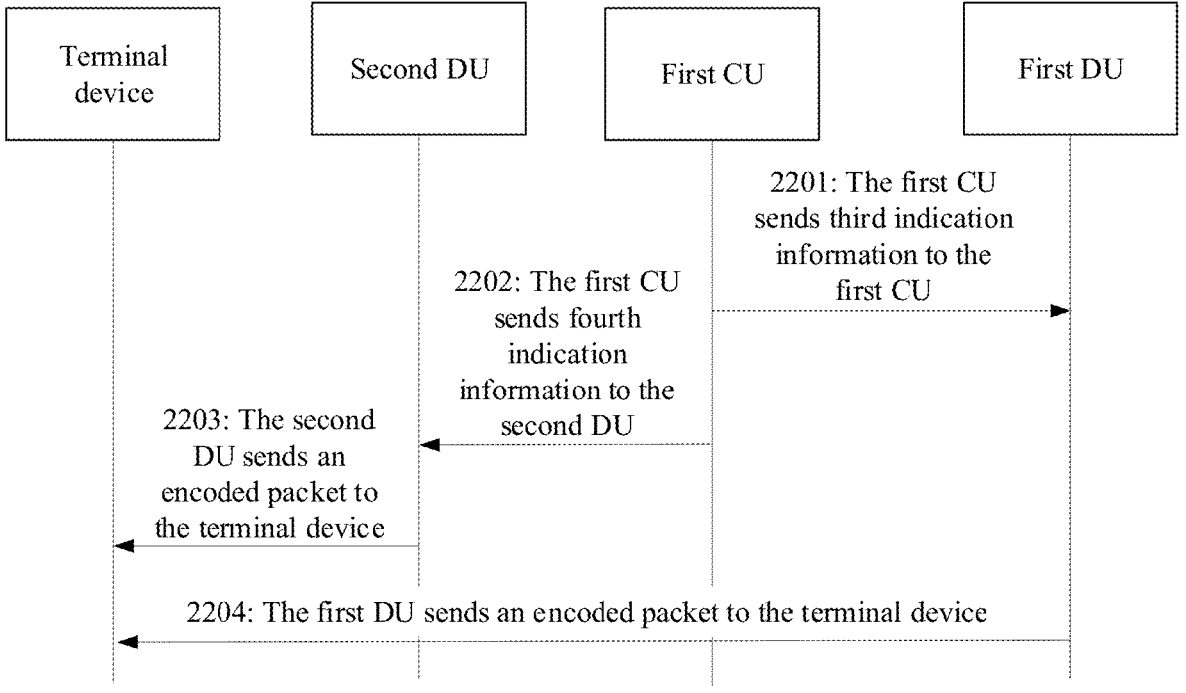
FIG. 22 is a schematic diagram of another embodiment of a configuration method for a network coding function according to an embodiment of this application.

With reference to the foregoing embodiment, a communication system (in a dual-connectivity scenario) corresponding to FIG. 13*b* is described. A first access network device includes a first CU, and the communication system includes UE, a first DU, a second DU, and the first CU. The UE is connected to both the first DU and the second DU, and the first DU and the second DU are connected to the first CU. In this embodiment, a solution in which the terminal device separately receives encoded packets from the first DU and the second DU is used as an example for description (that is, the solution shown in FIG. 4, in which the encoded packets include redundancy packets and system packets). In some embodiments of this application, an NC function is located on a DU and the terminal device. (for a downlink, the first DU and the second DU may perform a coding operation and add encoded packet headers by using a same coding configuration to generate encoded packets, and the terminal device performs joint decoding on the encoded packets received from the first DU and the second DU.) FIG. 22 is a schematic diagram of another embodiment of a configuration method for a network coding function according to an embodiment of this application. The configuration method for the network coding function includes the following steps.

2201: The first CU sends third indication information to the first DU.

Figure 24:
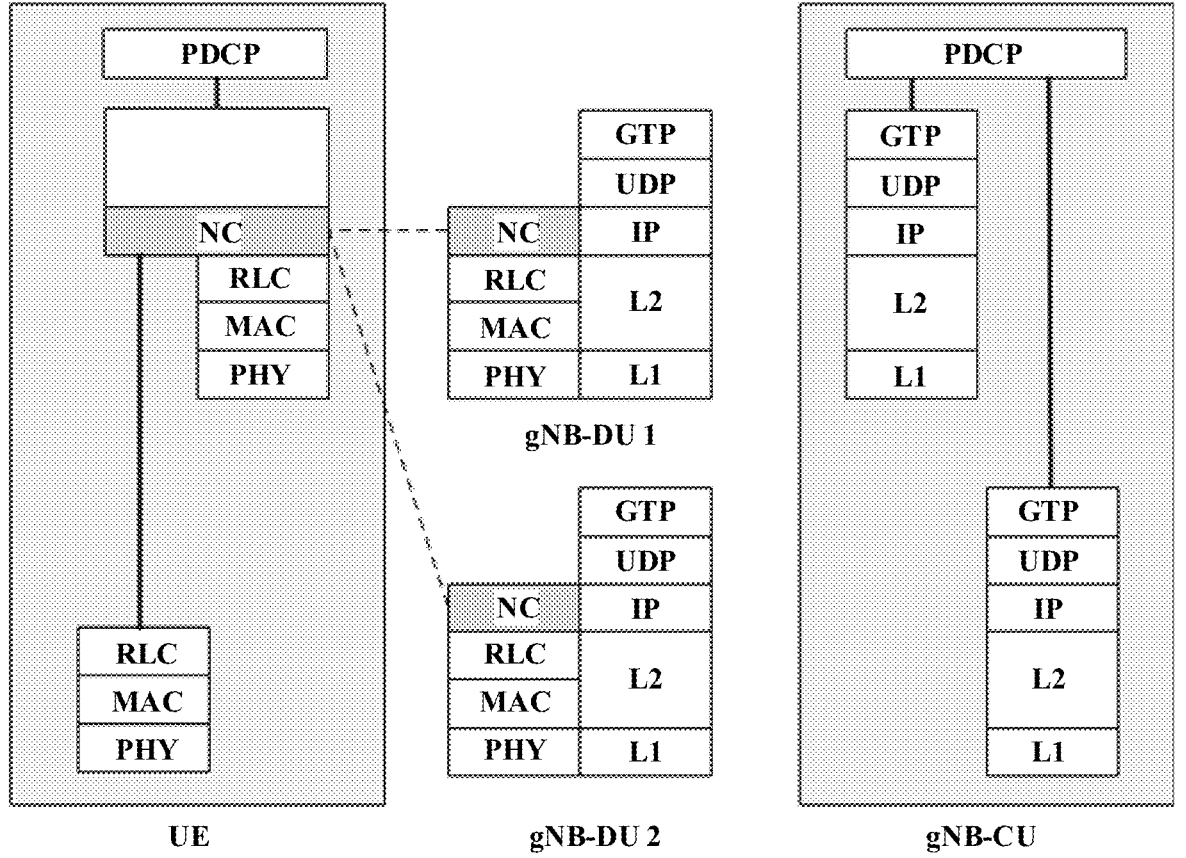
FIG. 24 is a schematic diagram of protocol layers between UE, a first CU, a first DU, and a second DU in a dual-connectivity scenario.
Figure 25:
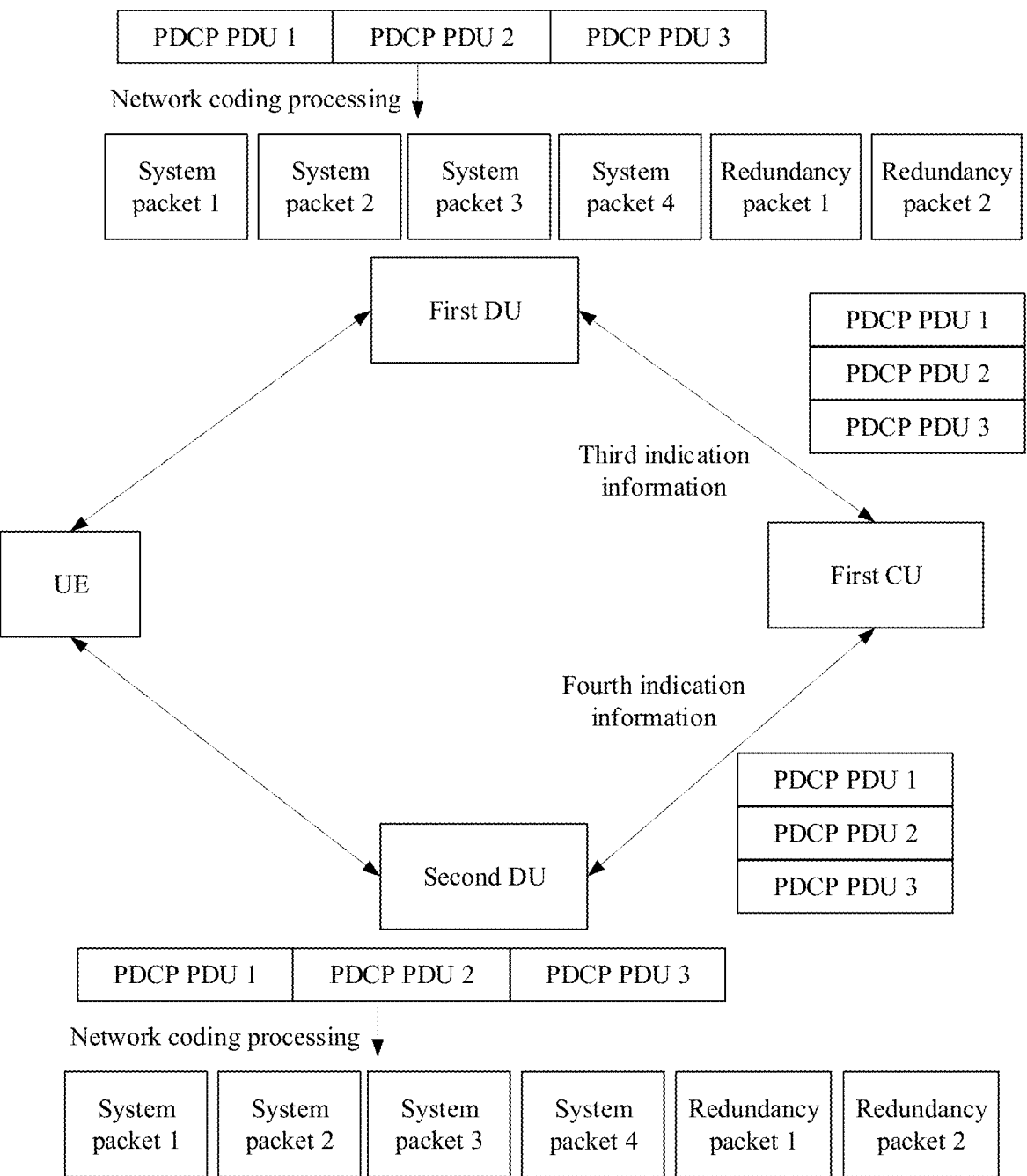
FIG. 25 is a schematic diagram of another scenario according to an embodiment of this application.

In this embodiment, for ease of understanding, refer to FIG. 24. FIG. 24 is a schematic diagram of protocol layers between UE, a first CU, a first DU, and a second DU in a dual-connectivity scenario. The network coding function is separately implemented in the first DU and the second DU. FIG. 25 is a schematic diagram of another scenario according to an embodiment of this application.

The first CU separately sends a PDCP PDU to the first DU and the second DU by using a PDCP duplication function. The first DU and the second DU separately perform processing of the network coding function on the received PDCP PDU by using a same coding configuration. Descriptions are provided with reference to FIG. 25. The first CU separately sends PDCP PDUs 1, 2, and 3 to the first DU and the second DU, and the first DU and the second DU separately perform processing of the network coding function on the received PDCP PDUs 1, 2, and 3 to generate encoded packets. To enable the terminal device to perform joint decoding the encoded packets received from the first DU and the second DU, the first CU needs to separately send, to the first DU and the second DU, configuration information needed for performing the NC function. Configuration information is consistent with the configuration information in step 1708, and details are not described herein again. Optionally, to enable the first DU and the second DU to generate different redundancy packets, selection parameters of coding coefficients configured by the first CU for the first DU and the second DU may be different, that is, the first DU and the second DU generate different redundancy packets by using different coding coefficients. That is, the first DU and the second DU generate same system packets, but may generate different redundancy packets.

The first CU sends the third indication information to the first DU, and the third indication information indicates a rule for the first DU to send the encoded packet to the terminal device. The third indication information may indicate a rule for the first DU to send a system packet to the terminal device, or the third indication information may indicate a rule for the first DU to send a system packet and a redundancy packet to the terminal device.

For example, the first CU sends the third indication information to the first DU through an F1AP message.

2202: The first CU sends fourth indication information to the second DU.

The first CU sends the fourth indication information to the second DU, and the fourth indication information indicates a rule for the second DU to send the encoded packet to the terminal device. The fourth indication information may indicate a rule for the second DU to send a system packet to the terminal device, or the fourth indication information may indicate a rule for the second DU to send a system packet and a redundancy packet to the terminal device.

For example, the first CU sends the fourth indication information to the second DU through an F1AP message.

2203: The second DU sends the encoded packet to the terminal device.

When the fourth indication information indicates the rule for the second DU to send the system packet to the terminal device:

In a possible implementation, the fourth indication information includes a number of the system packet. For example, the second DU performs processing of the network coding function on the PDCP PDUs 1, 2, and 3, to generate system packets 1 to 4, and a redundancy packet 1 and a redundancy packet 2. The fourth indication information indicates the second DU to send a system packet whose number is an even number to the terminal device. The fourth indication information may include numbers of the system packet 2 and the system packet 4, to enable the second DU to send the system packet 2 and the system packet 4 to the terminal device.

In another possible implementation, the fourth indication information includes information about a range/quantity of system packets to be sent. For example, the fourth indication information indicates the second DU to send system packets whose numbers are in a specified range from front to back to the terminal device. For example, the fourth indication information indicates the second DU to send the system packet 1 and the system packet 2 to the terminal device.

When the fourth indication information indicates the rule for the second DU to send the redundancy packet to the terminal device:

In a possible implementation, the second DU detects quality of a current link between the second DU and the terminal device, and determines whether to send the redundancy packet to the terminal device and a quantity of redundancy packets to be sent to the terminal device. In this implementation, the fourth indication information does not exist.

In another possible implementation, the first CU sends a threshold to the second DU. When the second DU detects that quality of a link between the second DU and the terminal device is higher than the threshold, the second DU sends the redundancy packet to the terminal device. A quantity of redundancy packets to be sent by the second DU to the terminal device may be determined by the second DU, or may be configured by the first CU. For example, the fourth indication information includes information about a number of a redundancy packet or a quantity of redundancy packets to be sent. For example, the fourth indication information indicates the second DU to send the redundancy packet 1 to the terminal device.

2204: The first DU sends the encoded packet to the terminal device.

When the third indication information indicates the rule for the second DU to send the system packet to the terminal device:

In a possible implementation, the third indication information includes a number of the system packet. For example, the first DU performs processing of the network coding function on the PDCP PDUs 1, 2, and 3, to generate system packets 1 to 4, and a redundancy packet 1 and a redundancy packet 2. The third indication information indicates the first DU to send a system packet whose number is an odd number to the terminal device. The third indication information may include numbers of the system packet 1 and the system packet 3, to enable the first DU to send the system packet 1 and the system packet 3 to the terminal device.

In another possible implementation, the third indication information includes information about a range/quantity of system packets to be sent. For example, the third indication information indicates the first DU to send system packets whose numbers are in a specified range from back to front to the terminal device. For example, the third indication information indicates the first DU to send the system packet 3 and the system packet 4 to the terminal device.

When the third indication information indicates the rule for the first DU to send the redundancy packet to the terminal device:

In a possible implementation, the first DU detects quality of a current link between the first DU and the terminal device, and determines whether to send the redundancy packet to the terminal device and a quantity of redundancy packets to be sent to the terminal device. In this implementation, the third indication information does not exist.

In another possible implementation, the first CU sends a threshold to the first DU. When the first DU detects that quality of a link between the first DU and the terminal device is higher than the threshold, the first DU sends the redundancy packet to the terminal device. A quantity of redundancy packets to be sent by the first DU to the terminal device may be determined by the first DU, or may be configured by the first CU. For example, the third indication information includes information about a number of redundancy packet or a quantity of redundancy packets to be sent. For example, the third indication information indicates the first DU to send the redundancy packet 1 and the redundancy packet 2 to the terminal device.

It should be noted that, in embodiments of this application, the redundancy packet 1 and the redundancy packet 2 generated by the first DU and the second DU may be the same or may be different. This is not limited in embodiments of this application.

In embodiments of this application, in the dual-connectivity scenario, the first DU and the second DU may separately send the system packet to the terminal device based on indication information of the first CU. The first DU and the second DU may further determine, based on the link quality, whether to send the redundancy packet to the terminal device and a quantity of redundancy packets to be sent. Alternatively, the first DU and the second DU may further determine, based on the threshold configured by the first CU, whether to send the redundancy packet to the terminal device. The information about the quantity of redundancy packets to be sent may be determined by the first CU and the second DU, or may be configured by the first CU. According to the foregoing method, it can be ensured that in the dual-connectivity scenario, the terminal device may perform joint decoding on encoded packets sent on different links to recover original data, improving data transmission reliability.

In this embodiment of this application, the solution in which the terminal device separately receives the encoded packets from the first DU and the second DU is used as an example for description. This embodiment is further applicable to a solution in which the terminal device separately receives original data packets and redundancy packets from the first DU and the second DU (that is, the solution shown in FIG. 3). In the solution in which the terminal device receives the original data packet and the redundancy packet, the encoded packet in the foregoing step needs to be replaced with the original data packet and the redundancy packet, and the system packet needs to be replaced with the original data packet. Details are not described herein again.

Based on the foregoing embodiments, the communication system may further include a second access network device. The communication system may include the first access network device, the second access network device, and the terminal device. When the terminal device is handed over from the first access network device to the second access network device, the first access network device may send, to the second access network device, network coding feedback information corresponding to the terminal device. Alternatively, the first access network device may send, to the second access network device, original data (first data) that has not been successfully decoded by the terminal device. The first access network device may further send, to the second access network device, configuration information of a network coding function currently used by the first access network device. A method is similar to the method in which the terminal device is handed over from the first DU to the second DU in the foregoing embodiment, and details are not described herein again.

Figure 26:
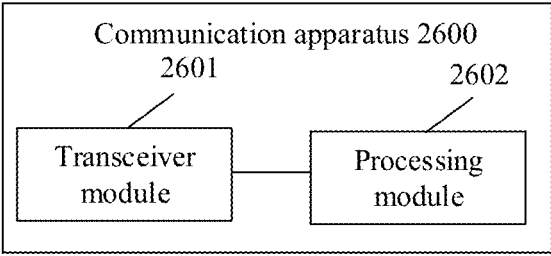
FIG. 26 is a schematic diagram of an embodiment of a communication apparatus according to an embodiment of this application.

The following describes in detail a communication apparatus in this application. FIG. 26 is a schematic diagram of an embodiment of a communication apparatus according to an embodiment of this application. A communication apparatus 2600 may be deployed on a first access network device, a terminal device, or a chip system. The communication apparatus 2600 includes a transceiver module 2601 and a processing module 2602. The communication apparatus 2600 may be configured to perform steps performed by the first access network device and/or the terminal device in FIG. 14 to FIG. 25. For details, refer to related descriptions in the foregoing method embodiments.

For example:

The transceiver module 2601 is configured to receive first capability information from the terminal device, where the first capability information indicates a network coding capability supported by the terminal device, and the first capability information includes one or more of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, where the code block is a set of one or more of the original data packets.

The processing module 2602 is configured to determine first configuration information based on the first capability information, where the first configuration information includes one or more of the following: a network coding type, a size of a system packet, a size of an original data packet, a quantity of system packets, a quantity of original data packets, a quantity of redundancy packets, selection of a coding coefficient, a convolution depth, or indication information for activating the network coding function.

The transceiver module 2601 is further configured to send the first configuration information to the terminal device, where the first configuration information indicates the terminal device to configure the network coding function.

In a possible implementation, the transceiver module 2601 is further configured to receive network coding feedback information from the terminal device, where the network coding feedback information includes one or more of the following information:

a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

In a possible implementation, the transceiver module 2601 is further configured to receive first indication information from the first DU.

The transceiver module 2601 is further configured to send the first indication information to the second DU.

The first indication information includes information about the code block.

In a possible implementation, the transceiver module 2601 is further configured to receive first indication information from the first DU.

The transceiver module 2601 is further configured to send the first indication information to the second CU.

The first indication information includes information about the code block.

In a possible implementation, the transceiver module 2601 is further configured to send second indication information and first data to the second DU, where the second indication information indicates whether network coding processing needs to be performed on the first data.

In a possible implementation, the transceiver module 2601 is further configured to send third configuration information to the second DU, where the third configuration information is used to configure the network coding function of the second DU, and the third configuration information includes configuration information used by the first DU to perform network coding processing.

In a possible implementation, the transceiver module 2601 is further configured to send second indication information to the second CU, to enable the second CU to send first data and the second indication information to the second DU, where the second indication information indicates whether network coding processing needs to be performed on the first data.

In a possible implementation, the transceiver module 2601 is further configured to: when the second indication information indicates that the network coding processing needs to be performed on the first data, send data obtained after the network coding processing is performed on the first data to the terminal device through a first logical channel.

The transceiver module 2601 is further configured to: when the second indication information indicates that the network coding processing does not need to be performed on the first data, send the first data to the terminal device through a second logical channel, where the first logical channel is different from the second logical channel.

In a possible implementation, the transceiver module 2601 is further configured to send third indication information to the first DU, where the third indication information indicates a rule for the first DU to send the system packet or the original data packet to the terminal device.

The transceiver module 2601 is further configured to send fourth indication information to the second DU, where the fourth indication information indicates a rule for the second DU to send the system packet or the original data packet to the terminal device.

In a possible implementation, the transceiver module 2601 is further configured to receive the first capability information from the terminal device.

In a possible implementation, the transceiver module 2601 is further configured to send the first capability information to the first DU, to enable the first DU to determine the first configuration information based on the first capability information.

Alternatively, the processing module 2602 is further configured to determine the first configuration information based on the first capability information.

In a possible implementation, the transceiver module 2601 is further configured to send the first configuration information to the terminal device.

Alternatively, the transceiver module 2601 is further configured to receive the first configuration information from the first DU, and the first CU sends the first configuration information to the terminal device.

In a possible implementation, the transceiver module 2601 is further configured to receive second capability information from the first DU, where the second capability information indicates a network coding capability supported by the first DU, and the second capability information includes one or more of the following: a network coding type, a size of a code block, a quantity of original data packets, a quantity of redundancy packets, a bit rate of network coding, a convolution depth, a size of a finite field for a coding operation, or a maximum data volume capable of being processed by the first DU during network coding.

In a possible implementation, the transceiver module 2601 is further configured to send second configuration information to the first DU, where the second configuration information is used to configure the network coding function of the first DU, and the second configuration information includes one or more of the following: a network coding type, a size of a system packet, a size of an original data packet, a quantity of system packets, a quantity of original data packets, a quantity of redundancy packets, selection of a coding coefficient, a convolution depth, or indication information for activating the network coding function.

For another example:

The transceiver module 2601 is configured to send first capability information to the first access network device, where the first capability information indicates a network coding capability supported by the terminal device, and the first capability information includes one or more of the following: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, where the code block is a set of one or more of the original data packets.

The transceiver module 2601 is further configured to receive the first configuration information from the first access network device, where the first configuration information indicates the terminal device to configure a network coding function, and the first configuration information includes one or more of the following: a network coding type, a size of a system packet, a size of an original data packet, a quantity of system packets, a quantity of original data packets, a quantity of redundancy packets, selection of a coding coefficient, a convolution depth, or indication information for activating the network coding function.

In a possible implementation, the transceiver module 2601 is further configured to send network coding feedback information to the first access network device, where the network coding feedback information includes one or more of the following information:

a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

The foregoing content describes in detail the methods provided in this application. To better implement the foregoing solutions in embodiments of this application, embodiments of this application further provide a corresponding apparatus or device.

In embodiments of this application, the first access network device and the terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division in an actual implementation. The following describes in detail a communication apparatus provided in embodiments of this application with reference to FIG. 27 to FIG. 29. The apparatus may be the first access network device and/or the terminal device in the foregoing method examples. Optionally, the apparatus is the first access network device or a chip in the first access network device, or the apparatus is the terminal device or a chip in the terminal device.

Figure 27:
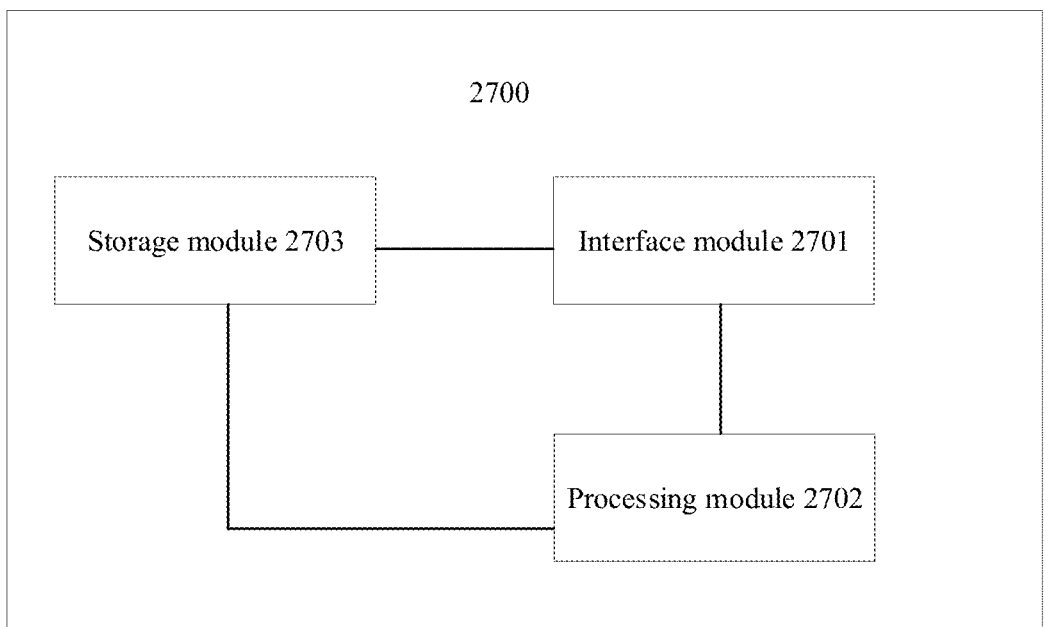
FIG. 27 is a schematic diagram of another embodiment of a communication apparatus according to an embodiment of this application.

As shown in FIG. 27, an embodiment of this application provides an apparatus 2700. The apparatus may be a terminal, an access network device, a server, or a centralized controller, or may be a component (for example, an integrated circuit, a chip, or the like) in a terminal, an access network device, a server, or a centralized controller. Alternatively, the apparatus may be another communication module configured to implement the method in the method embodiments of this application. The apparatus 2700 may include a processing module 2702 (also referred to as a processing unit). Optionally, the apparatus 2700 may further include an interface module 2701 (or referred to as a transceiver unit or a transceiver module) and a storage module 2703 (or referred to as a storage unit). The interface module 2701 is configured to communicate with another device. The interface module 2701 may be, for example, a transceiver module or an input/output module.

In a possible design, one or more modules in FIG. 27 may be implemented by one or more processors, may be implemented by one or more processors and memories, may be implemented by one or more processors and transceivers, or may be implemented by one or more processors, memories, and transceivers. This is not limited in embodiments of this application. The processor, the memory, and the transceiver may be disposed separately, or may be integrated together.

The apparatus has a function of implementing the first access network device and/or the terminal device described in embodiments of this application. For example, the apparatus includes a corresponding module, unit, or means used for the first access network device and/or the terminal device to perform the steps of the first access network device and/or the terminal device that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment. Alternatively, the apparatus has a function of implementing the first access network device and/or the terminal device described in embodiments of this application. For example, the apparatus includes a corresponding module, unit, or means used for the first access network device and/or the terminal device to perform the steps of the first access network device and/or the terminal device that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment.

Optionally, the modules in the apparatus 2700 may be configured to perform behavior of the first access network device or the terminal device in the methods described in FIG. 16 to FIG. 25 in embodiments of this application.

For example, when the apparatus 2700 is configured to perform the behavior of the first access network device, the interface module 2701 is configured to perform step 1601 of receiving the first capability information from the terminal device, and optionally, may be further configured to perform step 1603 of sending the first configuration information to the terminal device. The processing module 2702 may be configured to perform step 1602 of determining the first configuration information based on the first capability information. The storage module 2703 may be configured to store the first capability information in the foregoing method.

For another example, when the apparatus 2700 is configured to perform the behavior of the terminal device, the interface module 2701 is configured to perform step 1602 of sending the first capability information to the first access network device, and optionally, may be further configured to perform step 1603 of receiving the first configuration information from the first access network device. The storage module 2703 may be configured to store the first configuration information in the foregoing method.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions. Details are not described herein.

Figure 28:
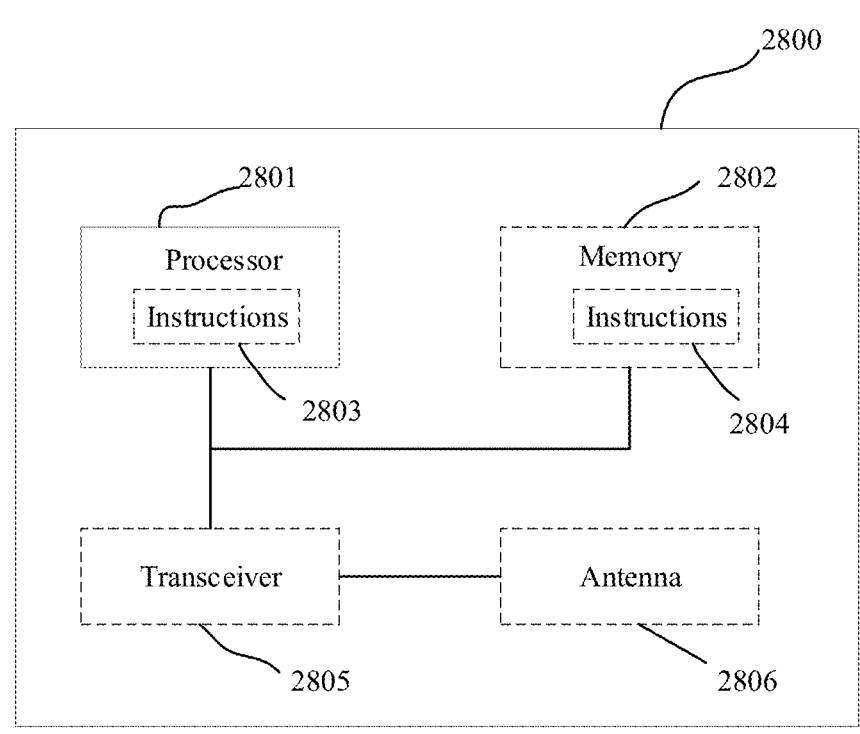
FIG. 28 is a schematic diagram of a structure of a communication apparatus according to an embodiment of this application.

FIG. 28 is a schematic diagram of a structure of an apparatus. An apparatus 2800 may be an access network device, a terminal device, a server, or a centralized controller, or may be a chip, a chip system, a processor, or the like that supports an access network device, a terminal device, a server, or a centralized controller in implementing the foregoing method. The apparatus may be configured to implement the method described in the foregoing method embodiments. For details, refer to the descriptions in the foregoing method embodiments.

The apparatus 2800 may include one or more processors 2801. The processor 2801 may also be referred to as a processing unit, and may implement a control function. The processor 2801 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 2801 may alternatively store instructions and/or data 2803, and the instructions and/or data 2803 may be run by the processor, to enable the apparatus 2800 to perform the methods described in the foregoing method embodiments.

In another optional design, the processor 2801 may include a transceiver unit configured to implement receiving and sending functions. For example, the transceiver unit may be a transceiver circuit, an interface, an interface circuit, or a communication interface. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 2800) may include a circuit. The circuit may implement a sending, receiving, or communication function in the foregoing method embodiments.

Optionally, the apparatus 2800) may include one or more memories 2802. The memory 2802 may store instructions 2804. The instructions may be run on the processor, to enable the apparatus 2800 to perform the methods described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 2800 may further include a transceiver 2805 and/or an antenna 2806. The processor 2801 may be referred to as a processing unit, and controls the apparatus 2800. The transceiver 2805 may be referred to as a transceiver unit, a transceiver machine, a transceiver circuit, a transceiver apparatus, a transceiver module, or the like, and is configured to implement sending and receiving functions.

Optionally, the apparatus 2800 may be configured to perform the methods described in FIG. 16 to FIG. 25 in embodiments of this application.

In a possible implementation, the processing module in FIG. 27 may be implemented by the processor in FIG. 28, the storage module in FIG. 27 may be implemented by the memory and/or the processor in FIG. 28, and the interface module in FIG. 27 may be implemented by the transceiver, the transceiver and the antenna, or the processor in FIG. 28.

The processor and the transceiver described in this application may be implemented on an integrated circuit (IC), an analog IC, a radio frequency integrated circuit RFIC, a mixed signal IC, an ASIC, a printed circuit board (PCB), an electronic device, or the like. The processor and the transceiver may be manufactured by using various IC technologies, for example, a complementary metal oxide semiconductor (CMOS), an nMetal-oxide-semiconductor (NMOS), a positive channel metal oxide semiconductor (PMOS), a bipolar junction transistor (BJT), a bipolar CMOS (BiC-MOS), silicon germanium (SiGe), and gallium arsenide (GaAs).

The apparatus described in the foregoing embodiments may be the first access network device or the terminal device. However, a range of the apparatus described in this application is not limited thereto, and a structure of the apparatus may not be limited to that in FIG. 28. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicle-mounted device, an access network device, a cloud device, an artificial intelligence device, a machine device, a home device, a medical device, an industrial device, and the like; and (6) others.

Figure 29:
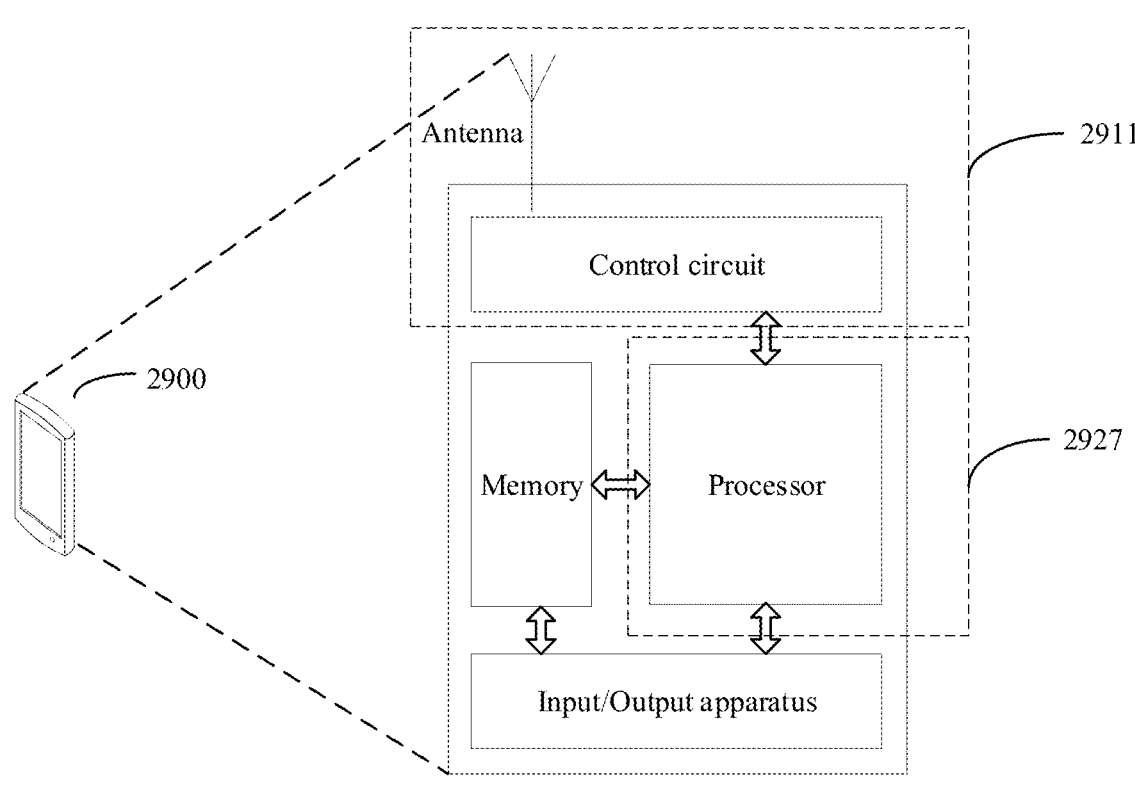
FIG. 29 is a schematic diagram of a structure of a terminal device according to an embodiment of this application.

FIG. 29 is a schematic diagram of a structure of a terminal device. The terminal device is applicable to the scenarios shown in FIG. 1(*a*) to FIG. 1(*f*). For ease of description. FIG. 29 shows only main components in the terminal device. For a function of the terminal device, refer to the descriptions in the foregoing method embodiments or apparatus embodiments. Details are not described herein again. As shown in FIG. 29, a terminal device 2900 includes a processor, a memory, a control circuit, an antenna, and an input/output apparatus. The processor is mainly configured to process a communication protocol and communication data, control the entire terminal, execute a software program, and process data of the software program. The memory is configured to store the software program and the data. A radio frequency circuit is mainly configured to: perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to: receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description. FIG. 29 shows only one memory and one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 29 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a transceiver function may be considered as a transceiver unit 2911 of the terminal device 2900, and the processor that has a processing function may be considered as a processing unit 2927 of the terminal device 2900. As shown in FIG. 29, the terminal device 2900 includes the transceiver unit 2911 and the processing unit 2927. The transceiver unit may also be referred to as a transceiver, a transceiver machine, a transceiver apparatus, or the like. Optionally, a component that is in the transceiver unit 2911 and that is configured to implement a receiving function may be considered as a receiving unit, and a component that is in the transceiver unit 2911 and that is configured to implement a sending function may be considered as a sending unit. In other words, the transceiver unit 2911 includes the receiving unit and the sending unit. For example, the receiving unit may also be referred to as a receiving machine, a receiver, a receiving circuit, or the like. The sending unit may also be referred to as a transmitter machine, a transmitter, a transmitter circuit, or the like. Optionally, the receiving unit and the sending unit may be one integrated unit, or may be a plurality of independent units. The receiving unit and the sending unit may be located at one geographical position, or may be distributed at a plurality of geographical positions.

A person skilled in the art may further understand that various illustrative logical blocks and steps that are listed in embodiments of this application may be implemented by electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the protection scope of embodiments of this application.

It may be understood that the processor in embodiments of this application may be an integrated circuit chip, and has a signal processing capability. In an implementation process, the steps in the foregoing method embodiments may be completed by an integrated logic circuit in a form of hardware or instructions in a form of software in the processor. The foregoing processor may be a general-purpose processor, a DSP, an ASIC, an FPGA or another programmable logic device, a discrete gate or a transistor logic device, or a discrete hardware component.

The solutions described in this application may be implemented in various manners. For example, these technologies may be implemented by hardware, software, or a combination thereof. For hardware implementation, a processing unit configured to execute these technologies at a communication apparatus may be implemented in one or more general-purpose processors, a DSP, a digital signal processor device, an ASIC, a programmable logic device, an FPGA, or another programmable logic apparatus, a discrete gate or transistor logic, a discrete hardware component, or any combination thereof. The general-purpose processor may be a microprocessor, or the processor may alternatively be implemented by a combination of computing apparatuses, for example, a digital signal processor and a microprocessor, a plurality of microprocessors, one or more microprocessors combined with a digital signal processor core, or any other similar configuration.

It may be understood that the memory in embodiments of this application may be a volatile memory or a nonvolatile memory: or may include a volatile memory and a nonvolatile memory: The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By using an example description but not a restrictive description. RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and methods described in this specification includes but is not limited to these and any memory of another proper type.

This application further provides a computer-readable medium. The computer-readable medium stores a computer program. When the computer program is executed by a computer, functions of a corresponding apparatus, such as a transmit end or a receive end, in any one of the foregoing method embodiments are implemented.

This application further provides a computer program product. When the computer program product is executed by a computer, functions of a corresponding apparatus, such as a transmit end or a receive end, in any one of the foregoing method embodiments are implemented.

The solutions described in the foregoing embodiments may be all or partially implemented by software, hardware, firmware, or any combination thereof. When software is used to implement embodiments, all or a part of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

"Concurrent" in this application may be understood as being at a same time point, or may be understood as being within a time period, or may be understood as being within a same period. This may be understood with reference to a context.

A person skilled in the art may understand that a value of a number (which may also be referred to as an index), a value of a quantity, and a location in this application are merely used as an example, are not a unique representation form, and are not used to limit the scope of embodiments of this application. Various numbers such as "first" and "second" in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" in this specification may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural. The character "/" generally indicates that the associated objects are in an "or" relationship. In some cases, the character "/" may also be understood as an "and/or" relationship, and may be specifically understood with reference to a context.

The term "at least one of" in this specification indicates all combinations or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It should be understood that in embodiments of this application. "B corresponding to A" represents that B is associated with A, or B may be determined based on A. However, it should be further understood that determining B based on A does not mean that B is determined based only on A. B may alternatively be determined based on A and/or other information.

"Predefine" in this application may be understood as "define", "predefine", "store". "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing systems, apparatuses, and units, refer to a corresponding process in the foregoing method embodiments. Details are not described herein again.

It may be understood that the systems, the apparatuses, and the methods described in this application may alternatively be implemented in another manner. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes a plurality of instructions for instructing a computer device (which may be a personal computer, a server, or an access network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

For same or similar parts in embodiments of this application, refer to each other. In various embodiments of this application and the implementations/implementation methods in various embodiments, unless otherwise specified or there is a logical conflict, terms and/or descriptions in different embodiments and in the implementations/implementation methods in various embodiments are consistent and may be mutually referenced. Technical features in different embodiments and the implementations/implementation methods in various embodiments may be combined to form a new embodiment, implementation, or implementation method based on an internal logical relationship thereof. The foregoing descriptions are implementations of this application, but are not intended to limit the protection scope of this application.

The foregoing descriptions are merely some implementations of this application, but are not intended to limit the protection scope of this application. Any variation or replacement readily figured out by a person skilled in the art within the technical scope disclosed in this application shall fall within the protection scope of this application.

The invention claimed is:

1. A configuration method for a network coding function, performed by a first access network device or a chip for the first access network device, wherein the method comprises:

receiving first capability information from a terminal device, wherein the first capability information indicates a network coding capability supported by the terminal device, and the first capability information comprises at least one of: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, wherein the code block is a set of one or more of the original data packets;

determining first configuration information based on the first capability information, wherein the first configuration information comprises indication information for activating the network coding function and at least one of: a network coding type, a size of a system packet, a size of an original data packet, a quantity of system packets, a quantity of original data packets, a quantity of redundancy packets, selection of a coding coefficient, or a convolution depth; and sending the first configuration information to the terminal device, wherein the first configuration information indicates the terminal device to configure the network coding function.

2. The method according to claim 1, wherein the method further comprises:

receiving network coding feedback information from the terminal device, wherein the network coding feedback information comprises at least one of:

a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

3. The method according to claim 2, wherein the method further comprises:

receiving first indication information from a first distributed unit (DU); and sending the first indication information to a second DU, wherein the first indication information comprises information that indicates the code block.

4. The method according to claim 2, wherein the method further comprises:

receiving first indication information from a first DU, wherein a first central unit (CU) manages the first DU; and sending the first indication information to a second CU, wherein the first indication information comprises information that indicates the code block.

5. The method according to claim 2, wherein the method further comprises:

sending second indication information and first data to a second DU, wherein the second indication information indicates whether network coding processing needs to be performed on the first data.

6. The method according to claim 3, wherein the method further comprises:

sending third configuration information to the second DU, wherein the third configuration information is used to configure the network coding function of the second DU, and the third configuration information comprises configuration information used by the first DU to perform network coding processing.

7. The method according to claim 2, wherein the method further comprises:

sending second indication information to a second CU, to enable the second CU to send first data and the second indication information to a second DU, wherein the second CU manages the second DU, and the second indication information indicates whether network coding processing needs to be performed on the first data.

8. The method according to claim 5, wherein the method further comprises:

when the second indication information indicates that the network coding processing needs to be performed on the first data, sending, by the second DU, data obtained after the network coding processing is performed on the first data to the terminal device through a first logical channel; or when the second indication information indicates that the network coding processing does not need to be performed on the first data, sending, by the second DU, the first data to the terminal device through a second logical channel, wherein the first logical channel is different from the second logical channel.

9. The method according to claim 2, wherein the method further comprises:

sending third indication information to a first DU, wherein the third indication information indicates a rule for the first DU to send the system packet or the original data packet to the terminal device; and sending fourth indication information to a second DU, wherein the fourth indication information indicates a rule for the second DU to send the system packet or the original data packet to the terminal device.

10. A configuration method for a network coding function, performed by a terminal device or a chip for the terminal device, wherein the method comprises:

sending first capability information to a first access network device, wherein the first capability information indicates a network coding capability supported by the terminal device, and the first capability information comprises at least one of: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, wherein the code block is a set of one or more of the original data packets; and receiving first configuration information from the first access network device, wherein the first configuration information indicates the terminal device to configure the network coding function, and the first configuration information comprises indication information for activating the network coding function and at least one of: a network coding type, a size of a system packet, a size of an original data packet, a quantity of system packets, a quantity of original data packets, a quantity of redundancy packets, selection of a coding coefficient, or a convolution depth.

11. The method according to claim 10, wherein the method further comprises:

sending network coding feedback information to the first access network device, wherein the network coding feedback information comprises at least one of:

a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

12. A communication apparatus comprising a processor, wherein the processor is configured to execute a computer program or instructions stored in a memory, to cause the communication apparatus to:

send first capability information to a first access network device, wherein the first capability information indicates a network coding capability supported by the communication apparatus, and the first capability information comprises at least one of: a network coding type, a size of a code block, a quantity of original data packets, a quantity of redundancy packets, a bit rate of network coding, a convolution depth, a size of a finite field for a coding operation, or a maximum data volume capable of being processed by the communication apparatus during network coding, wherein the code block is a set of one or more of the original data packets; and receive first configuration information from the first access network device, wherein the first configuration information indicates the communication apparatus to configure a network coding function, and the first configuration information comprises indication information for activating the network coding function and at least one of: a network coding type, a size of a system packet, a size of an original data packet, a quantity of system packets, a quantity of original data packets, a quantity of redundancy packets, selection of a coding coefficient, or a convolution depth.

13. The communication apparatus according to claim 12, wherein the processor is further configured to execute a computer program or instructions stored in a memory, to cause the communication apparatus to:

send network coding feedback information to the first access network device, wherein the network coding feedback information comprises at least one of:

a quantity of the redundancy packets requested by the communication apparatus, quantities of the original data packets and the redundancy packets that are incorrectly received by the communication apparatus, quantities of the original data packets and the redundancy packets that are correctly received by the communication apparatus, quantities of the system packets and the redundancy packets that are incorrectly received by the communication apparatus, or quantities of the system packets and the redundancy packets that are correctly received by the communication apparatus.

14. A communication apparatus comprising a processor, wherein the processor is configured to execute a computer program or instructions stored in a memory, to cause the communication apparatus to:

receive first capability information from a terminal device, wherein the first capability information indicates a network coding capability supported by the terminal device, and the first capability information comprises at least one of: a network coding type, a size of a code block, a quantity of original data packets, a quantity of redundancy packets, a bit rate of network coding, a convolution depth, a size of a finite field for a coding operation, or a maximum data volume capable of being processed by the terminal device during network coding, wherein the code block is a set of one or more of the original data packets;

determine first configuration information based on the first capability information, wherein the first configuration information comprises indication information for activating a network coding function and at least one of: a network coding type, a size of a system packet, a size of an original data packet, a quantity of system packets, a quantity of original data packets, a quantity of redundancy packets, selection of a coding coefficient, or a convolution depth; and

send the first configuration information to the terminal device, wherein the first configuration information indicates the terminal device to configure the network coding function.

15. The communication apparatus according to claim 14, wherein the processor is configured to execute a computer program or instructions stored in a memory, to cause the communication apparatus to:

receive network coding feedback information from the terminal device, wherein the network coding feedback information comprises at least one of:

a quantity of the redundancy packets requested by the terminal device, quantities of the original data packets and the redundancy packets that are incorrectly received by the terminal device, quantities of the original data packets and the redundancy packets that are correctly received by the terminal device, quantities of the system packets and the redundancy packets that are incorrectly received by the terminal device, or quantities of the system packets and the redundancy packets that are correctly received by the terminal device.

16. The communication apparatus according to claim 15, wherein the processor is configured to execute a computer program or instructions stored in a memory, to cause the communication apparatus to:

receive first indication information from a first distributed unit (DU); and send the first indication information to a second DU, wherein the first indication information comprises information that indicates the code block.

17. The communication apparatus according to claim 15, wherein the processor is configured to execute a computer program or instructions stored in a memory, to cause the communication apparatus to:

receive first indication information from a first DU, wherein a first central unit (CU) of the communication apparatus manages the first DU; and send the first indication information to a second CU, wherein the first indication information comprises information that indicates the code block.

18. The communication apparatus according to claim 15, wherein the processor is configured to execute a computer program or instructions stored in a memory, to cause the communication apparatus to:

send second indication information and first data to a second DU, wherein the second indication information indicates whether network coding processing needs to be performed on the first data.

19. The communication apparatus according to claim 16, wherein the processor is configured to execute a computer program or instructions stored in a memory, to cause the communication apparatus to:

send third configuration information to the second DU, wherein the third configuration information is used to configure the network coding function of the second DU, and the third configuration information comprises configuration information used by a first DU to perform network coding processing.

20. The communication apparatus according to claim 15, wherein the processor is configured to execute a computer program or instructions stored in a memory, to cause the communication apparatus to:

send second indication information to a second CU, to enable the second CU to send first data and the second indication information to a second DU, wherein the second CU manages the second DU, and the second indication information indicates whether network coding processing needs to be performed on the first data.

* * * * *